US010378891B2

(12) United States Patent
Franke et al.

(10) Patent No.: US 10,378,891 B2
(45) Date of Patent: Aug. 13, 2019

(54) SYSTEM AND METHOD FOR MEASURING AND MAPPING A SURFACE RELATIVE TO A REFERENCE

(71) Applicant: Outotec Pty Ltd, Frenchs Forest (AU)

(72) Inventors: Jochen Franke, Bentley (AU); Michael Paul Stewart, Perth (AU); Derek Lichti, Calgary (CA)

(73) Assignee: Outotec Pty Ltd, Frenchs Forest (AU)

( * ) Notice: Subject to any disclaimer, the term of this patent is extended or adjusted under 35 U.S.C. 154(b) by 1658 days.

(21) Appl. No.: 13/707,335

(22) Filed: Dec. 6, 2012

(65) Prior Publication Data
US 2013/0231892 A1 Sep. 5, 2013

Related U.S. Application Data

(63) Continuation-in-part of application No. 13/395,324, filed on May 15, 2012, now abandoned, and a (Continued)

(30) Foreign Application Priority Data

Dec. 6, 2011 (AU) .................... 2011905064

(51) Int. Cl.
| G01B 21/08 | (2006.01) |
| G01B 11/06 | (2006.01) |
| G01B 11/24 | (2006.01) |

(52) U.S. Cl.
CPC .......... *G01B 21/08* (2013.01); *G01B 11/0616* (2013.01); *G01B 11/24* (2013.01)

(58) Field of Classification Search
CPC ............................ E05B 17/0016; G01B 21/08
(Continued)

(56) References Cited

U.S. PATENT DOCUMENTS

| 2,713,609 A | 7/1955 | Niklason |
| 3,516,343 A | 6/1970 | Tunney |

(Continued)

FOREIGN PATENT DOCUMENTS

| EP | 0509809 A2 | 10/1992 |
| EP | 0875751 A1 | 11/1998 |

(Continued)

OTHER PUBLICATIONS

Moller, T.; Email from T. Moller to L.Furtenbach enclosing Mill Liner Wear Inspection by Laser Scanning; Feb. 4, 2014; 2 pages.
Franke, J.; Mill Liner Wear Inspection by Laser Scanning; Curtin University of Technology; Nov. 2004; pp. 1-12.
Moller, T.; Photo taken at 2004 Mine Expo, Kalgoorlie, Australia; Nov. 2004; 1 page.

(Continued)

*Primary Examiner* — John E Breene
*Assistant Examiner* — Jeffrey P Aiello
(74) *Attorney, Agent, or Firm* — Armstrong Teasdale LLP

(57) ABSTRACT

A system for measuring the displacement of a surface in a material handling system relative to a base reference is provided. The system includes scanning means to generate point cloud data of the surface relative to a reference point to define a three-dimensional image of the surface, storage means to store base reference data in respect of the base reference, and processing means to process the point cloud data and the base reference data to determine the relative displacement of the surface with respect to the base reference. The processing means includes a referencing means to orientate the point cloud data relative to key reference data of the base surface and transforming the point cloud data and the base reference data into a common co-ordinate system, and displacement processing means to calculate the displacement between the surface and the base reference using both sets of data in the co-ordinate system.

62 Claims, 29 Drawing Sheets

Related U.S. Application Data continuation-in-part of application No. 11/994,260, filed on Dec. 28, 2007, now Pat. No. 9,829,308.

(58) Field of Classification Search
USPC .................................. 702/155, 167; 356/601
See application file for complete search history.

(56) References Cited

U.S. PATENT DOCUMENTS

| | | | |
|---|---|---|---|
| 3,523,736 A * | 8/1970 | Stafford | G01B 11/06 356/614 |
| 3,565,352 A | 2/1971 | Rea | |
| 3,809,607 A | 5/1974 | Murray et al. | |
| 3,960,330 A | 6/1976 | Henson | |
| 4,025,192 A | 5/1977 | Scholdstrom et al. | |
| 4,033,653 A | 7/1977 | Doring et al. | |
| 4,305,415 A | 12/1981 | Galli | |
| 4,406,414 A | 9/1983 | Segawa | |
| 4,814,664 A | 3/1989 | Rothenbuhler | |
| 4,848,681 A | 7/1989 | Eriksson et al. | |
| 4,885,877 A | 12/1989 | Hunt et al. | |
| 4,893,933 A | 1/1990 | Neiheisel et al. | |
| 5,127,736 A | 7/1992 | Neiheisel | |
| 5,212,738 A | 5/1993 | Chande et al. | |
| 5,243,665 A * | 9/1993 | Maney | H01L 21/67242 348/128 |
| 5,431,351 A | 7/1995 | Lejonklou | |
| 5,772,183 A | 6/1998 | Sears | |
| 5,915,132 A | 6/1999 | Counts, Jr. | |
| 6,032,377 A * | 3/2000 | Ichikawa | G01B 11/255 33/28 |
| 6,192,909 B1 | 2/2001 | Strausser | |
| 6,323,952 B1 * | 11/2001 | Yomoto | G01B 11/306 356/512 |
| 6,512,518 B2 | 1/2003 | Dimsdale | |
| 6,685,170 B1 | 2/2004 | Gwynn | |
| 6,780,351 B2 | 8/2004 | Wirth, Jr. | |
| 6,858,826 B2 | 2/2005 | Mueller et al. | |
| 6,874,364 B1 | 4/2005 | Campbell et al. | |
| 6,922,252 B2 | 7/2005 | Harvill et al. | |
| 7,789,356 B1 | 9/2010 | Jones | |
| 8,083,982 B2 | 12/2011 | Kirchhoff et al. | |
| 2002/0145607 A1 | 10/2002 | Dimsdale | |
| 2002/0158368 A1 | 10/2002 | Wirth, Jr. | |
| 2003/0071194 A1 | 4/2003 | Mueller et al. | |
| 2004/0001620 A1 | 1/2004 | Moore et al. | |
| 2004/0056217 A1 | 3/2004 | Harvill et al. | |
| 2004/0140412 A1 | 7/2004 | Hendzel et al. | |
| 2004/0254758 A1 | 12/2004 | Chang | |
| 2005/0263945 A1 | 12/2005 | Kirchhoff et al. | |
| 2010/0131234 A1 * | 5/2010 | Stewart | B02C 4/32 702/152 |
| 2010/0145666 A1 | 6/2010 | Adachi et al. | |
| 2010/0187848 A1 | 7/2010 | Kapoor | |

FOREIGN PATENT DOCUMENTS

| | | |
|---|---|---|
| JP | 58196406 | 11/1983 |
| JP | 2004085541 A | 3/2004 |
| WO | 0138900 A1 | 5/2001 |
| WO | 2003081157 A1 | 10/2003 |
| WO | 03094102 A1 | 11/2003 |
| WO | 2007000010 A1 | 1/2007 |

OTHER PUBLICATIONS

Barratt, D. et al.; International Autogenous and Semiautogenous Grinding Technology 2001; vol. IV of IV; Conference Record from SAG Conference Vancouver 2001; 11 pages.

Dennis, M.; Offer to sale made by M. Dennis of Process Engineering Resources Inc. to L. Furtenbach of Metso Mining and Construction Technology; Dec. 24, 2003; 1 page.

Dennis, M.; Advancement in Liner Measurement; PERIProFiler; 2003; 6 pages.

Dennis, M.; ProFiler Liner Profile Measurement; SMI Tuscon; Dec. 2003; 14 pages.

Gordon, S. et al.; Application of a High-Resolution, Ground-Based Laser Scanner for Deformation Measurements; 10th FIG Symposium on Deformation Measurements; Orange, CA; Mar. 19-22, 2001; pp. 23-32.

Lichti, D.D. et al.; Ground-Based Laser Scanners: Operation, Systems and Application; Geomatica vol. 56, No. 1; 2002; pp. 21-33.

Bae, K. et al.; Automated Registration of Unorganised Point Clouds from Terrestrial Laser Scanners; Conference Paper from XXth ISPRS Congress Technical Commission V; Jul. 12-23, 2004; Istanbul, Turkey; 6 pages.

Leica Geosystems HDS, Inc. Webpage including Press Releases entitled Leica Announces CloudWorx 3.0 for Handling Large Laser Scan Data Sets with CAD and Leica Announces Cyclone 5.1 for New, Ultra-fast Laser Scanner and As Upgrade for Large Base of Cyclone 4.1 Users; 2004; 7 pages.

Jacobs, G.; Extracting Points, Lines, Surfaces, Features & Models from Point Clouds; Professional Surveyor Magazine; Sep. 2004; 6 pages.

Gruen, A. et al.; Least Squares 3D Surface and Curve Matching; ISPRS Journal of Photogrammetry and Remote Sensing, vol. 39, Issue 3; May 2005; pp. 151-174.

International Search Report for International Application No. PCT/AU2005/001630 dated Dec. 21, 2005.

International Preliminary Report on Patentability for International Application No. PCT/AU2005/001630 dated Jun. 7, 2007.

R. Sebring et al., "Non-Contact Optical Three Dimensional Liner Metrology," Proc. 28th IEEE International Conference on Plasma Science / 13th IEEE International Pulsed Power Conference, pp. 1414-1417, Jun. 2001 (4 pages).

EPO Extended Search Report for related application PCT/AU2005/001630 dated Jan. 17, 2012.

Rosario, P.P. et al.; Liner Wear and Performance Investigation of Primary Gyratory Crushers; Science Direct; Minerals Engineering 17; Jun. 1, 2004; pp. 1241-1254.

International Search Report for International Application No. PCT/AU2010/001163 dated Nov. 23, 2010.

International Preliminary Report on Patentability for International Application No. PCT/AU2010/001163 dated Sep. 13, 2011.

EPO Search Report for related application PCT/AU2005/001630 dated Jan. 17, 2012.

An International Search Report for corresponding International Application No. PCT/AU2005/001630 dated Dec. 21, 2005 (3 pages).

An International Search Report for corresponding International Application No. PCT/AU2010/001163 dated Nov. 23, 2010.

Rosario et al., "Linear wear and performance investigation of primary gyratory crushers," Minerals Engineering, vol. 17 (2004), pp. 1241-1254.

* cited by examiner

APPENDIX

Example Laser Scanning Survey Report Sheet

Job Details

| Site Name | Example | Mill ID | Mill X |
|---|---|---|---|
| Scanner Operator | Example | Client Contact Name | Client X |
| Data Acquisition Date | example date | Time | example time |

| Scan filename | example.txt |
|---|---|

Data Processing Results

| Liner | Belly | Feed | Discharge |
|---|---|---|---|
| Number of Scan Points | 2,000,000 | 900,000 | 120,000 |
| Min Liner Thickness Including Gaps | 0.015 m | 0 m | 0 m |
| Max Liner Thickness | 0.200 m | 0.180 m | 0.200 m |
| Mean Liner Thickness | 0.100 m | 0.080 m | 0.080 m |

| Liner | Belly | Feed | Discharge | Belly last 1m* |
|---|---|---|---|---|
| % Scan Points Below 30 mm Liner Thickness | 0.2 | 3.9 | 10.3 | 3.2 |
| % Scan Points Below 50 mm Liner Thickness | 5.9 | 34.4 | 17.4 | 11.0 |
| % Scan Points Below 80 mm Liner Thickness | 50.4 | 71.4 | 46.4 | 52.3 |
| % Scan Points Below 100 mm Liner Thickness | 58.2 | 74.6 | 81.5 | 64.5 |

* special feature for irregularly wearing rodmills, where subsection of belly liner (e.g. discharge end minus 1m) wears most

Data Acquisition

| Angular Extents Vertical | 320 deg | Angular Extents Horizontal | 360 deg |
|---|---|---|---|
| Scan Resolution | 3 pts/cm² | Number of Scan Points | 7,000,000 |

| Number of Repeat Scans | 1 | Averaged | Yes | NA | No | NA |
|---|---|---|---|---|---|---|
| Scanner Calibration Date | Example d. | Calibration Precision | 3 mm | | | |

| Time Elapsed Between Shutdown and Scanning | 24 h | | | |
|---|---|---|---|---|
| Mill Internal Temperature During Scanning | 30 deg | | | |
| Mill External Temperature During Scanning | 30 deg | | | |
| Liner Surface Cover | Clean | X | Muddy | Very Muddy |

Comments

Figure 35A

1. Contour plot of liner thickness (m) at belly

2. Contour plot of liner thickness (m) at feed end

3. Feed end mill liner surface plot showing point locations with less than 30 mm liner thickness 4. Unwrapped shell / belly mill liner surface plot showing point locations with less than 30 mm liner thickness

*5. Histogram of liner thickness for all scan points*

*6. Detailed view of histogram of liner thickness (0 to 40mm)*

*7. Cumulative histogram of liner thickness for all scan points*

*8. Cumulative histogram of scan points up to 40mm distant from the liner back*

9. Cross section through feed end mill liner along a circle of 3.6 to 3.7 m radius as measured from the mill axis 10. Critically worn liner areas below 30mm thickness (in red)

SYSTEM AND METHOD FOR MEASURING AND MAPPING A SURFACE RELATIVE TO A REFERENCE

CROSS REFERENCE TO RELATED APPLICATIONS

This application is a continuation-in-part of pending U.S. patent application Ser. No. 11/994,260, filed Dec. 28, 2007, and pending U.S. patent application Ser. No. 13/395,324, filed May 15, 2012, and claims priority to Australian Patent Application No. 2011905064, filed Dec. 6, 2011. The entire content of each above-referenced application is incorporated herein by reference.

BACKGROUND

The present invention relates to scanning systems and methods for examining surfaces of bodies subject to wear or change over time. The invention has particular, although not exclusive, utility for measuring surfaces and comparing them against historical data to determine whether the surface needs repair or replacement.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The following discussion of the background art is intended to facilitate an understanding of the present invention only. The discussion is not an acknowledgement or admission that any of the material referred to is or was part of the common general knowledge as at the priority date of the application.

In many applications, it is necessary to assess the wear or change of a surface relative to a base or reference. This information can be utilised for various applications, including assessing whether a surface is safe for use, or when a surface requires repair or maintenance as a result of either wear or accumulation of deposits over time.

In certain applications, a liner is often employed as a cost effective means of protecting a base surface from wear or damage. Consequently, the liner takes up wear in preference to the base surface, and is replaced from time to time in lieu of replacing the base surface, which may be more difficult or more expensive to replace.

Assessing the degree of change of a surface, be it with or without a liner, is difficult and/or time consuming in certain environments, such as where the surface is disposed internally within a cavity or compartment of a body, and especially where that body is rotatable. Conventional measurement tools are often inadequate to perform the task, either with respect to the precision of measurement, safety of performing the task, or economic factors associated with downtime of commercial use of the body whilst the measurement task is undertaken.

In some of these environments, liners are used. It is important that liner wear is accurately determined to first ensure the liner is replaced before it wears to a point where it no longer protects the underlying body, and second to maintain the efficiency of the process.

A practical example of the foregoing considerations is in the comminution of minerals within the mining industry. In mineral processing, minerals are extracted from their interlocked state in solid rock by crushing the raw ore into progressively smaller pieces and finally grinding it into a powder. This comminution process is multi-stage, being carried out in a series of crushing then grinding mills, and generally includes transfer chutes to transfer the bulk material.

On the completion of the crushing process, the crushed ore is separated into pieces of a few cm in diameter (actual size depends on the ore type) and may then be fed into rotating cylindrical mills. The rotation of a mill about its axis causes the ore pieces to tumble under gravity, thus grinding the ore into decreasingly smaller fractions. Some types of grinding mills are fitted with grinding bodies such as iron or steel balls (ball mills), steel rods (rod mills) or flint pebbles (pebble mills) which assist in the grinding process. Two specific types of mill are the autogenous mill (AG mill), which operates without any grinding body, and the semi-autogenous mill (SAG mill), in which a small percentage (usually around 10%) of grinding bodies (often steel balls) are added.

A typical mill grinding circuit will comprise a primary grinding system, consisting of a SAG or AG mill and into which the crushed raw ore is fed, and a secondary grinding system, consisting of ball, rod or pebble mills and into which the output from the primary grinding system is fed.

All types of cylindrical mills consist of a cylindrical shell with a feed arrangement at one end and a discharge arrangement on the other. Feed and discharge designs vary. For example, feed chutes and spout feeders are common, whilst screw-type, vibrating drum and scoop-type feeders are also in use. Discharge arrangements are usually classified as overflow, peripheral, grate and open-ended.

The interior of a cylindrical mill is surfaced with a lining designed for the specific conditions of mill operation. Liners can be made of steel, iron, rubber, rubber-steel composites or ceramics. Liners in this application serve two functions:
1. to protect the shell of the mill from damage due to abrasion erosion;
2. to aid grinding performance.

Naturally, mill liners wear through erosion. Normally, chemical solutions that are quite toxic and corrosive to humans and instrumentation alike are introduced into the mill to help with the comminution process. Whilst good liner design can enhance milling efficiency, worn liners have a detrimental effect on milling performance and energy efficiency. Therefore liners must be replaced on a regular basis.

Replacing mill liners requires significant mill downtime which is undesirable from an economic point of view. The downtime is attributable to the time taken to assess the thickness of the liner, and the considerable time needed to replace the liner. Therefore, accurately assessing the thickness of the liner within the mill is of critical importance to the operator. Furthermore, the minimisation of downtime attributable to liner thickness inspection procedures is also desirable.

Taking mills as an example, one method that has been used to determine liner thickness is visual inspection. Once the mill has been stopped and decontaminated, a specialist enters the mill and inspects the liner for cracks, fractures and excessive wear. The problem with this approach is the time consumed in decontaminating the mill, and further, the inaccuracy of relying on the human eye to determine the thickness of an object of which the depth dimension is invisible.

Another method of determining mill liner thickness is via a physical inspection. As is the case with visual inspection, the mill must be stopped and decontaminated before the mill is inspected. A specialist enters the mill and measures the length of nails that have previously been hammered into the liner. As the liner wears faster than the protruding nail, inspection of the length of protrusion provides an indication of wear. The problem with this method is that it is time consuming in terms of mill downtime while decontamination procedures and measurement processes are executed, and further, the inaccuracy of estimating the thickness from measurements of the nail, which itself is subject to wear, against the liner wear. Further, the comparative sparsity of measurement coverage of the liner is also a problem.

Another method of determining mill liner thickness is via acoustic emission monitoring. This method involves monitoring the surface vibrations on the outside of a mill via accelerometer transducers. Estimates are obtained relating to grinding process performance and machine wear analysis. The problem with this approach is that it does not directly measure the mill liner thickness. Rather, it monitors changes in the acoustic output of a mill which could be interpreted as being due to mill liner wear, but could equally be attributable to wear of other parts of the milling machinery.

Another method of determining mill liner thickness is via ultrasonic thickness gauging. It is known by some in the industry to be a well-established technique typically performed using piezoelectric transducers. Ultrasonic gauges measure the time interval that corresponds to the passage of a very high frequency sound pulse through a test material. Sound waves generated by a transducer are coupled into the test material and reflected back from the opposite side. The gauge measures the time interval between a reference pulse and the returning echo. The velocity of sound in the test material is an essential part of the computation. The readings are obtained using a hand-held device which is operated manually within a stationary mill. The operator takes the readings by placing the sensor at selected points on the liner surface. The operator notes the thickness reading and the location on a graphical representation of the mill.

There are several problems with ultrasonic thickness gauging. Firstly, as mentioned previously, the mill must be decontaminated in order for the operator to enter the mill. Secondly, temperature alters sound velocity, and hence calibration is always needed to guarantee accurate readings. Thirdly, it is slow, as each point must be recorded manually. Fourthly, it is difficult to accurately assess liner wear due to the need to ensure that the sensor measurement tool is orthogonal to the mill shell, and the practical difficulty in achieving this.

Taking crushers as another example, before the ore passes to the mills it first passes through one or more crushers. Different types of crushers are used to break large solid materials into smaller pieces for further processing. For example, there exists jaw crushers, gyratory crushers, cone crushers and Cylindrical roll crushers such as High Pressure Grinding Rolls (HPGR). Crushers also have high wear surfaces which are protected by liners.

Gyratory crushers comprise a mantle which rotate in an eccentric relationship to the sides, known as concaves. These surfaces provide the crushing action and are protected by liners.

Over time, the mantle liner and the concave liners of the crusher wear and need replacing in order to maximise crusher efficiency and avoid crusher failure or damages to the crusher.

Mantle liners typically wear out quicker than the concave liners, particularly at the lower section. This can be corrected by adjusting the mantle position upwards during operation so as to maintain a steady or constant Closed Side Setting (CSS). If the CSS is not maintained, then undesired variable product sizes and/or production issues may result. Once the mantle can no longer be adjusted upward, the mantle is typically replaced by a larger size mantle liner so as to match the more worn liners on the concaves in order to maintain the CSS. Larger mantles continue to be installed in this fashion until the concaves need replacement.

Cone crushers function in a similar way, except that mantle and bowl liners are not necessarily relined at different times.

Usually several size mantles are used during the life cycle of one set of concaves. When the concave liners are new, an undersized mantle is used, when they are worn, a normal size mantle replaces the undersized version, and during the later stages of the concaves' life, an oversized mantle is installed. Depending on the site specific circumstances, less than or more than the three above mentioned sizes, or more than three sizes of mantles may be used in combination with one set of concaves, possibly by reusing mantle matched with the previous set of concaves as the next smaller size.

There are existing methods to check the condition of the mantle and concave liners in order to determine whether a crusher reline is necessary.

In most existing methods, there is a need for a person to access the crusher to take manual measurements during an inspection. However, a difficulty arises when the spider and mantle assembly is in place (typically the case for an inspection) as the person cannot access the crusher cavity. Therefore, it is not possible for the person to reach beyond the upper periphery section of the crusher in order to take manual measurements towards the bottom of the crusher, which is the most critical section to be analysed. In light of safety concerns, it is generally an unacceptable safety risk to lower a person in a harness into a crusher cavity when the mantle is still in place. Similarly, access to cone and jaw crushers is equally prohibitive because of their design and the surrounding infrastructure.

In the case of a typical fixed plant crusher, further difficulties arise when a person is required to access the crusher because of the safety requirement to completely clear the dump pocket (ROM bin) from any residual ore in order to get to the crusher itself. This is a major undertaking which is further complicated by the need for confined space isolation. This results in additional downtime, and hence loss in production and revenue.

Examples of existing crusher condition monitoring methods requiring physical access by a person to the crusher include:

Ball Drop Test
Visual or camera inspection
Tape measuring
Ultrasonic Thickness Gauging (UTG)

These existing methods present difficulties as they are only possible to conduct when:
1) The ROM bin is completely cleared of ore;
2) The spider is removed;
3) The mantle/shaft assembly is removed;
4) Confined space isolation for the dump pocket is in place;
5) Confined space isolation for the crusher cavity is in place; and 6) Safety access systems such as steps, ladders, harnesses, scaffolding, and/or custom cavity platforms are available and deployed.

Therefore, with the above existing methods, it is not possible to examine the crusher liners for wear at any time other than during a mantle reline, which is when the mantle/shaft is removed. As a result, it is not possible to examine the crusher liners for wear during an inspection shutdown, when any of items 1) to 6) listed above are not attained. This means that the only time when the mantle liners can be examined with the above existing methods is when the mantle is being relined anyway.

In addition, the above existing methods cannot provide reliable and accurate results, such as timing of reline. For example, the crusher could be relined more frequently than necessary, resulting in loss of production and extra costs.

Another area which experiences significant wear is in the transportation of material. Considering the mining industry in particular, ore at various stages of the processing process are transported through numerous means from the mine to its final destination. To assist in the transportation of the material large systems of conveyor belts are set up. Often the ore is required to travel from one conveyor belt to another. To ensure delivery of the ore between belts a transfer chute guides or redirects the ore to the next belt. This will often mean that the ore will impact on at least one of the walls of the transfer chute. In a similar vain to Crushers and Mills, the impact of the ore on these surfaces causes significant wear. To protect the surfaces from wear, the transfer chutes are lined with liners to protect the chute and to ensure no holes form in the transfer chute.

The design of a transfer chute is tailored to the particular application. As a result transfer chutes and the associated liners are many and varied in regards to their design. It is therefore necessary to monitor the liners on each transfer chute.

Currently the techniques used to monitor liner wear to evaluate liner change out are similar to those employed with mills and crushers. These techniques also face the same problems when monitoring transfer chutes. In particular, access to the internal surfaces of a transfer chute is generally unsafe, requires significant downtime of the conveyor system and has limitations with respect to confined space and working at height considerations.

Generally transfer chute are enclosed and have manholes at various stages to allow visual inspection. As the transfer chutes may be multi-storey there may be several manholes along the chute. These manholes do not allow for adequate surface measurement using known means. As a result it is necessary to construct scaffolding within the chute to allow for access and adequate measurement of the liners. This obviously requires significant time, and means that during the process that part of the conveyor system is inoperable.

Similar issues also apply to other material handling structures and numerous other industries and products. For instance transfer bins and hoppers, vessels. These all have the same inherent problem where it is very difficult to safely measure the wear of the various surfaces.

The following problems result from the inability to adequately monitor wear of surfaces, such as the wear of liners in mills, crushers and transfer chutes and bins:

Lack of awareness of liner wear rates and hence lack of control over change out schedules;

Lack of control over stock ordering of liners;

Lack of quantifiable control over the wear of different liner designs and hence inconclusive liner design comparisons and limitations in design optimization;

Lack of condition monitoring information on liner failures or wear hot spots in time to avoid failure or production issues;

Current condition monitoring methods are too cumbersome;

failure of liner plates can lead to excessive and unplanned downtimes to attend to repairs.

BRIEF SUMMARY

It is an object of the present invention to ameliorate, mitigate or overcome, at least one of the aforementioned problems associated with prior art wear liner measurement or to at least provide the public with a useful choice in an alternative system for wear liner measurement.

It should be appreciated with the above object that, the present invention is in no way limited solely to a particular application. Certainly the process is suited to any surface in which it is required to know the displacement of a surface relative to another, whether the displacement be due to wear or accumulation of a deposit thereon These applications include the measurement of the surface of liners in mills, vessels, crushers, and transfer chutes, bins and other material transport system components. Throughout the specification transfer chutes, bins and other material transport system components are collectively referred to as transfer chutes.

Throughout the specification the term displacement is generally taken to be the distance between a first surface and another object such as a second surface. These surfaces may be part of the same part (e.g. back surface and front surface of an object), part of the same structure (e.g. surface of a first object and a surface of a second object) or the same surface but measured after time has lapsed (e.g., a surface of a non-worn part and the same surface but measured after a time period has passed and the surface has experienced wear).

Throughout the specification reference is generally made to the wear of a surface. However, it is to be understood that the scope of the invention also includes displacement of the surface caused by accumulation of deposits. Such might occur in the marine environment or mining industry where material accumulates on a surface and becomes difficult to remove, thus requiring repair or replacement of the surface.

In accordance with one aspect of the present invention, there is provided a system arranged for measuring the displacement of a surface relative to a base reference, thereof comprising: scanning means to generate point cloud data of the surface relative to a reference point to define a three-dimensional image of the surface; storage means to store base reference data in respect of the base reference; and processing means to process the point cloud data and the base reference data to determine the relative displacement of the surface with respect to the base reference; wherein the processing means comprises:

(i) a referencing means to orientate the point cloud data relative to key reference data of the base surface and transforming the point cloud data and the base reference data into a common co-ordinate system, and (ii) displacement processing means to calculate the displacement between the surface and the base reference using both sets of data in the co-ordinate system.

The surface may be that of a component of a material handling system. The base reference may be a further surface of the material handling system.

Alternatively, the base reference may be the surface before it undergoes displacement. In such an alternative the system would measure the displacement of the surface over time.

Preferably the point cloud data is transformed into the co-ordinate system of the base reference data.

Preferably, the key reference data are a set of critical parameters that describe the geometry of the base reference and the relative boundaries of the surface.

Preferably, the referencing means including a process to locate at least one of the critical parameters of the key reference data within the point cloud data, and a transformation process to transform the point cloud data into the co-ordinate system coinciding with the co-ordinate system of the base reference data so that the location of the one critical parameter mathematically coincides with the location of this same critical parameter in the base reference data.

Preferably, the process is an estimating process to estimate the location of at least one of the critical parameters of the key reference data from the point cloud data.

When the system is used in respect of cylindrical vessels, such as mills, calciners, chlorinators, and autoclaves, the base reference may be a substantially cylindrical shell with opposing ends and the critical parameters may include one or more of the following:
  the location of the central longitudinal axis of the shell;
  the radius of the shell; and
  the length of the cylindrical portion of the shell.

Preferably, the at least one of the critical parameters of the key reference data is the axis of the cylindrical shell.

Preferably, the surface comprises segments and the critical parameters include the distance of the corner points of or separation lines between each segment to one end of the shell.

Preferably, the critical parameters include the distance between a prescribed reference surface and one of the opposing or other ends of the shell, the distance between the prescribed reference surface and the inner liner surface, or the prescribed reference surface and the longitudinal axis.

Preferably, the opposing ends are substantially conical, and the critical parameters include:
  the cone angles of the opposing ends, relative to the axis of the cylindrical shell; and
  the distance between the apexes of the opposing ends.

The system may also be applied to crushers. A crusher generally includes a mantle and concave shell. When the system is used in respect of crushers, the base reference may be the outer wall of the crusher, whereby the critical parameters may include one or more of the following:
  the location of the central longitudinal axis of the concave and the mantle;
  the length and position of the concave shell
  the eccentricity angle of the crusher mantle centre axis;
  the pivot point of the adjustable mantle height setting from the operating system mantle origin When the system is used in respect of transfer chutes, the base reference may be at least one inner surface of the shell of the transfer chute, whereby the critical parameters include one or more of the following:
  the location and orientation of the wall(s) of the shell;
  lined and unlined shell wall surface and surface normal vector;
  dimensions of the liner(s).

Preferably, the processing means includes data editing means to filter spurious point data from the accumulated point cloud data before operation of the referencing means and the displacement processing means.

Preferably, the processing means further includes partitioning means to partition the point cloud data into discrete segments corresponding to different geometric sections of the surface before operation of the referencing means and the displacement processing means.

Preferably in respect of cylindrical vessels, such as mills, calciners, chlorinators, and autoclaves, the displacement processing means: calculates the radius being the orthogonal distance from the axis of the cylindrical shell to a specific observation point; and determines the displacement of the surface relative to the base reference at the specific observation point along the cylindrical shell as the difference between the initial approximate radius of the base reference and the calculated radius.

In respect of crushers the displacement processing means may determine the displacement of the surface relative to the base reference at a point along the concave or mantle axis respectively as the difference between a distal surface point and the correspondent base reference point.

In respect of transfer chutes the displacement processing means may determine the displacement of the surface relative to the base reference of a transfer chute, bin or other material transport system component.

Preferably, the referencing means includes a positioning process to position the point cloud data segments that were discretely partitioned and stored, relative to the base reference.

Preferably, the referencing means includes a positioning process to position the point cloud data segments that were discretely partitioned and stored for the opposing ends of the cylindrical shell, relative to the base reference.

In one aspect of the invention the positioning process:
(i) extracts data pertaining to the distance of the corner points from the point cloud data to determine the location of the corner points (A), the length of the segments (B), the gap between an adjacent segment and the one opposing end of the shell (C), and the longitudinal extent of the shell (D); and
(ii) translates the data along the longitudinal axis or spatially by:
  a. determining the location of all corners within one vertical plane of visible segments all around the shell;
  b. determining the location of gaps between all corners opposing those in a. within one vertical plane of visible segments all around the shell;
  c. determining the halfway plane between planes though points extracted under a. and b.;
  d. determining the position of the base reference at the one opposing end according to the formula: ½ A+B+C; and The process may also comprise the step of determining the position of the base reference at the other opposing end by adding D to the outcome of the formula at d.

In another aspect of the invention, the positioning process:
(i) extracts data pertaining to the distance of the points from the point cloud data to determine the location of those points (A), the length of the segments (B), the gap between an adjacent segment and the one opposing or other end of the shell (C), and the longitudinal extent of the shell (D); and
(ii) translates the data along the longitudinal axis or spatially by:
  a. determining the location on non-wearing areas of liners;
  b. determining and/or applying the thickness of said non-wearing liners.

Preferably, the critical parameters include the distance between a prescribed reference surface and one of the opposing ends of the shell, and the positioning process:

(i) extracts data pertaining to the distance between the prescribed reference surface and the one of the opposing ends of the shell (A'), and the longitudinal extent of the shell (D') from the base reference data; and (ii) translates the data along the longitudinal axis by:
a. determining the position of the base reference at the one opposing end by adding A' to the location of the reference surface in the point cloud data; and
b. determining the position of the base reference at the other opposing end by adding D to the outcome of a. above.

Preferably, the referencing means invokes the estimating process to estimate the critical parameters for the displacement processing means to subsequently determine the thickness of the distal surface relative to the base surface at the opposing ends of the cylindrical shell.

Preferably:
a. the positioning process:
(i) extracts data pertaining to the distance of the corner points from the point cloud data to determine the location of the corner points (A), the length of the segments (B), the gap between an adjacent segment and the one opposing end of the shell (C), and the longitudinal extent of the shell (D); and
(ii) translates the data along the longitudinal axis by:
a. determining the location of all corners within one vertical plane of visible segments all around the shell;
b. determining the location of gaps between all corners opposing those in a. within one vertical plane of visible segments all around the shell;
c. determining the halfway plane between planes though points extracted under a. and b.;
d. determining the position of the base reference at the one opposing end according to the formula: ½ A+B+C; and
e. determining the position of the base reference at the other opposing end by adding D to the outcome of the formula at d; and
b. the estimating process uses a gap point two parallel planes method adopting a simultaneous least squares fit methodology, whereby the loci of the corner points are used to estimate the parameters of the parallel, best-fit planes in order to determine the distance along the longitudinal axis to the base reference at both of the opposing ends of the cylindrical shell.

Preferably, the referencing means includes an orientating process to apply a functional model to orientate the point cloud data relative to the key reference data of the opposing ends and to transform the point cloud of data into a co-ordinate system coinciding with the base reference data for each opposing end, respectively.

Preferably, in the case of the opposing ends being planar or conical, the displacement processing means provides for calculating the displacement between the distal surface and the base reference using both sets of data in the co-ordinate system of the base reference data, the point cloud data being already transformed, commencing with the one end and then the other.

Preferably, the estimating process uses a planar reference surface method adopting a simultaneous least squares fit methodology, whereby the reference surface is planar and data points thereon at the time of acquisition that are positioned by the positioning means and transformed by the transformation process are used to estimate the parameters of a best-fit plane in order to determine the distance along the longitudinal axis to the base reference at both of the opposing ends of the cylindrical shell.

Preferably, the system further includes processing modules to provide for statistical analysis and quality control of the accumulated cloud point data, the processing modules comprising one or more of the following metrics:
(i) covariance matrix of estimated parameters;
(ii) data snooping methods to test and identify least-squares residuals and subsequently remove outlier points;
(iii) root mean square (RMS) and maximum residual;
(iv) estimated variance factor.

Preferably, the processing means includes data editing means to filter spurious point data from the accumulated point cloud data before operation of the referencing means and the displacement processing means.

Preferably, the processing means further includes partitioning means to partition the point cloud data into discrete segments corresponding to different geometrically described sections of the surface before operation of the referencing means and the displacement processing means.

Preferably, the scanning means comprises a laser scanner having:
(i) a transmitter for transmitting laser radiation from the reference point towards the surface;
(ii) a detector proximate to the reference point for detecting reflected laser radiation from the surface; and
(iii) distance processing means to measure the distance between the laser scanner and the surface, and generate point cloud data in respect thereof.

Preferably, the scanning means further includes scanner positioning means to precisely position and orientate the laser scanner in a prescribed manner incrementally about the reference point.

Preferably, the system includes data acquisition means to acquire and accumulate the point cloud data at consecutive incremental orientations of the laser scanner about the reference point to generate the point cloud data three-dimensionally with respect to the surface.

The scanning means may be placed at several reference points and acquire point cloud data at multiple reference points. This would be required where the surface being scanned cannot be entirely scanned from the single reference point, as is the typical case in crushers and transfer chutes.

Where the system is used to measure wear in a cylindrical vessels, such as mills, calciners, chlorinators, and autoclaves, the referencing means may include an estimating process to estimate the axis of the cylindrical shell from the point cloud data, and a transformation process to transform the point cloud data, so that the estimated axis and the central longitudinal axis of the shell mathematically coincide.

Where the system is used to measure wear in a crusher the referencing means includes an estimating process to estimate the axis of the crusher mantle and concave from the point cloud data, and a transformation process to transform the point cloud data, so that the position and placement along the respective estimated and actual axes mathematically coincide.

Where the system is used to measure wear in a transfer chute, the referencing means includes an estimating process to estimate the reference shell of the transfer chute from non-wearing components of the point cloud data, and a transformation process to transform the point cloud data, so that the estimated and actual reference shell of the transfer chute mathematically coincide.

Preferably the transformation process transforms each point from the co-ordinate system of the scanning means into the coordinate system of the base reference Preferably the referencing means invokes the transformation process to transform each point the of the point cloud data, or for the reference surface from the co-ordinate system for the scanning means (x, y, z) into the co-ordinate system of the base reference (X, Y, Z) using the estimated transformation parameters as previously determined.

Preferably the referencing means invokes the estimating process to estimate the critical parameters for the displacement processing means to subsequently determine the displacement of the distal surface relative to the base surface.

Preferably the estimating process uses a gap point two parallel planes method adopting a simultaneous least squares fit methodology, whereby the loci of the corner points are used to estimate the parameters of the parallel, best-fit planes in order to determine the distance to the base reference.

Preferably the referencing means includes an orientating process to orientate said point cloud data relative to said key reference data and to transform the point cloud data into a co-ordinate system coinciding with the base reference data.

Preferably the estimating process uses a temporarily or permanently affixed planar surface or other simple shape as a referencing method, whereby data points thereon at the time of acquisition that are positioned by said positioning means and transformed by said transformation process are used to estimate the parameters to determine the placement or orientation to the base reference.

The system may be used to maintain an optimal Closed Side Setting (CSS) and/or Open Side Setting (OSS) in a crusher by assisting in predicting when the mantle requires to be raised or replaced. Preferably the system provides data to facilitate the timing of adjustments of the mantle in order to maintain CSS and/or OSS of the crusher.

Preferably the scanning means is positioned so as to scan the location of the CSS and/or OSS of the crusher.

Preferably the CSS and/or OSS can be determined by calculating the distance between the concave and mantle liners. The distance may be calculated based on the point cloud data representing the surface of the mantle and the point cloud data representing the surface of the concave liners.

In accordance with another aspect of the present invention, there is provided a system for measuring the displacement of a surface relative to a base reference, wherein differences in measurements of displacement over a time period represents change between the base reference and the surface, the system comprising:
 scanning means to generate point cloud data in respect of a distal surface relative to a reference point to define a three-dimensional image of the surface;
 storage means to store base reference data of the base reference relative to the surface; and
 processing means to process said point cloud data and the base reference data to determine the displacement;
 characterised by the processing means including:
  (i) a referencing means to orientate the point cloud data relative to key reference data of the base reference and transform the point cloud data and base reference data into a common co-ordinate system; and
  (ii) displacement processing means to calculate the displacement using both sets of data in the co-ordinate system.

In accordance with another aspect of the present invention, there is provided a method for measuring the displacement of a surface relative to a base reference thereof, comprising:
 generating point cloud data between a reference point and the surface which is disposed distally from the reference point to define a three dimensional image of the surface;
 determining the location and direction of key reference parameters of the object defined by the three dimensional image;
 obtaining base reference data in a prescribed co-ordinate system in respect of the base reference; and
 processing the point cloud data and the base reference data, orientating the point cloud data relative to the key reference parameters of defined by the base reference data and transforming the point cloud data and the base reference data into a common co-ordinate system.

Preferably, the method includes determining the relative displacement of the surface defined by the point cloud data with respect to the base reference in the co-ordinate system.

In accordance with a further aspect of the present invention, there is provided a system for mapping the displacement of a surface relative to a base reference, thereof comprising:
 data processing means to obtain point cloud data defining a surface in a co-ordinate system coinciding with a base reference and to generate displacement data in respect of the displacement between each point of the point cloud and a related point of the base reference;
 comparison means to compare the displacement data against a prescribed threshold; and
 display means to graphically display the result of the comparison.

Preferably, the display means includes a first format for graphically displaying the point cloud data or the displacement data in a 3D view.

Preferably, the display means includes data manipulation means for unwrapping the point cloud data or the displacement data onto a 2D plane and a second format for graphically displaying same.

Preferably, the second format includes a contour map having different colours or shades representing different magnitudes of displacement relative to the prescribed threshold.

Preferably, the display means includes a third format for calculating a histogram in respect of the displacement data.

Preferably, the display means includes a fourth format for calculating a cumulative distribution histogram in respect of the displacement data.

In accordance with another aspect of the present invention, there is provided a method for mapping the displacement of a surface relative to a base reference, thereof comprising:
 obtaining point cloud data defining a surface in a co-ordinate system coinciding with a base reference;
 generating displacement data in respect of the displacement between each point of the point cloud and a related point of the base reference;
 comparing the displacement data against a prescribed threshold; and
 displaying the result of the comparison.

Preferably, the method includes generating cross-sections of displacement data.

In accordance with another aspect of the present invention, there is provided a method for identifying the wear of a liner which is supported on a base surface, the method measures the displacement of a surface of the liner relative to a base reference, the method comprising:

generating point cloud data between a reference point and the surface which is disposed distally from the reference point to define a three dimensional image of the surface of the liner;

determining the location and direction of key reference parameters of the object defined by the three dimensional image from the point cloud data;

obtaining base reference data in a prescribed co-ordinate system defining the base surface;

orientating the point cloud data relative to key reference parameters defined by the base reference data;

transforming the point cloud data into a co-ordinate system coinciding with the base reference data;

and determining the displacement of the surface of the liner with respect to the base surface.

The base reference may be a base surface which may be in the form of the surface of the unworn liner, the back of liner surface, or another surface of the structure.

In accordance with one aspect of the present invention, there is provided a method for measuring the displacement of a surface relative to a base reference, thereof comprising:

scanning means to generate point cloud data in respect of a measure of the spatial orientation of a distal surface relative to a reference point to define a three-dimensional image of the surface;

storage means to store base reference data in respect of the spatial orientation of a base reference relative to the surface; and processing means to process the point cloud data and the base reference data to determine the relative displacement of the surface with respect to the base reference; wherein the processing means comprises:

(i) a referencing means to orientate the point cloud data relative to key reference data of the base surface and transform the point cloud of data into a co-ordinate system coinciding with the base reference data, and (ii) displacement processing means to calculate the displacement between the surface and the base reference using both sets of data in the co-ordinate system.

BRIEF DESCRIPTION OF THE DRAWINGS

The accompanying drawings illustrate particular features of specific embodiments of the best mode for carrying out the present invention, wherein:

FIGS. 35A, 35B, 35C, 35D, 35E and 35F show an example of a report that can be produced using the mapping means and selected formats for a particular mill.

DETAILED DESCRIPTION

Figure 1:
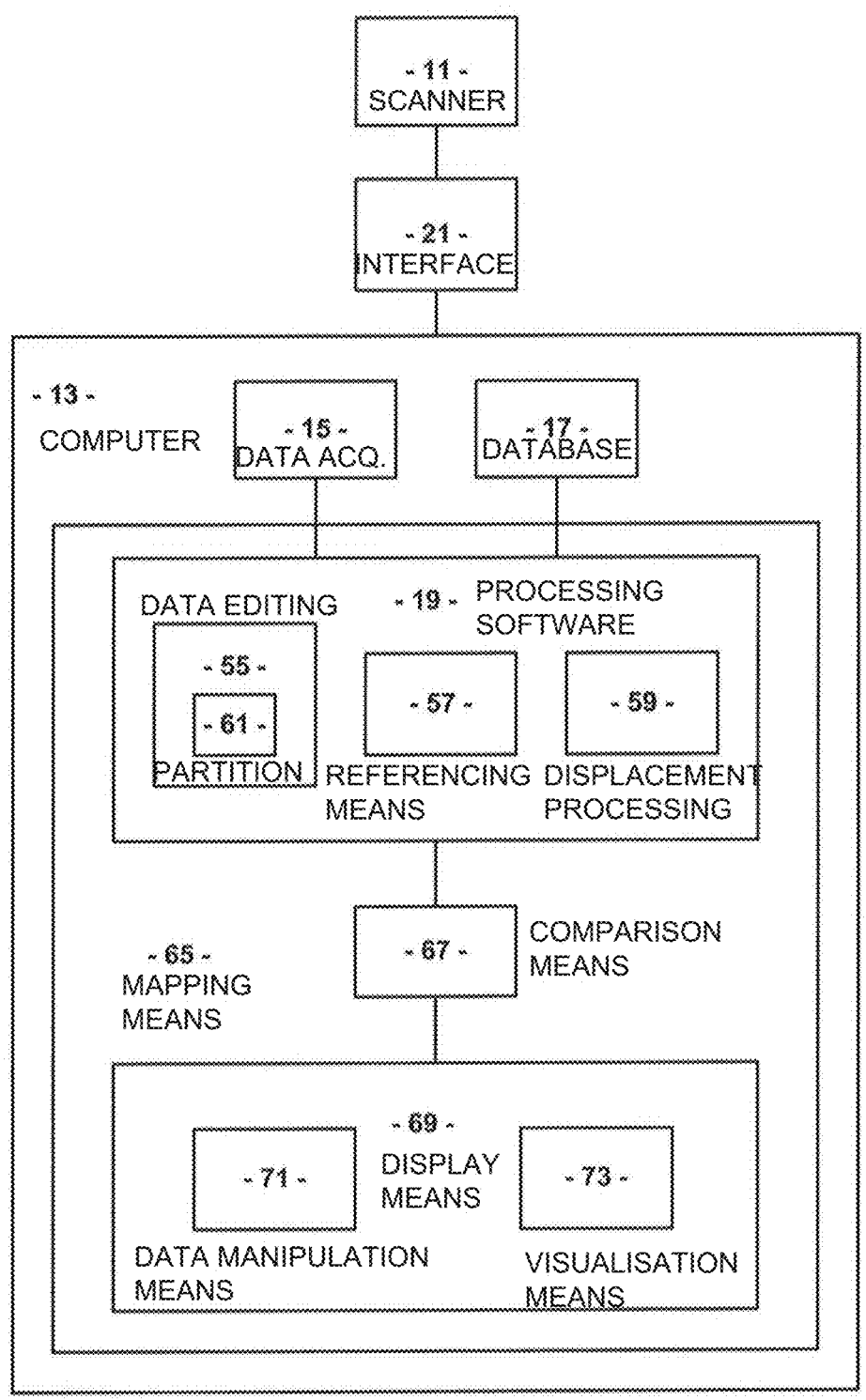
FIG. 1 is a block diagram showing the basic functional components of the system described in the embodiment.

The best mode for carrying out the invention will now be described with reference to several specific embodiment thereof. The description of these embodiment makes reference to the accompanying drawings. Accordingly reference numerals referred to herein are used in the drawings to show the corresponding feature described in the embodiment. The invention is described in relation to three different applications. However, it is to be understood that the applications of this invention are not limited to these three examples.

Millmapper

A first application of an embodiment of the invention is directed towards a system and method specifically adapted for mapping and measuring the thickness of a mill liner provided on the inner surface of a mill for grinding rock and ore therein. The liner is provided to protect the inner surface of the shell of the mill and to assist with the comminution process performed by the mill.

As previously discussed, replacing mill liners is a costly, but necessary, task associated with the operation of a mill.

As shown in FIG. 1, the system essentially comprises:
 scanning means in the form of a terrestrial laser scanner 11;
 computer 13 including:
  data acquisition means 15,
  storage means in the form of a database 17, and
  processing means in the form of processing software 19; and
 interface 21 to interface the computer 13 to the scanner 11.

Figure 2:
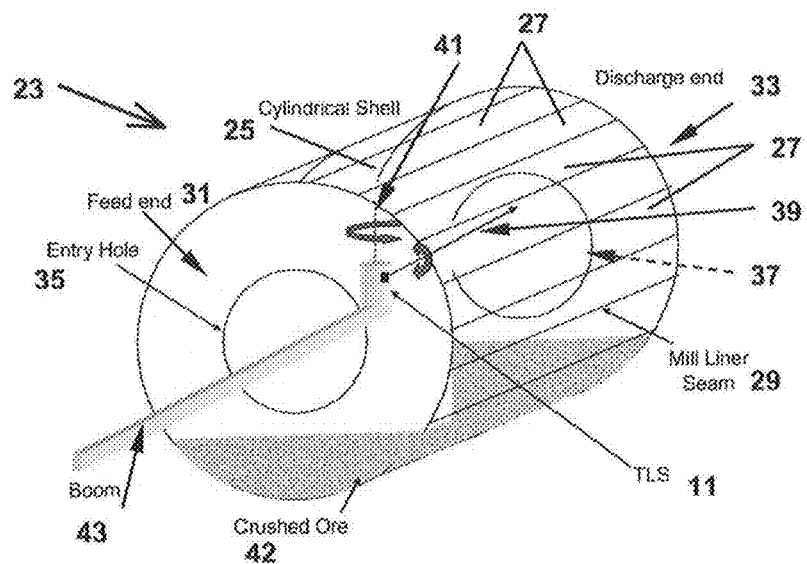
FIG. 2 is schematic diagram showing the setup of the laser scanner within a mill for generating point cloud data in respect of the inner surface of the mill.

As shown in FIG. 2 of the drawings, the laser scanner 11 is used in conjunction with a mill 23 having a cylindrical shell 25, mill liner segments 27 defining mill liner seam lines 29 therebetween, a feed end 31 and a discharge end 33. The feed end 31 has an entry hole 35, and the discharge end 33 is provided with a discharge hole 37.

The laser scanner 11 is a scientific instrument of known design comprising a housing within which is disposed a distance measuring unit (DMU), a mechanism for rotating the distance measuring unit, and scanner electronics interfaced with the DMU and the rotating mechanism for operating the same.

The DMU (not shown) generally comprises:
 a transmitter for transmitting laser radiation through a lens and mirror system from a reference point towards a surface;
 a detector disposed proximate to the reference point for detecting reflected laser radiation from the surface through the lens and mirror system; and
 distance processing means to measure the distance between the laser scanner and the surface, and generate point cloud data in respect thereof.

The distance processing means is embodied in appropriate microprocessor circuitry interfaced with the transmitter and detector and the scanner electronics to operate under software control for providing particular functionality for capturing data and outputting same to the data acquisition means 15 by means of the interface 21. This interface 21, can be any type of landline or wireless network connection accepting data output from the laser scanner 11 and inputting it to the computer 13 for software controlled acquisition and accumulation by the data acquisition means 15.

The terrestrial laser scanner 11 used in the preferred embodiment is a high precision three-dimensional (3D) laser scanner that collects a large amount of precise 3D point measurements to generate point cloud data by directly measuring distance to a remote surface by time of flight laser range-finding. The laser scanner 11 is particularly characterised by the following technical characteristics/specifications:

Able to capture data in a near-spherical field of view (FOV) (i.e., 360° horizontal FOV, 320° vertical FOV)
 Able to capture a dense dataset in the order of several millions of points throughout the full field of view within a few minutes
 Small enough to be fit through the access hole into the mill
 Able to function normally when oriented upside down or its vertical rotation axis is not vertical
 Measurement accuracy of ±3 mm or better
 The distance measurement unit performance is such that the data are not biased by the reflectance properties of the liner surface
 Able to be operated remotely by cable or other means from a distance of several meters
 Able to be pre-calibrated for systematic errors.
 Typically resolution can be adjusted to obtain measurements of point cloud data in a 3D Cartesian co-ordinate system in the order of 45 million points or more at a density in the order of 60 points per square cm, using either pulse or phase difference methods of calculation.

Time of flight is the return propagation time of emitted laser radiation from the transmitter and is measured to calculate the distance from a fixed reference point, which defines the origin of a Cartesian co-ordinate system, to the reflecting surface during sequential scans of the laser scanner 11. Consequently, horizontal and vertical angles at which the laser is emitted are measured and it is from these and the propagation distance that the Cartesian co-ordinates are calculated to provide point cloud data for each point.

The scanner 11 incorporates scanner positioning means to precisely position and automatically orientate the DMU of the laser scanner in an incremental manner about the fixed reference point, performing each of its scans to obtain overall a near spherical coverage of the surrounding environment. Moreover, with reference to FIG. 2, the scanner 11 in the present embodiment performs a series of 320° sweeps about a horizontal axis 39, to obtain point cloud data in respect of the surface of the inner liners of the mill shell. One sweep would commence at a position of 20° from the vertical axis 41, downwardly directed, then sweep though an arc of 320° in a vertical plane, to terminate at a position of 340° downward relative to the vertical axis 41. During this sweep, the point cloud data would be sequentially acquired and accumulated by the data acquisition means.

After completing one sweep, the scanner would rotate angularly about the vertical axis 41, a prescribed increment, and perform another 320° sweep. The angular increments about the vertical axis 41 would continue for successive sweeps until the scanner had completed an entire 180° rotation to generate a near spherical 3D point cloud data.

In practice, setup of the laser scanner 11 involves the mill being stopped and decontaminated to a requisite extent, allowing the residual crushed ore 42 to be safely reposed at the bottom of the shell 25. As the inside of the mill is typically a highly corrosive environment to aid in the comminution process, decontamination is desirable before the laser scanner is placed inside the mill 23.

The laser scanner can be positioned inside the mill by any suitable means, but in the present embodiment a boom 43 to which the scanner 11 is fixedly and rigidly attached is passed through the entry hole 35 to position the scanner centrally within the shell 25. The boom is then rigidly secured at this position to remain stationary during subsequent scanning operations performed by the laser scanner. In other embodiments the scanner can be manually set atop a tripod, although this is not preferred, as this would require a user to enter the mill, which is not desirable for health and safety reasons.

In the present embodiment, the scanner 11 is placed as close to the centre of the mill as possible, although the positioning does not have to be exact.

The scanner 11 is operated remotely via the interface 21 and controlled by scanner operating software provided on the computer 13. This operating software includes the data acquisition means 15.

Data acquisition parameters of this operating software are set to capture 3D data of the inside of the mill surfaces at high spatial resolution (i.e. point spacing) and near-spherical angular field of view, in the manner as previously described.

Once data capture is complete, the scanner is removed from the mill and captured point cloud data are exported from the data acquisition means 15 to an ASCII text file as Cartesian (i.e. X, Y, Z) co-ordinates referenced to the fixed reference point of the internally-defined co-ordinate system of the scanner, and the ASCII test file is stored on the computer 13.

These data are subsequently imported into the processing software 19 provided on the computer for processing with base reference data stored on the database 17 to determine the relative displacement of the surface of the mill liners with respect to the base reference, which will now be described below in greater detail.

Figure 3:
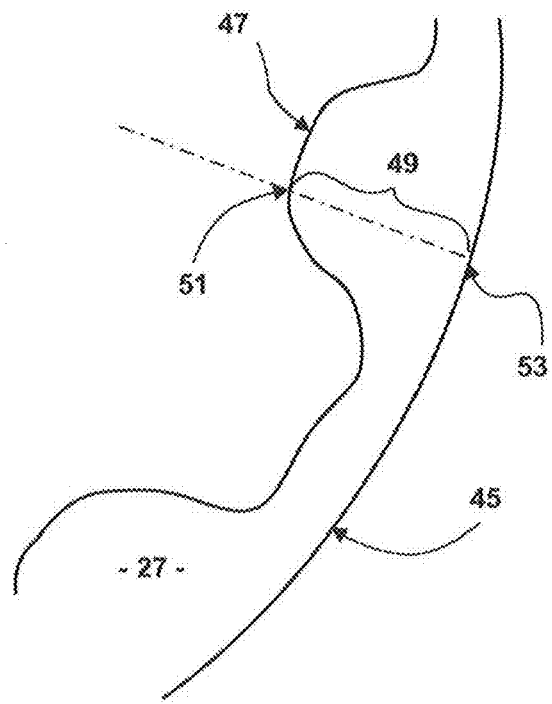
FIG. 3 is a fragmentary sectional diagram showing the relative profile of the inner surface of the cylindrical shell to the front surface of the liner and the displacement measurement obtained for determining the thickness of the liner.

The database 17 of the computer is designed to store base reference data in respect of a base reference specified for the particular mill being scanned. As shown in FIG. 3, this base reference in the present embodiment is the inner surface 45 of the shell 25 on which the mill liner segments 27 are affixed. The mill liners thus define a mill liner surface 47 that is distally spaced and thus displaced relative to the base reference, being the inner surface 45, defined by the base reference data. This displacement 49, shown with respect to one point 51 of the point cloud of data for which point cloud data is acquired from the laser scanner, corresponds to the thickness of the liner segment 27 at that point relative to the position 53 of the inner surface 45 of the shell orthogonally adjacent thereto. This position 53 is obtained from the base reference data stored in the database.

The base reference data may be obtained from a CAD model of the mill or from a scanning of the internal shell without the liners in place, and thus is referenced to its own co-ordinate system, the X-axis of which is defined by the longitudinal axis of the mill. Thus the base reference data is characterised by certain key reference data comprising critical mill parameters that describe the geometry of the base reference of the mill, namely the location of the central longitudinal axis of the cylindrical shell, the shell radius and the length of the cylindrical portion of the shell.

Figure 4:
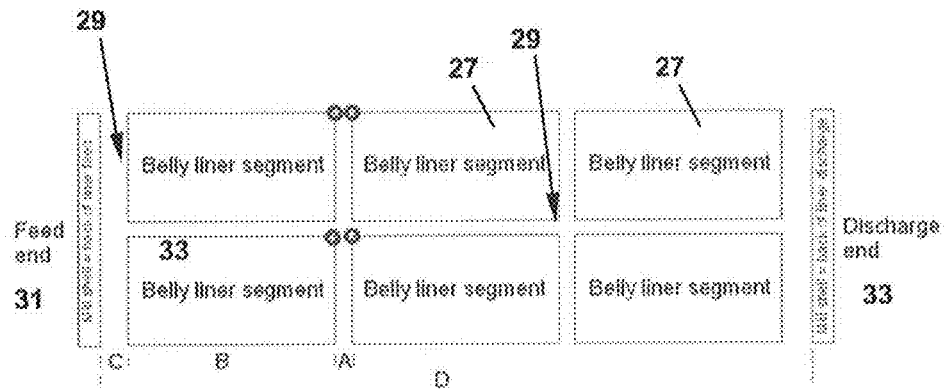
FIG. 4 is a schematic diagram of the principal components of the mill showing the gaps that need to be determined for performing the first method of calculating the liner thickness at the feed and discharge ends.
Figure 5:
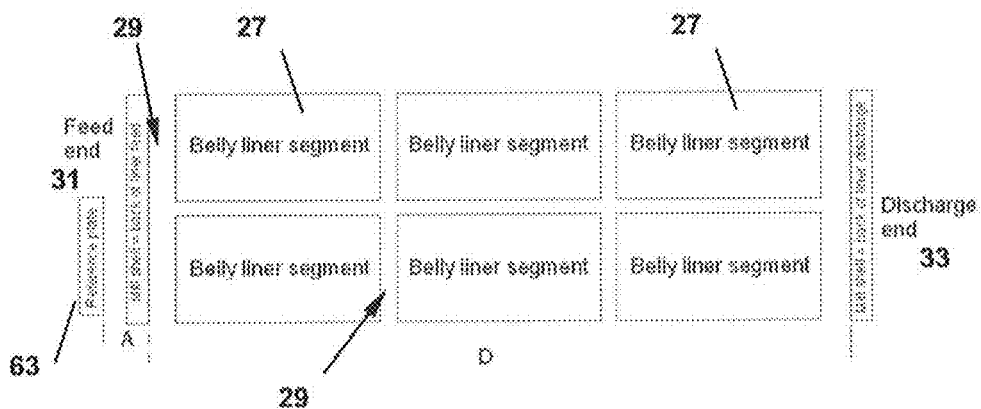
FIG. 5 is a schematic diagram of the principal components of the mill showing the gaps that need to be determined for performing the second method of calculating the liner thickness at the feed and discharge ends.

In the present embodiment, the database 17 is maintained with critical mill parameters for each mill, which will vary from mill to mill depending upon the particular mill shape and configuration. In the case of a mill having a shell configuration as shown in FIG. 2, and as shown diagrammatically in FIGS. 4 and 5, the critical mill parameters stored in the database are:

the radius of the mill from the central axis to the back of the liner (BOL) that corresponds to the inner surface 45 of the cylindrical portion or belly of the shell, the distance of the corner points within the belly liner seam lines 29 to the feed end 31 (hereafter called the FD corner points), the length of the mill between the feed end 31 BOL and discharge end 33 BOL (see FIG. 4), and/or the distance between a placed and scanned reference surface and the BOL feed or discharge end (see FIG. 5).

For mills with conical rather than planar ends, the cone angle relative to the cylinder axis and distance between feed and discharge end apexes are also required.

The base reference data for the database is created a priori from either mill CAD models provided for the mill or a scan of a liner-less shell.

The co-ordinate system of the displacement data obtained by the laser scanner is referenced to the reference point of the laser scanner, whereas the base reference data for the mill is referenced to its own co-ordinate system related to the geometry of the mill. Therefore in order to derive accurate displacement data indicative of the mill liner segment thickness at any particular point, the two sets of data need to be correlated. Accordingly, an important aspect of the processing software 19 is to provide for this correlation.

Thus, as also shown in FIG. 1, the processing software 19 generally comprises a number of notional processes including data editing means 55, referencing means 57 and displacement processing means 59.

Since the laser scanner 11 collects data in a near spherical field of view, the raw point cloud data accumulated by the data acquisition means 15 also contains spurious points from outside the mill, collected when the laser beam passes through the holes 35 and 37 in the feed and discharge ends, respectively. These unwanted points are first filtered out from the accumulated point cloud data by the data editing means 55.

The data editing means 55 also includes partitioning means 61 to partition the point cloud data into discrete segments corresponding to different geometrically described sections of the BOL surface 45 before operation of the referencing means 57 and the displacement processing means 59.

The segments of the point cloud representing the cylinder (belly) 25, feed end 31 and discharge end 33 sections of the mill correspond to different geometrically described sections and are thus separated at this stage so that they can be processed individually.

The referencing means 57 provides for the orientation of the point cloud data relative to the critical mill parameters and the transformation of the point cloud of data into the co-ordinate system coinciding with the base reference data.

As discussed, the scanner data are referenced to the internal co-ordinate system of the instrument, which is not aligned with that of the CAD model of the mill. Since the model serves as the reference for liner thickness computations, it is necessary to transform the observed point data into a co-ordinate system such that it coincides with that used for the reference data of the shell. The transformation parameters are unknown and must therefore be estimated from the data.

The referencing means 57, as a first step, includes an estimating process to estimate the cylinder axis from the point cloud data and a transformation process to transform the data so that this axis and that of the CAD model reference data, mathematically coincide. Liner thickness can then be computed, as a second step, for each point by the displacement processing means 59.

To estimate the cylinder axis and orientate the point cloud data to the base reference data of the CAD model, the estimation process is programmed to implement an algorithm based on the following mathematical modelling.

The functional model adopted for a point, p, lying on an unbounded circular cylinder with its axis nominally aligned with the x-axis is:

$$Y_p^2 + Z_p^2 - r^2 = 0$$

where:

$$\begin{vmatrix} X_p \\ Y_p \\ Z_p \end{vmatrix} = \begin{vmatrix} \cos\kappa & \sin\kappa & 0 \\ -\sin\kappa & \cos\kappa & 0 \\ 0 & 0 & 1 \end{vmatrix} \begin{vmatrix} \cos\varphi & 0 & -\sin\varphi \\ 0 & 1 & 0 \\ \sin\varphi & 0 & \cos\varphi \end{vmatrix} \begin{vmatrix} x_p - x_m \\ y_p - y_c - y_m \\ z_p - z_c - z_m \end{vmatrix}$$

$$= \begin{vmatrix} \cos\kappa\cos\varphi & \sin\kappa & -\cos\kappa\sin\varphi \\ -\sin\kappa\cos\varphi & \cos\kappa & \sin\kappa\sin\varphi \\ \sin\varphi & 0 & \cos\varphi \end{vmatrix} \begin{vmatrix} x_p - x_m \\ y_p - y_c - y_m \\ z_p - z_c - z_m \end{vmatrix}$$

and the cylinder parameters are:
r cylinder radius
$y_c$, $z_c$ cylinder position in y and z directions
$\varphi$, $\kappa$ rotation angles of cylinder about y and z axes
$x_m$, $y_m$, $z_m$ co-ordinates of centroid (mean position of all belly liner points; subtracted to improve numerical stability).

The definitions used by the estimating process for working the model are:
the vector of u (where u=5) parameters such that:

$$\underset{u,1}{x} = |\, r \quad y_c \quad z_c \quad \varphi \quad \kappa^T\,|$$

the vector of n 3D co-ordinate observations on the surface of the cylinder so that:

$$\underset{n,1}{b} = |\, x_1 \quad y_1 \quad z_1 \quad x_2 \quad y_2 \quad z_2 \quad \ldots \quad x_m \quad y_m \quad z_m \,|^T$$

where n=3m, and m is the number of observed points.
The least-squares solution methodology is then applied whereby:
the Functional notation is represented by:

$$f(x,b) = Y^2 + Z^2 - r^2 = 0$$

and linearisation is provided by the truncated Taylor series:

$$f(x, b) \approx f(x^0, b) + \frac{\partial f}{\partial x}\hat{\delta} + \frac{\partial f}{\partial b}\hat{r}$$

$$= \underset{m,1}{w} + \underset{m,u,1}{A\,\hat{\delta}} + \underset{m,n,1}{B\,\hat{r}}$$

$$= \underset{m,1}{0}$$

where
$x^0$ is the vector of approximate parameter values. For $y_c$, $z_c$ and $\varphi$, $\kappa$, these are assumed to be zero. For r, the reference surface radius of the belly liner is used ($r^0$)
$w = f(x^0, b)$ is the vector of m cylinder functions (one per point) evaluated at the approximate parameter values and observation point co-ordinates $$A = \frac{\partial f}{\partial x}$$

is the Jacobian matrix of partial derivatives of the cylinder function taken with respect to each of the five parameters $$B = \frac{\partial f}{\partial b}$$

is the Jacobian matrix of partial derivatives of the cylinder function taken with respect to each observed point co-ordinate
$\hat{\delta}$ is the vector of corrections to the approximate parameter values
$\hat{r}$ is the vector of observation residuals.

The least squares solution of $\hat{\delta}$ is then:

$$\underset{u,1}{\hat{\delta}} = -\left(\underset{u,m}{A^T}\left(\underset{m,n,n}{B}\underset{n,n}{P^{-1}}\underset{n,m}{B^T}\right)^{-1}\underset{m,u}{A}\right)^{-1}\underset{u,m}{A^T}\left(\underset{m,n,n}{B}\underset{n,n}{P^{-1}}\underset{n,m}{B^T}\right)^{-1}\underset{m,1}{b}$$

$$= -N^{-1}u$$

where P is the (diagonal) weight matrix of observations, and the observation weight is the reciprocal of the variance.

$$\hat{x} = x^0 + \hat{\delta}$$

The updated parameter estimates then become:
providing a solution which is iterated using Newton's method until all elements of the parameter correction vector are insignificant.

The referencing means 57 subsequently transforms each point from the scanner co-ordinate system (x, y, z) into the mill system (X, Y, Z) using the transformation process wherein the estimated transformation parameters are:

$$\begin{vmatrix} X_p \\ Y_p \\ Z_p \end{vmatrix} = \begin{vmatrix} \cos\kappa\cos\varphi & \sin\kappa & -\cos\kappa\sin\varphi \\ -\sin\kappa\cos\varphi & \cos\kappa & \sin\kappa\sin\varphi \\ \sin\varphi & 0 & \cos\varphi \end{vmatrix} \begin{vmatrix} x_p - x_m \\ y_p - y_c - y_m \\ z_p - z_c - z_m \end{vmatrix}$$

Note that the X axis coincides with the cylinder axis.

The displacement processing means 59 then provides for calculating the displacement between the liner segment surface and the base reference using both sets of data in the co-ordinate system of the base reference data.

Moreover, the radius (orthogonal distance from the cylinder axis to observation point) at point p is calculated as:

$$r_p^c = \sqrt{Y^2 + Z^2}$$

The liner thickness at point p is then the difference between the initial approximate radius (the radius of the reference surface of the belly liner) and the calculated radius $$t_p^{liner} = \delta r = r^0 - r_p^c$$

After the liner thickness for the belly section is calculated, the liner thickness for the feed and discharge ends also needs to be calculated.

To calculate liner thickness at the feed and discharge ends, it is necessary to not only transform, but position the point cloud data segments that were discretely partitioned and stored for these ends by the partitioning means 61, relative to the BOL surfaces, constituting the base reference data for the feed and discharge ends, along the cylinder axis. This can be done by the referencing means including a positioning process that is programmed to operate in accordance with one of two methods:

Extraction of the belly liner gap points (FD corners) from the scanner data.

Inclusion of a planar feature placed at a known (relative to the BOL surface) location in or near the mill at the time of data acquisition.

Having regard to FIG. 4, the first method, known as the gap point two parallel plane method, requires the positioning process to determine the gap points A, the length of the belly liner segments B, the gap C between the end of an adjacent belly liner segment and the feed end, and the overall longitudinal extent D of the belly of the mill.

The along-axis distance of the gap points A to D from the feed and discharge ends can be obtained from the base reference data of the CAD plan of the mill, or determined by scans of the mill without the liners for the feed and discharge ends of the mill in place, i.e. by scanning the bare mill shell which corresponds with the back of liner (BOL) before taking into account possible rubber backing. Once these data are obtained, an along-axis translation is able to be computed.

Essentially, the method involves:

Determining the gap points at all corners within one vertical plane (i.e. left hand circles depicted in FIG. 4) of visible belly liner segments all around the mill cylinder by extraction from scan cloud;

Determining gap points at all corners opposing those in a) within one vertical plane (i.e. right hand circles depicted in FIG. 4) of visible belly liner segments all around the mill cylinder by extraction from scan cloud;

Determining the halfway plane between planes though points extracted under a) and b);

Determining BOL feed position=½A+B+C

Determining BOL discharge=BOL feed+D.

Variations that may need to be accommodated in different mill designs to that shown in FIG. 4 may include belly liner segments shaped different to a rectangle (view at liner surface), e.g. trapezoid. C may comprise a physical gap, a filler ring or any other mill specific element.

With respect to the second method, known as the planar feature point method, as shown in FIG. 5, a feature or reference plate 63 is disposed at the entry hole 35 of the feed end 31 and the positioning process determines dimensions: A' pertaining to the distance between the reference plate and the inner surface of the feed end; and D' pertaining to the longitudinal extent of the cylindrical shell or belly; either by extraction from CAD models of mills or determination from scans of the mill without liners in place, i.e. by scanning the bare mill shell which corresponds with the back of liner (BOL) before taking into account possible rubber backing.

The method then entails:

Scanning of mill for wear monitoring after reference plate is positioned at known distance A'

Determination of BOL feed=Reference plate plane+ A'

Determination of BOL discharge=BOL feed+D'

Variations that may need to be accommodated in different mill designs to that shown in FIG. 5 may include the reference plate 63 being positioned at any other location, the reference plate being an object of other than planar shape, the mill ends being flat, conic, or of any other shape, and variations in liner element arrangement.

In the present embodiment, the processing software 19 can be used to determine liner thickness for either of two types of mill end: planar and conical.

Regardless of the method used, the referencing means again invokes the transformation process to transform each point (for the feed end data, discharge end data, and the reference plate placed in or on the mill) from the scanner co-ordinate system (x, y, z) into the mill system (X, Y, Z) using the estimated transformation parameters as previously determined during the belly processing and mathematically represented as:

$$\begin{vmatrix} X_p \\ Y_p \\ Z_p \end{vmatrix} = \begin{vmatrix} \cos\kappa\cos\varphi & \sin\kappa & -\cos\kappa\sin\varphi \\ -\sin\kappa\cos\varphi & \cos\kappa & \sin\kappa\sin\varphi \\ \sin\varphi & 0 & \cos\varphi \end{vmatrix} \begin{vmatrix} x_p - x_m \\ y_p - y_c - y_m \\ z_p - z_c - z_m \end{vmatrix}$$

Thereafter the algorithm for the referencing means follows one of two branches dependent on the shell type (planar or conical) and the particular method adopted (the gap point two parallel planes or planar feature methods referred to above) and invokes the estimating process to estimate the critical parameters applicable to the particular method. The planar feature method is generally the preferred method, although this depends on whether a reference plane is able to be setup or defined for the mill measurements, due to the fewer gap points that need to be determined from the reference data.

In the case of choosing the gap point two parallel planes method for a shell with planar ends, the referencing means uses a simultaneous least-squares fit methodology.

Here, the FD corner point loci are used to estimate the parameters of the parallel, best-fit planes in order to determine the along-axis, BOL distance to the feed and discharge ends.

The referencing means 57 then proceeds using an orientating process to apply the following functional model to orientate the point cloud data relative to key reference data of the feed and discharge ends and to transform the point cloud of data into a co-ordinate system coinciding with the base reference data for the feed and discharge ends respectively.

For a point, p, lying on unbounded plane 1 (plane closest to the feed end), the functional model is represented by:

$$ax_p + by_p + cz_p = d_1$$

The functional model for a point, q, lying on unbounded plane 2 (plane closest to the discharge end) that is parallel to plane 1, is represented by:

$$ax_q + by_q + cz_q = d_2$$

where:
a, b, c are the direction cosines common to planes 1 and 2
$d_1$, $d_2$ are the distances of the planes from the origin.
The definitions used for working the model are:
Let the vector of u (where u=5) parameters be the direction cosines plus the two distance parameters:

$$\underset{u,1}{x} = |a \quad b \quad c \quad d_1 \quad d_2|^T$$

Let the vector of n "point-on-plane" observations conditions be 1 and where n=p+q, and p and q is the number of observed points on planes 1 and 2, respectively.
Applying the least-squares solution methodology:
Functional notation:

$$b = f(x)$$

Linearisation by truncated Taylor series:

$$b + \hat{r} \approx f(x^0) + \frac{\partial f}{\partial x}\hat{\delta}$$

$$\hat{r} = f(x^0) - b + \frac{\partial f}{\partial x}\hat{\delta}$$

$$\underset{n,1}{\hat{r}} = \underset{n,1}{w} + \underset{n,uu,1}{A\,\hat{\delta}}$$

The following weighted constraint is required to enforce unit length of the direction cosine vector:

$$g(x) = a^2 + b^2 + c^2 = 1$$

The linearised form of constraint equation is given by:

$$\hat{r}_c = g(x^0) + \frac{\partial g}{\partial x}\hat{\delta}$$

$$\underset{1,1}{\hat{r}_c} = \underset{1,1}{w_c} + \underset{1,u\,u,1}{G_c\,\hat{\delta}}$$

where:

$$G_c = G_c = \frac{(\partial g)}{(\partial x)}$$

is the Jacobian matrix of partial derivatives of the constraint equation with respect to the plane parameters;
$w_c$ is the evaluated constraint equation; and
$\hat{r}_c$ is the constraint residual.
The least squares solution of $\hat{\delta}$ is then:

$$\hat{\delta} = (A^T P A + G^T P_c G)^{-1}(A^T P w + G^T P_c w_c)$$

$P_c$ is the (scalar) weight matrix of constraints, and is chosen such that $P_c \gg$ the elements of P.
Updated parameter estimates become:

$$\hat{x} = x^0 + \hat{\delta}$$

The solution is iterative using Newton's method until all elements of the parameter correction vector are insignificant.
The displacement processing means 59 then provides for calculating the displacement between the liner segment surface and the base reference using both sets of data in the co-ordinate system of the base reference data, commencing with the feed end. The point cloud data are already transformed and the calculation proceeds as follows:
1. The position of the BOL surface (plane) along the cylinder (X) axis is:

$$d_f = \frac{d_1 + d_2}{2} + D$$

where D is the distance from the midpoint of the FD corner points to the feed end datum measured along the cylinder axis (derived from the CAD model).
2. For a point S on the surface of the feed end, the mill liner thickness is calculated as:

$$t_S^{liner} = X_S - d_f$$

The displacement processing means 59 then proceeds with calculating the liner thickness at the discharge end as follows:
1. The position of the BOL surface (plane) along the cylinder (X) axis is:

$$d_d = L + d_f$$

where L is the distance between discharge end and feed end BOLs measured along the cylinder axis (derived from the CAD model).
2. For a point S on the surface of the feed end, the mill liner thickness is calculated as:

$$t_S^{liner} = X_S - d_d$$

In the case of choosing the planar feature point method for a shell with planar ends the referencing uses a simultaneous least-squares fit methodology again.
According to this methodology, the measured data points on the planar feature placed into the mill at the time of acquisition are extracted and transformed (as described). These data are used to estimate the parameters of a best-fit plane in order to determine the along-axis, BOL distance to the feed and discharge ends.
The referencing means 57 proceeds with applying the following functional model.
For a point, p, lying on unbounded plane 1 (plane closest to the feed end) the functional model is represented by:

$$ax_p + by_p + cz_p = d$$

where:
a, b, c are the direction cosines common to plane 1
d is the distance of the plane from the origin.
The definitions used for working the model are:
Let the vector of u (where u=4) parameters be the direction cosines plus the two distance parameters $$\underset{u,1}{x} = |a \quad b \quad c \quad d|^T$$

Let the vector of n "point-on-plane" observations conditions be b and where n=p (p is the number of observed points on the plane).
Applying the least-squares solution methodology:
Functional notation:

$$b = f(x)$$

Linearisation by truncated Taylor series:

$$b + \hat{r} \approx f(x^0) + \frac{\partial f}{\partial x}\hat{\delta}$$

$$\hat{r} = f(x^0) - b + \frac{\partial f}{\partial x}\hat{\delta}$$

$$\hat{r}_{n,1} = w_{n,1} + A_{n,uu,1}\hat{\delta}$$

The following weighted constraint is required to enforce unit length of the direction cosine vector:

$$g(x) = a^2 + b^2 + c^2 = 1$$

The linearised form of constraint equation is given by:

$$\hat{r}_c = g(x^0) + \frac{\partial g}{\partial x}\hat{\delta}$$

$$\hat{r}_{c_{1,1}} = w_{c_{1,1}} + G_{c_{1,uu,1}}\hat{\delta}$$

where:

$$G_c = G_c = \frac{\partial g}{\partial x}$$

is the Jacobian matrix of partial derivatives of the constraint equation with respect to the plane parameters;
$w_c$ is the evaluated constraint equation; and
[equation] is the constraint residual.

The least squares solution of $\hat{\delta}$ is then:

$$\hat{\delta} = (A^T P A + G^T P_c G)^{-1}(A^T P w + G^T P_c w_c)$$

$P_c$ is the (scalar) weight matrix of constraints, chosen such that $P_c \gg$ the elements of P.

Updated parameter estimates become:

$$\hat{x} = x^0 + \hat{\delta}$$

The solution is iterative using Newton's method until all elements of the parameter correction vector are insignificant.

The displacement processing means 59 then computes the liner thickness from the already transformed points as follows:

Firstly for the feed end calculations
1. The position of the BOL surface (plane) along the cylinder (X) axis is:

$$d_f = d + D$$

where D is the distance from the location of the planar feature location to the feed end datum measured along the cylinder axis (derived from the CAD model)

2. For a point S on the surface of the feed end, the mill liner thickness is calculated as:

$$t_S^{liner} = X_S - d_f$$

The discharge end calculations are then performed:
1. The position of the BOL surface (plane) along the cylinder (X) axis is:

$$d_d = L + d_f$$

where L is the distance between discharge end and feed end BOLs measured along the cylinder axis (derived from the CAD model)

2. For a point S on the surface of the discharge end, the mill liner thickness is calculated as:

$$t_S^{liner} = X_S - d_d$$

In the case of using the gap point two parallel planes method for a shell having conical ends a simultaneous least-squares fit methodology is followed. The referencing means 57 performs the estimation of the parallel plane parameters in the same manner as previously described for the planar end shell.

The displacement processing means 59, however, computes the liner thickness from the already transformed points as follows:

Firstly for the feed end calculations:
1. Position of the apex of the BOL cone surface along the cylinder (X) axis:

$$d_f = \frac{d_1 + d_2}{2} + D$$

where D is the distance from the midpoint of the FD corner points to the feed end cone apex measured along the cylinder axis (derived from the CAD model).

2. For each point S on the feed end surface, perform the following translation along the x-axis (cylinder axis) to the cone apex:

$$\begin{vmatrix} X'_S \\ Y'_S \\ Z'_S \end{vmatrix} = \begin{vmatrix} X_S - d_f \\ Y_S \\ Z_S \end{vmatrix}$$

3. Given the equation of the cone (with origin at its apex):

$$Y'^2 + Z'^2 = m^2 X'^2$$

where m is the slope of the cone calculated from the cone angle $\theta$ (derived from the CAD model) as:

$$m = \tan\theta$$

The mill liner thickness (orthogonal distance to cone surface) at point S is then calculated as:

$$t_S^{liner} = \frac{mX'_S - \sqrt{Y'^2_S + Z'^2_S}}{\sqrt{1+m^2}}$$

Then the discharge end calculations are performed:
1. The position of the apex of the BOL cone surface along the cylinder (X) axis is:

$$d_d = L + d_f$$

where L is the distance between discharge end and feed end cone apexes measured along the cylinder axis (derived from the CAD model).

2. For each point S on the discharge end surface, perform the following translation along the x-axis (cylinder axis) to the cone apex:

$$\begin{vmatrix} X'_S \\ Y'_S \\ Z'_S \end{vmatrix} = \begin{vmatrix} X_S - d_d \\ Y_S \\ Z_S \end{vmatrix}$$

3. Given the equation of a cone (with origin at its apex):

$$Y'^2 + Z'^2 = m^2 X'^2$$

where m is the slope of the cone calculated from the cone angle $\theta$ (derived from the CAD model) as:

$$m = -\tan \theta$$

the mill liner thickness (orthogonal distance to cone surface) at point S is calculated as:

$$t_S^{liner} = \frac{mX_S' - \sqrt{Y_S'^2 + Z_S'^2}}{\sqrt{1+m^2}}$$

In the case of using the planar feature point data method for a shell having conical ends a simultaneous least-squares fit methodology is also followed. The referencing means 57 performs the estimation of the plane parameters as previously described for gap point two parallel plane method used for a planar end shell.

The displacement processing means 59, however, computes the liner thickness from the already transformed points as follows:

Firstly for the feed end calculations:

1. Position of the apex of the BOL cone surface along the cylinder (X) axis:

$$d_f = d + D$$

where D is the distance from the location of the planar feature location to the feed end cone apex measured along the cylinder axis (derived from the CAD model).

2. For each point S on the feed end surface, perform the following translation along the x-axis (cylinder axis) to the cone apex:

$$\begin{vmatrix} X_S' \\ Y_S' \\ Z_S' \end{vmatrix} = \begin{vmatrix} X_S - d_f \\ Y_S \\ Z_S \end{vmatrix}$$

3. Given the equation of a cone (with origin at its apex):

$$Y'^2 + Z'^2 = m^2 X'^2$$

where m is the slope of the cone calculated from the cone angle $\theta$ (derived from the CAD model) as:
m=tan $\theta$ the mill liner thickness (orthogonal distance to cone surface) at point S is then calculated as:

$$t_S^{liner} = \frac{mX_S' - \sqrt{Y_S'^2 + Z_S'^2}}{\sqrt{1+m^2}}$$

The discharge end calculations are then performed as:

1. The position of the apex of the BOL cone surface along the cylinder (X) axis is:

$$d_d = L + d_f$$

where L is the distance between discharge end and feed end cone apexes measured along the cylinder axis (derived from the CAD model).

2. For each point S on the discharge end surface, perform the following translation along the x-axis (cylinder axis) to the cone apex:

$$\begin{vmatrix} X_S' \\ Y_S' \\ Z_S' \end{vmatrix} = \begin{vmatrix} X_S - d_d \\ Y_S \\ Z_S \end{vmatrix}$$

3. Given the equation of the cone (with origin at its apex):

$$Y'^2 + Z'^2 = m^2 X'^2$$

where m is the slope of the cone calculated from the cone angle $\theta$ (derived from the CAD model) as:

$$m = -\tan \theta$$

The mill liner thickness (orthogonal distance to cone surface) at point S is then calculated as:

$$t_S^{liner} = \frac{mX_S' - \sqrt{Y_S'^2 + Z_S'^2}}{\sqrt{1+m^2}}$$

The processing software 19 also provides for statistical analysis and quality control using appropriate software processing modules.

In the present embodiment the following metrics are rigorously calculated for the cylinder and plane fit processes for quality assurance of the liner thickness computations:

1. Covariance matrix of estimated parameters: standard deviations that indicate parameter precision and the correlation coefficient between parameters that can flag weak geometry are analysed;

2. Least-squares residuals are tested using data snooping methods to identify and subsequently remove outlier points. Root mean square (RMS) and maximum residual metrics are also calculated;

3. The estimated variance factor is used as a further indicator of the presence of outliers and/or incorrect weight matrix selection.

A check is also made of the plane (parallel and individual) direction cosine parameters, a, b and c. Due to the point transformation using the rotation matrix from the cylinder fit, M, the first parameter (a) should be unity and the others (b and c) equal to zero. Differences from idealised values are analysed for numerical significance.

The results of all of the aforementioned metrics are logged at various stages of processing as quality assurance (QA) measures to ensure data integrity.

An important advantage of the present embodiment is that the mill dataset ultimately obtained can be used to yield a comprehensive statistical and graphical report to the user. As shown in FIG. 1, the system includes mapping means 65 to provide the user with a number of different formats for reporting the results of the scan on completion of the thickness computations.

Figure 6:
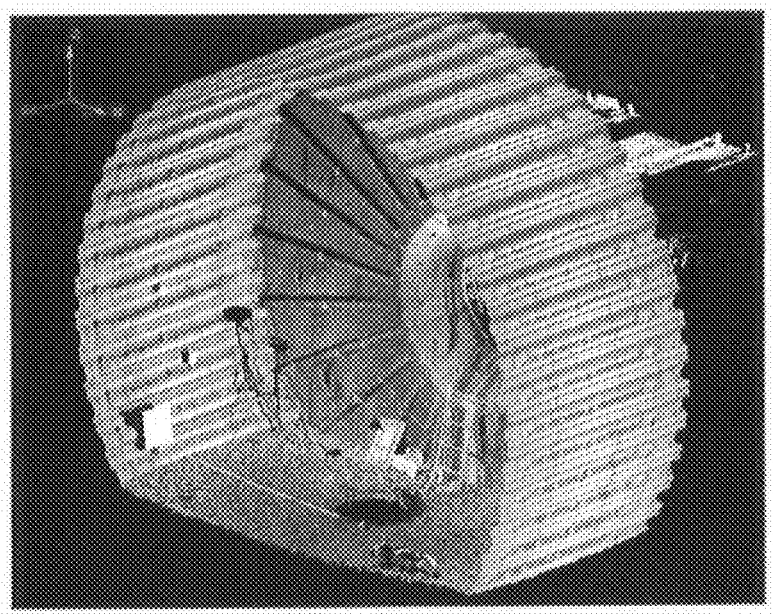
FIG. 6 is a 3D representation of the point cloud data derived from a laser scan showing the liner surface of a cylindrical segment of the shell and the feed end of the mill.
Figure 7:
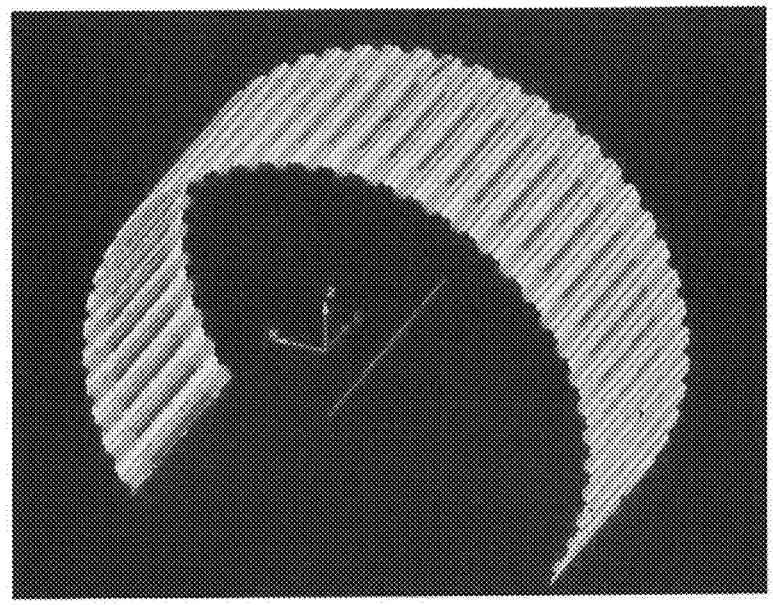
FIG. 7 is a 3D image of the extracted linear segment showing displacement data coloured or shaded relative to the magnitude of the displacement to the back of the liner.

The mapping means 65 includes data processing means, which in the present embodiment is in the form of the processing software 19, to obtain the point cloud data defining a surface in a co-ordinate system coinciding with the base reference and to generate displacement data in respect of the displacement between each point of the point cloud and a related point of the base reference in the manner previously described. The mapping means 65 also includes comparison means 67 to compare the displacement data against a prescribed threshold, which in the present embodiment is a critical distance from the back of the liner in order to gauge liner wear, e.g. 30 mm, and display means 69 to graphically display the results of the scan and the comparison in the various formats. These formats comprise the following:

1. 3D surfaces of the liner surface and thickness for the belly and feed and discharge ends. An example of a 3D surface image of the liner segments for a portion of the belly and discharge end is shown in FIG. 6 and of the liner thickness is shown in FIG. 7.

Figure 8:
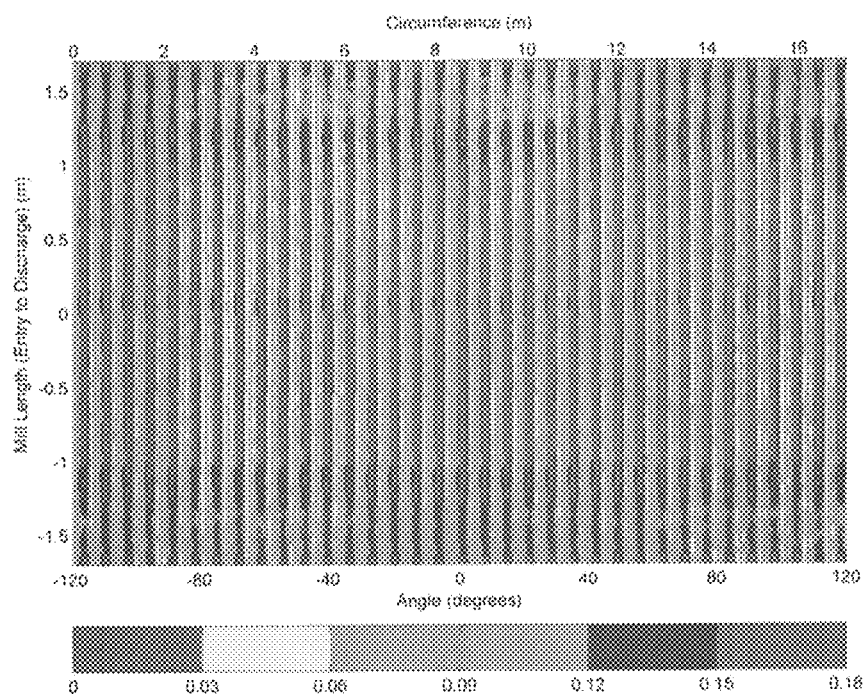
FIG. 8 shows an image of the unwrapped belly displacement data translated into a 2D grid with a legend showing the correspondence of the colours and shades used to liner thickness.
Figure 9:
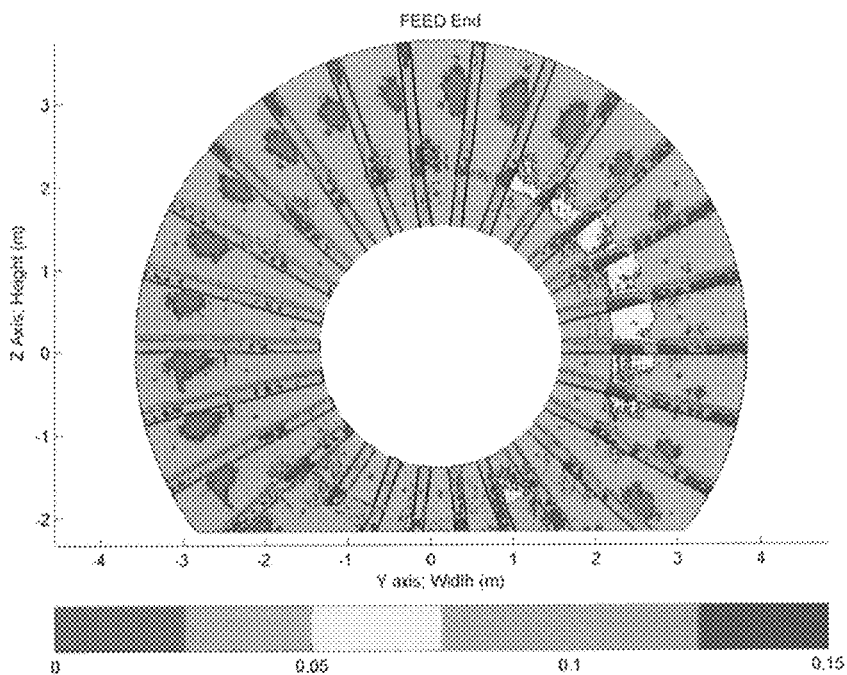
FIG. 9 is a 2D contour map of unwrapped displacement data for the feed end, similarly translated into a 2D grid with a legend showing relative liner thickness.

2. Contour maps of the liner surface and thickness for the belly and feed and discharge ends. An example of contour maps of the liner thickness for the belly is shown in FIG. 8 and for the feed end is shown in FIG. 9. Similar maps for the discharge end are derived in the same manner.

Figure 10:
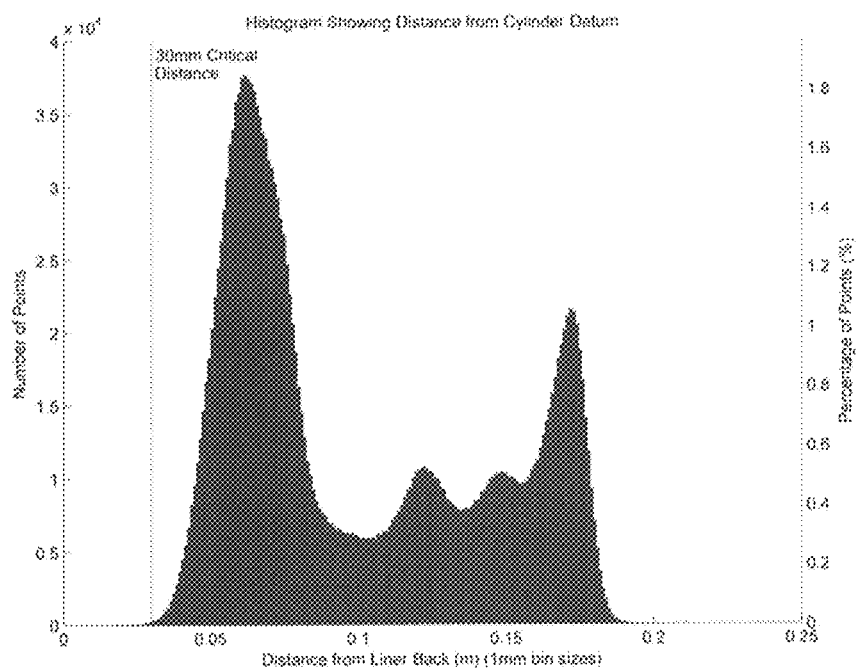
FIG. 10 is a histogram showing liner thickness from the cylinder data for all data scanned and the critical distance threshold.
Figure 11:
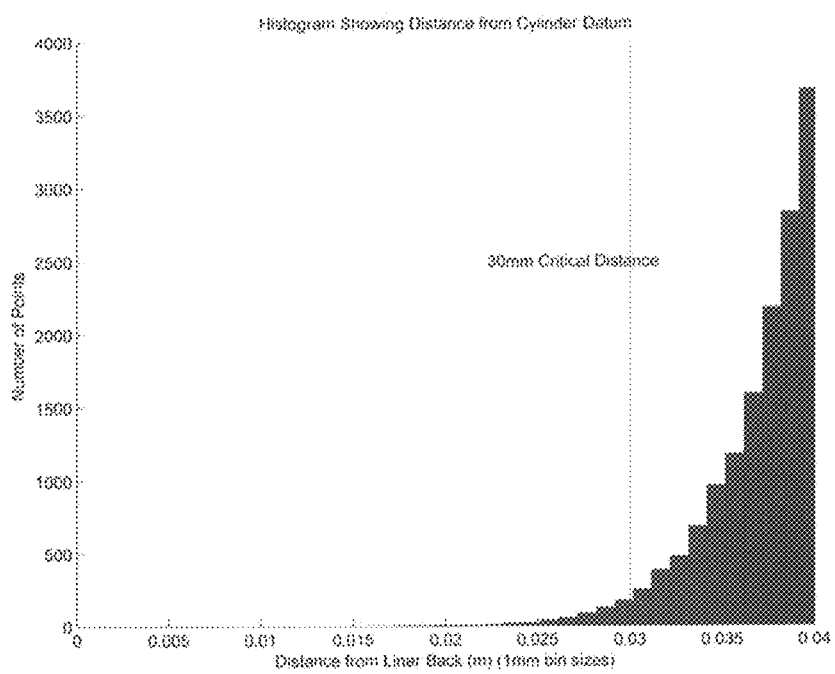
FIG. 11 is a histogram showing liner thickness from the cylinder data proximate to the prescribed critical distance threshold.

3. Histograms showing the frequency distribution of liner thickness relative to a prescribed thickness threshold for the belly and feed and discharge ends. An example of histograms showing the liner thickness for all points of a scan is shown in FIG. 10 and for a detailed view of the points around a critical threshold of 30 mm is shown in FIG. 11. The definition of the critical threshold varies with mill design and depends on a number of factors.

Figure 12:
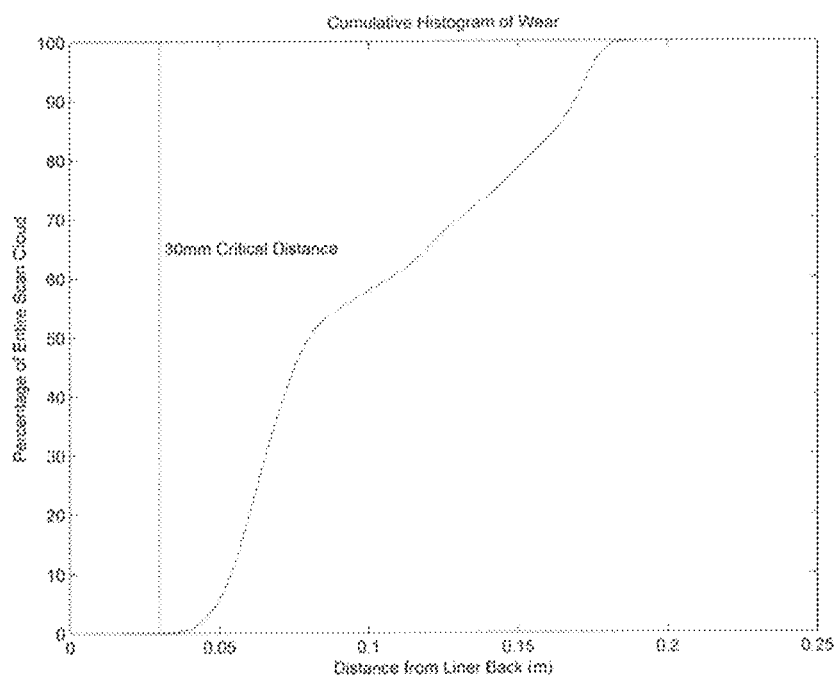
FIG. 12 is a cumulative histogram of liner wear corresponding to FIG. 10.
Figure 13:
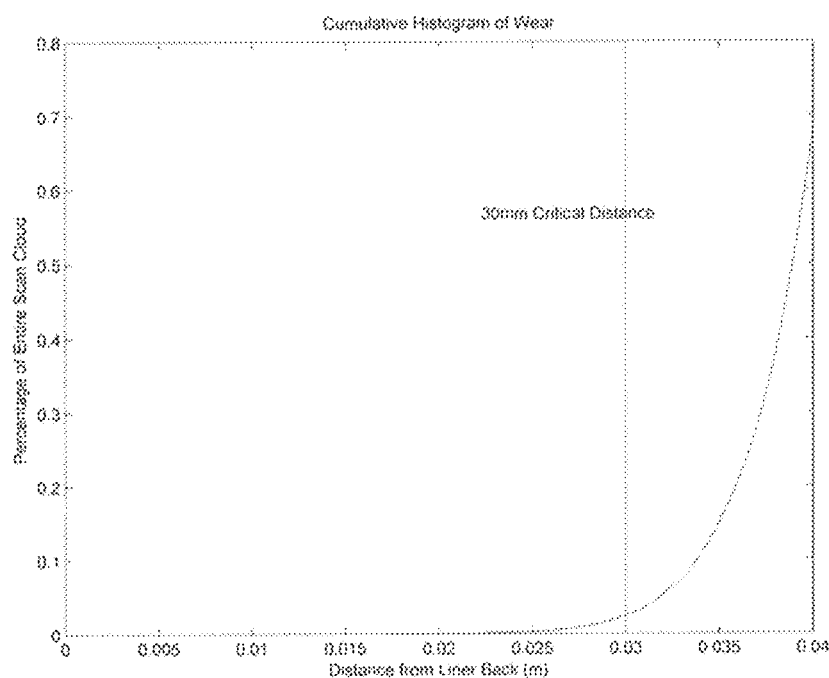
FIG. 13 is a cumulative histogram of liner wear corresponding to FIG. 11.

4. Cumulative histograms of liner thickness relative to the prescribed thickness threshold for the belly and feed and discharge ends. An example of cumulative histograms for the scans of FIGS. 10 and 11 are shown in FIGS. 12 and 13 respectively.

Figure 14:
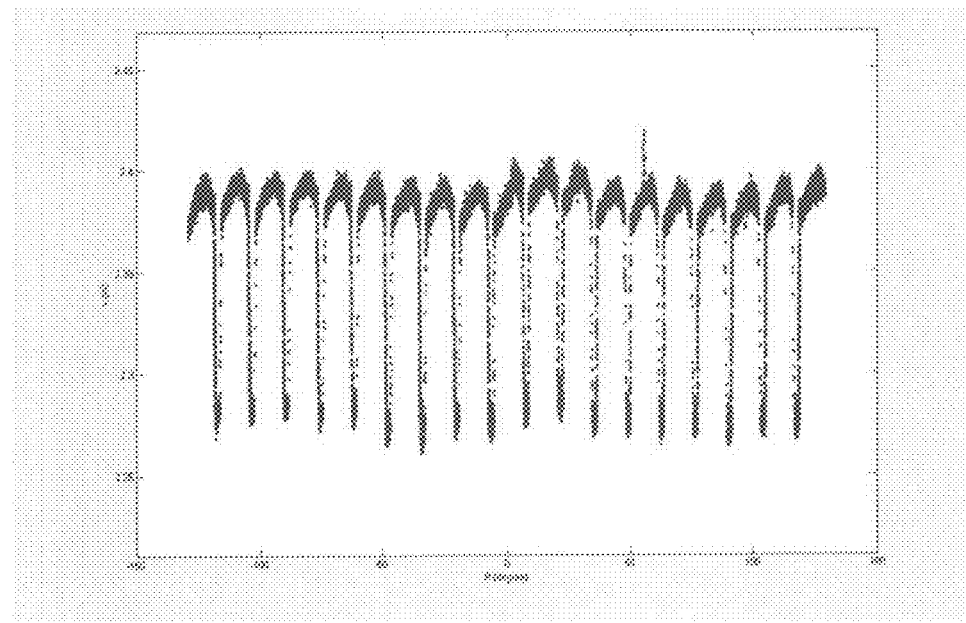
FIG. 14 is a graph of point cloud data in respect of a circular cross section of the feed end around a prescribed radius unwrapped in a 2D plane.
Figure 15:
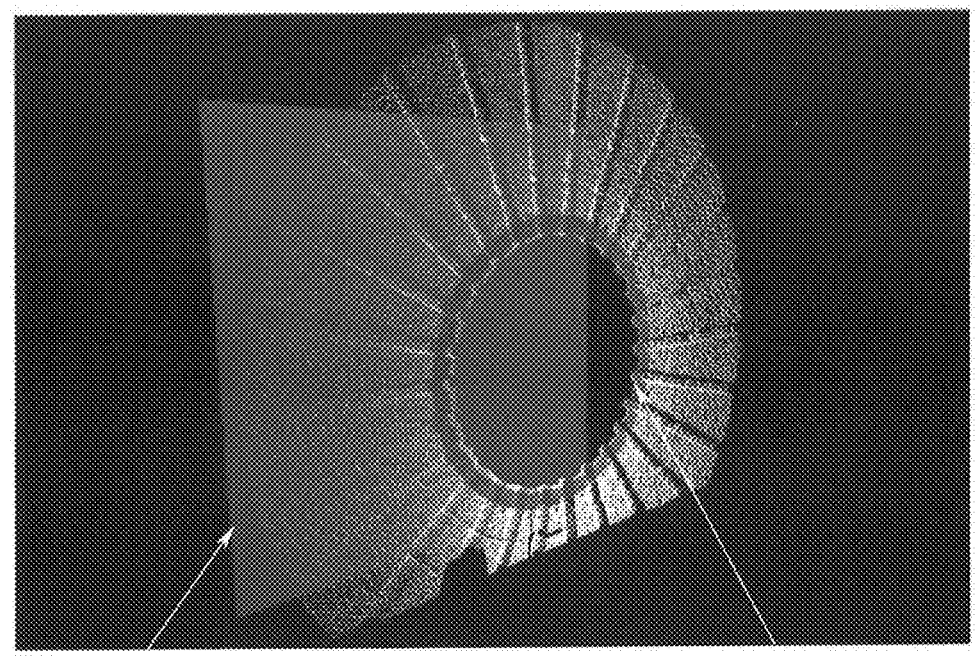
FIG. 15 shows the relative position of the circular cross section shown in FIG. 14 in a three dimensional view of the feed end.

5. Plots of slices of data extracted from the mill ends along a circular path concentric with the cylinder axis. An example of a cross section through the feed end showing liner surface point cloud data along a circular path within a radius of 3.6 to 3.7 m is shown in FIG. 14, the relative location of which in a 3D scan is shown by the inner dark shaded ring 66 around the entry hole in FIG. 15, relative to the BOL reference plane 68.

Figure 16:
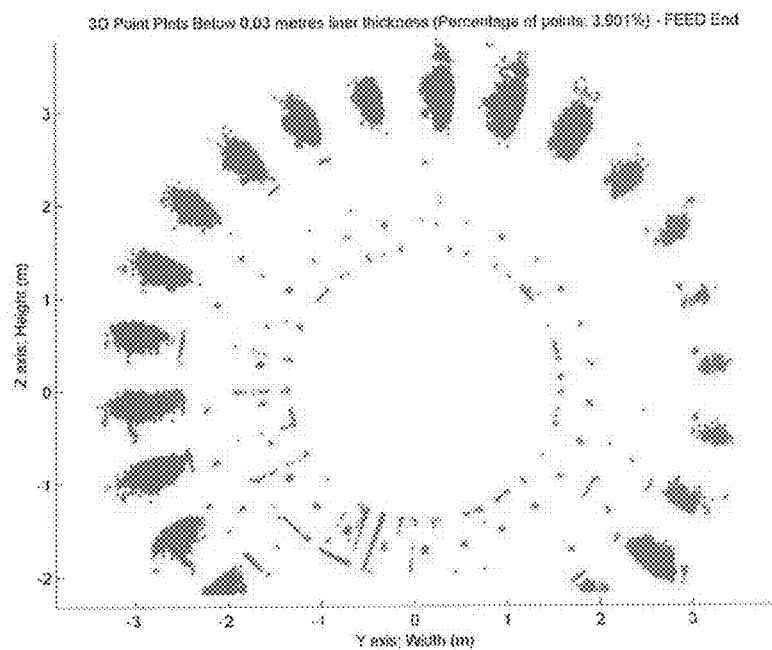
FIG. 16 is a plot of point data for the feed end which is below a prescribed thickness for the liner.
Figure 17:
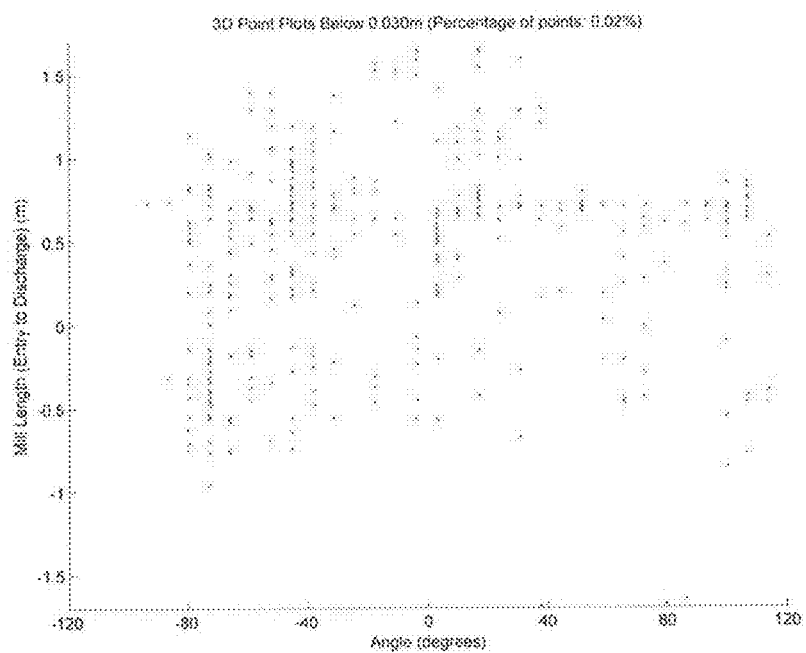
FIG. 17 is a similar plot to FIG. 16 but in relation to the belly.

6. Plots of the points below predefined thickness threshold for the belly and feed and discharge ends. Examples of plots showing the location of points below a prescribed thickness for the feed end is shown in FIG. 16 and for the belly in FIG. 17.

7. Numerical output of the number and/or percentage of points below a predefined thickness threshold; mean liner thickness or other pertinent statistical liner information.

Figure 18:
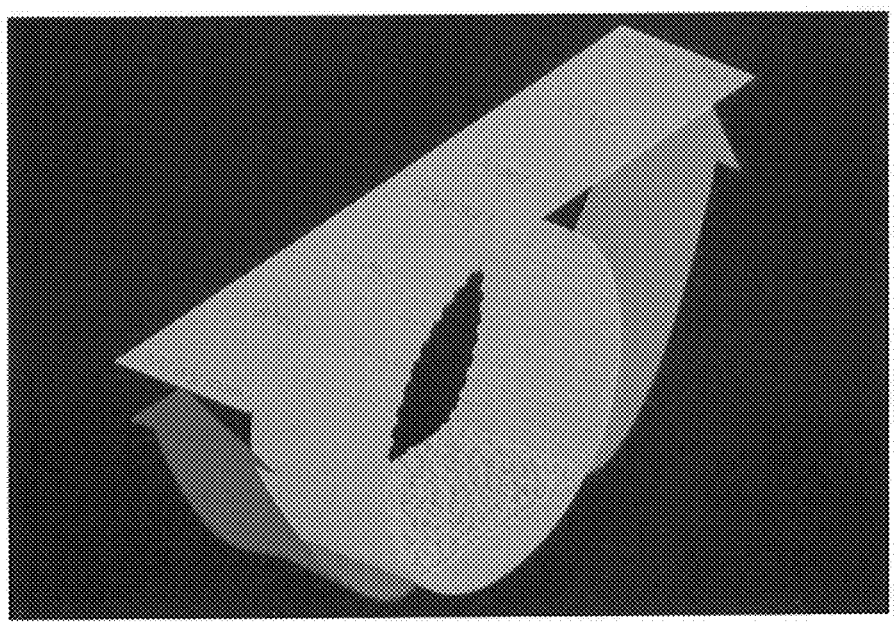
FIG. 18 is a 3D image showing how a circumferential section of belly data is unwrapped and represented in a two dimensional grid.

In the case of the second format for displaying contour maps of the point cloud data or displacement data, the display means 69 includes data manipulation means 71 for unwrapping the point cloud data and/or the displacement data onto a 2D plane for subsequent graphical display. A graphical representation showing the correlation between the 3D point cloud data and the unwrapped arrangement of such in 3D is shown in FIG. 18. The display means 69 also includes image visualisation means 73 to provide different colours or shades representing different magnitudes of displacement relative to the prescribed threshold on the contour maps, as shown in various of the preceding examples.

An example of a report that can be produced using the mapping means and selected formats for a particular mill is shown in FIGS. 35A, 35B, 35C, 35D, 35E and 35F.

The actual implementation and use of the processing software 19 in the present embodiment is best shown in the flowcharts of FIGS. 19A, 19B, 19C, 20, 21, 22, 23A and to 23B, which will now be described in detail.

Figure 19A:
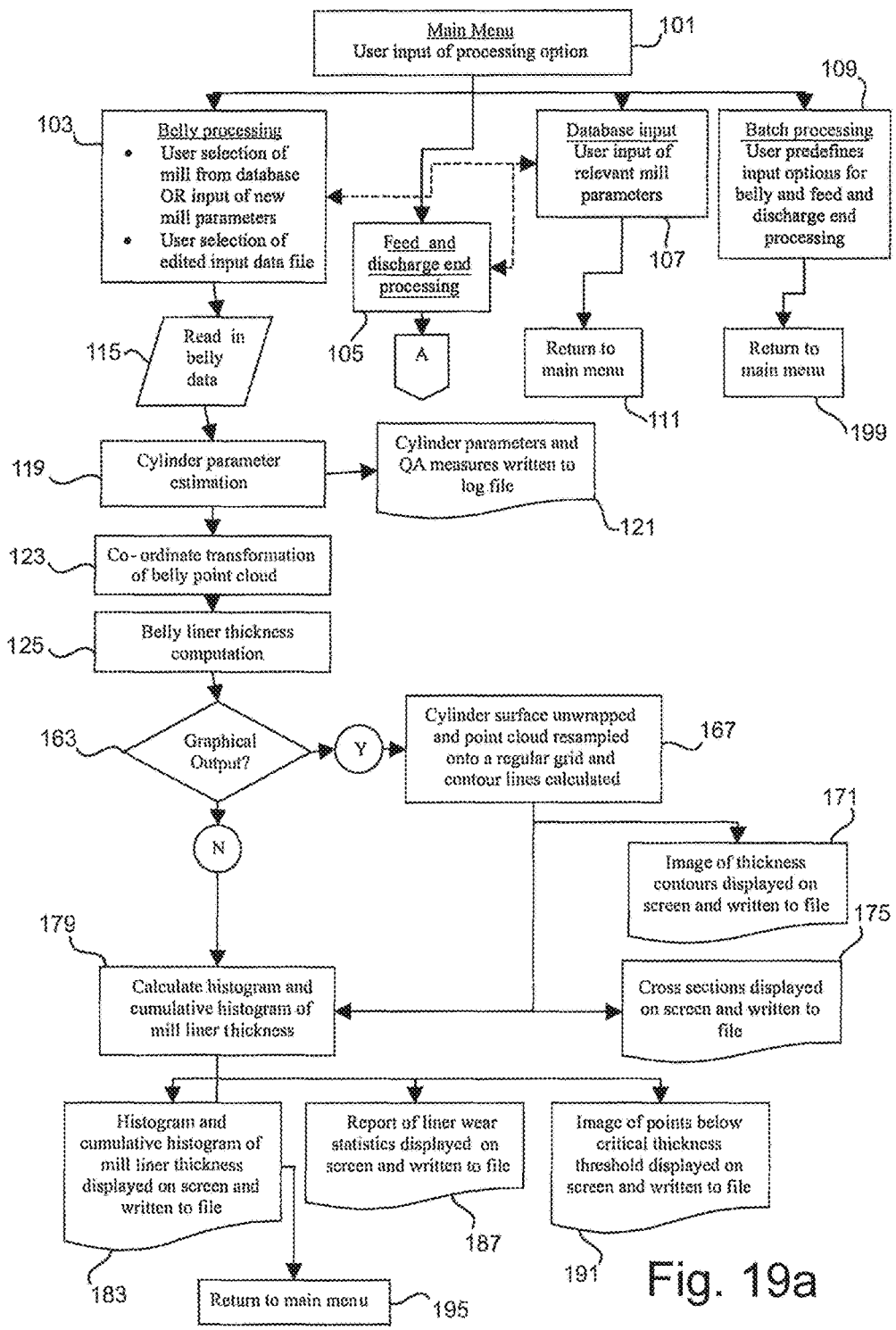
FIGS. 19A to 19C show the main program flowchart for the software in accordance with the preferred embodiment.
Figure 19B:
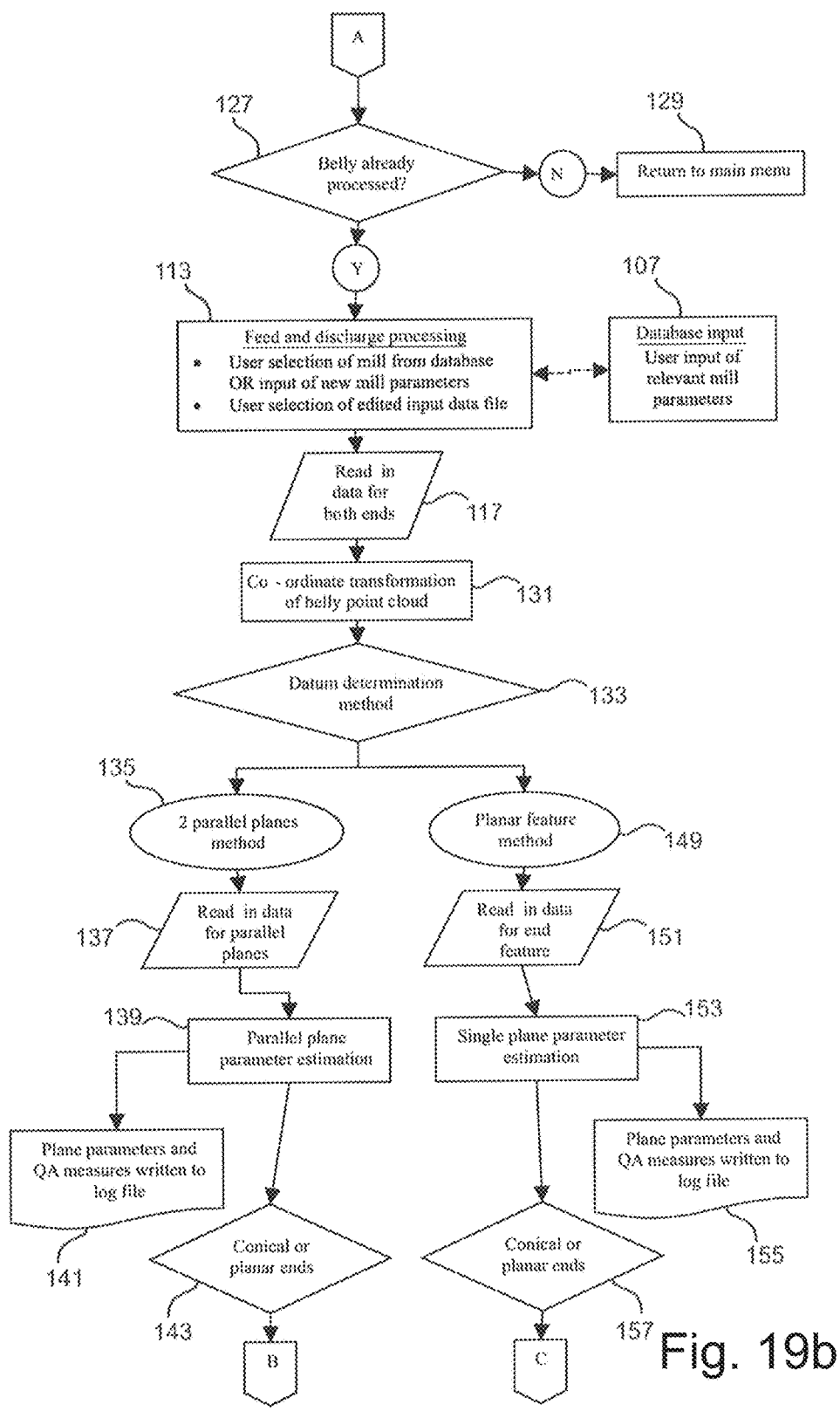
Figure 19C:
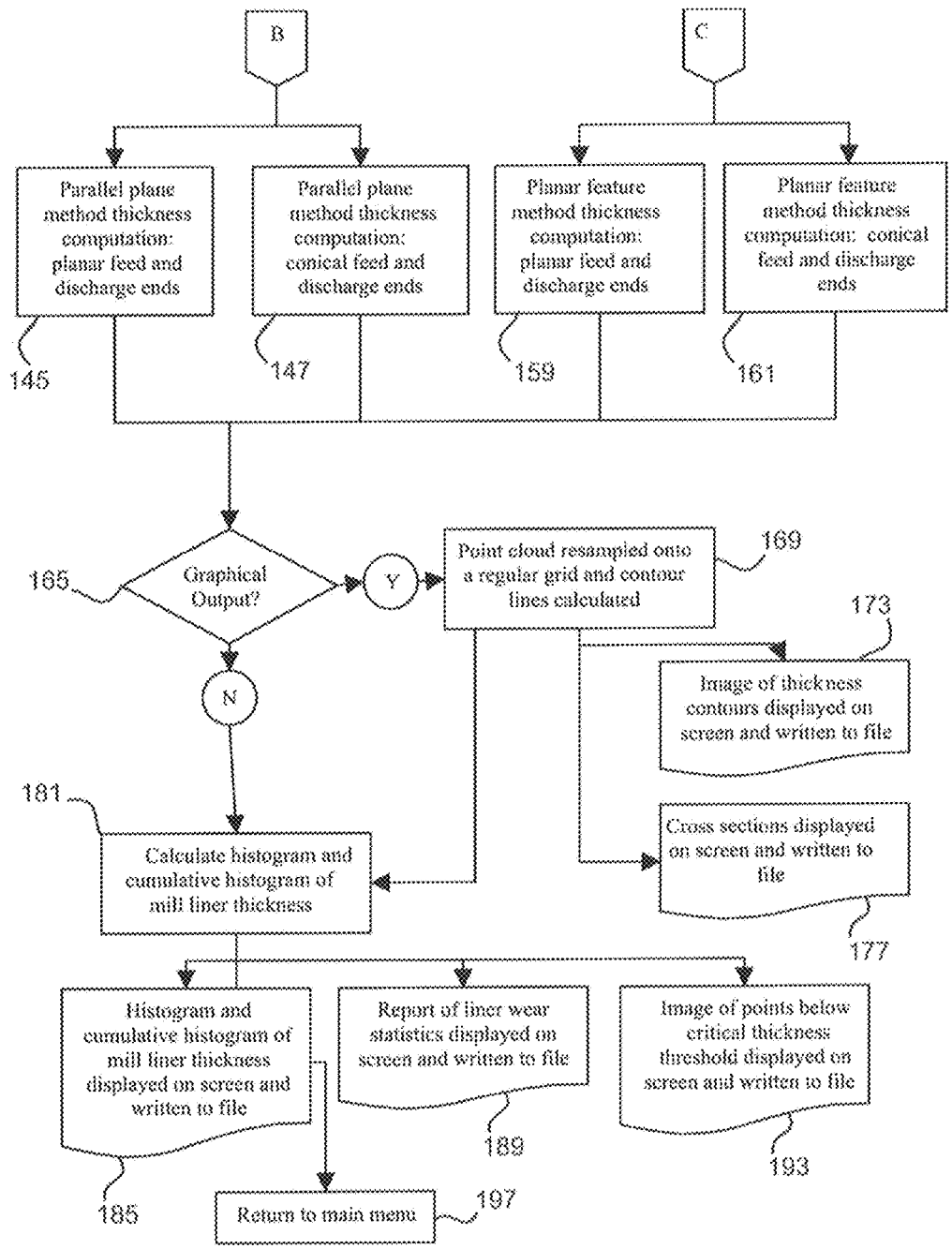

The main program flowchart for the processing software 19 is shown in FIGS. 19A, 19B and 19C of the drawings. A main menu 101 is designed to be presented to the user initially to provide various options for user input and choice of the particular processing options available. In the present embodiment, four principal processing options are provided comprising:

1. Belly processing 103
2. Feed and discharge end processing 105
3. Database input 107
4. Batch processing 109.

On invoking the belly processing option 103 the program enters a selection process to provide the user with two options, one to select the base reference data for the belly segment of a specific mill from the database 17, which is designed to store historical base reference data for each mill that the system is used, and the other to input mill parameters as base reference data if the mill to be scanned is a new mill which has no previous base reference data recorded.

In the case of the latter, the program directs the user to the database input process 107, which invokes a routine to allow the user to input the relevant mill parameters to create new base reference for the particular mill concerned. This may simply involve loading a pre-existing data file comprising a CAD model of the mill, if such a data file exists, or creating a data file model of the mill from scratch by conducting a scan of the bare mill shell without the liners in place.

Once the data file is created via the database input processing option 107, it is stored amongst the other data files for other mills and is available for selection via the belly processing option or module 103 or feed and discharge end processing option 105.

After the database input 107 is completed, the program has a facility 111 to return the user to the main menu 101.

As shown in FIG. 19B, the feed and discharge end processing option 105 invokes a selection module 113 to provide the user with a set of options corresponding to those of the belly processing selection module 103, i.e. to select base reference data for the feed and discharge end segments of the particular mill from the database 17, or to input new mill parameters in the event that a data file of such for the particular mill is not stored on the database. In the case of the latter, the program similarly directs the user to the database input module 107, as in the case of the belly processing selection module 103.

In both the belly processing selection module 103 and the feed and discharge end processing selection module 113, on the user selecting an existing data file for a specific mill, an editable input data file is created in which to store point cloud data for the belly or feed and discharge ends derived from a scan of the particular mill with the liner segments in situ.

The program then advances to step 115 of reading in belly data from the belly data segment of the point cloud data processed by the partitioning means 61 in the case of belly processing, or step 117 of reading in feed and discharge end data from the feed and discharge end data segments of the point cloud data processed by the partitioning means 61 in the case of feed and discharge end processing, as depicted in FIG. 19B.

For belly processing, after reading in the belly data at step 115, the referencing means 57 is operated by the program invoking an estimating routine 119 to estimate the key cylinder parameters from the point cloud data using the mathematical model previously described.

On completion of this, the program invokes another routine 121 to write the cylinder parameters derived from the mathematical model, as well as prescribed quality assurance (QA) measures, to a log file.

The referencing means 57 then attends to orientating the point cloud data relative to the base reference data by the program invoking a transformation routine 123 to transform the co-ordinate system of the point cloud data to the co-ordinate system of the base reference data using the transformation matrix previously described.

The displacement means 59 is then operated by the program proceeding with invoking a displacement routine 125 to calculate the belly liner thickness at each point of the re-orientated and transformed point cloud data using the mathematical equations previously described.

Figure 20:
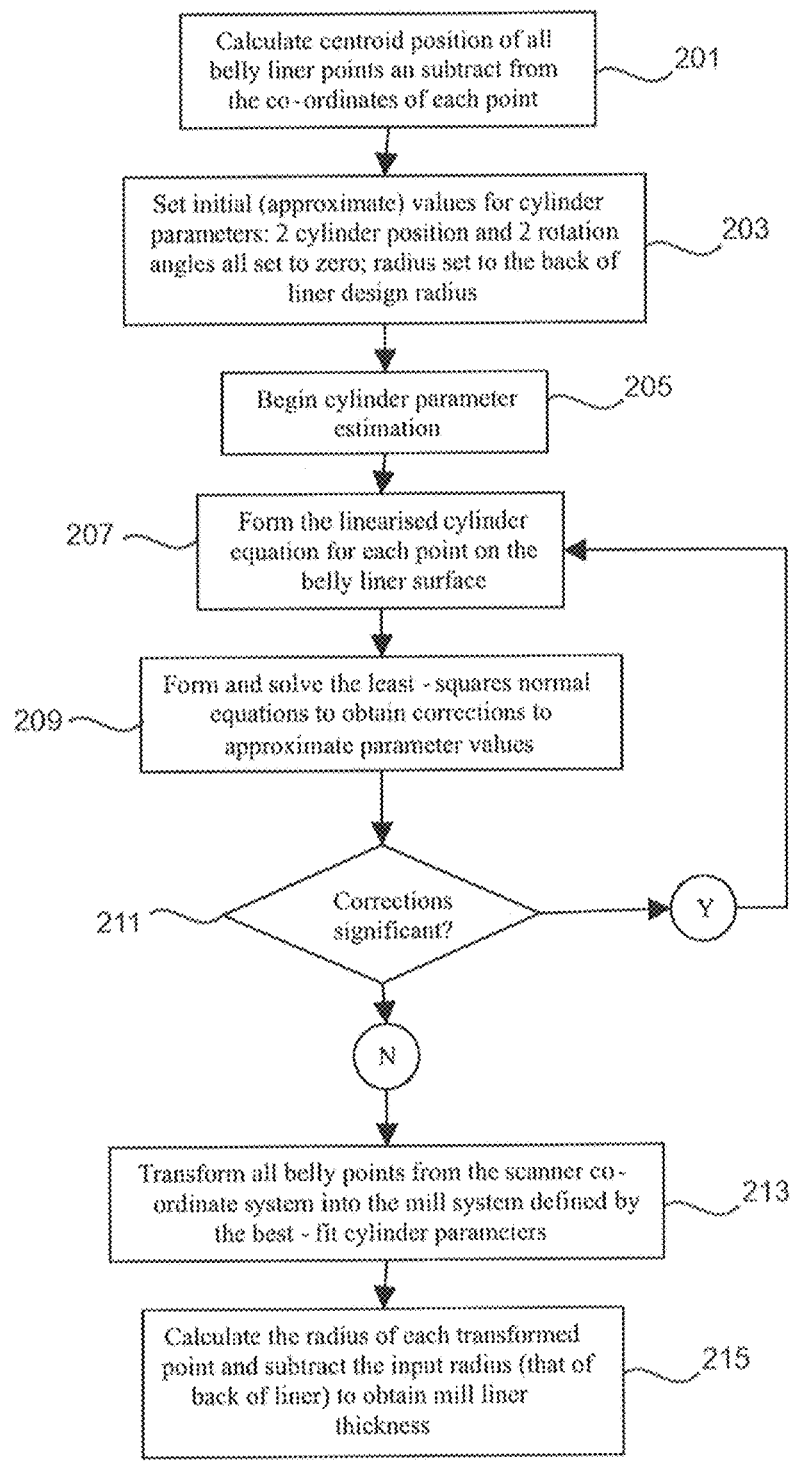
FIG. 20 is a more detailed flowchart showing the process steps for the cylinder parameter estimation module, the transformation module and the displacement module in the belly processing option.

A flowchart more particularly describing the process steps performed by the estimating routine 119, the transformation routine 123 and the displacement routine 125 is shown in FIG. 20 and will be described in more detail later.

For feed and discharge end processing, as shown in FIG. 19B, the program performs an initial check at step 127 to ascertain whether the belly has already been processed or not, prior to invoking the selection module 113. If not, the user is returned to the main menu at 129. If so, then the program permits the user to proceed to the selection module 113.

After reading in the feed and discharge end point cloud data at step 117, the referencing means 57 orientates the point cloud data relative to the base reference data of the feed and discharge ends by invoking the transformation module 131. This module uses the previously estimated transformation parameters and transforms the point cloud data to the co-ordinate system of base reference data using the mathematical models previously described.

The program then proceeds to the datum determination stage 133, where the datum for positioning the point cloud data segments for the feed and discharge ends relative to the BOL surface base reference data along the cylinder axis is determined by either of the two methods previously described, i.e. the gap point two parallel planes method or the planar feature method.

The particular method is predetermined for the particular mill by the user, and the program branches to the appropriate routine to be performed depending upon the particular parameter specified for such.

In the case of the two parallel planes method, the program branches to the start of this routine 135 and then invokes a read subroutine 137 to read in data for the feed end and discharge end, parallel planes.

Figure 21:
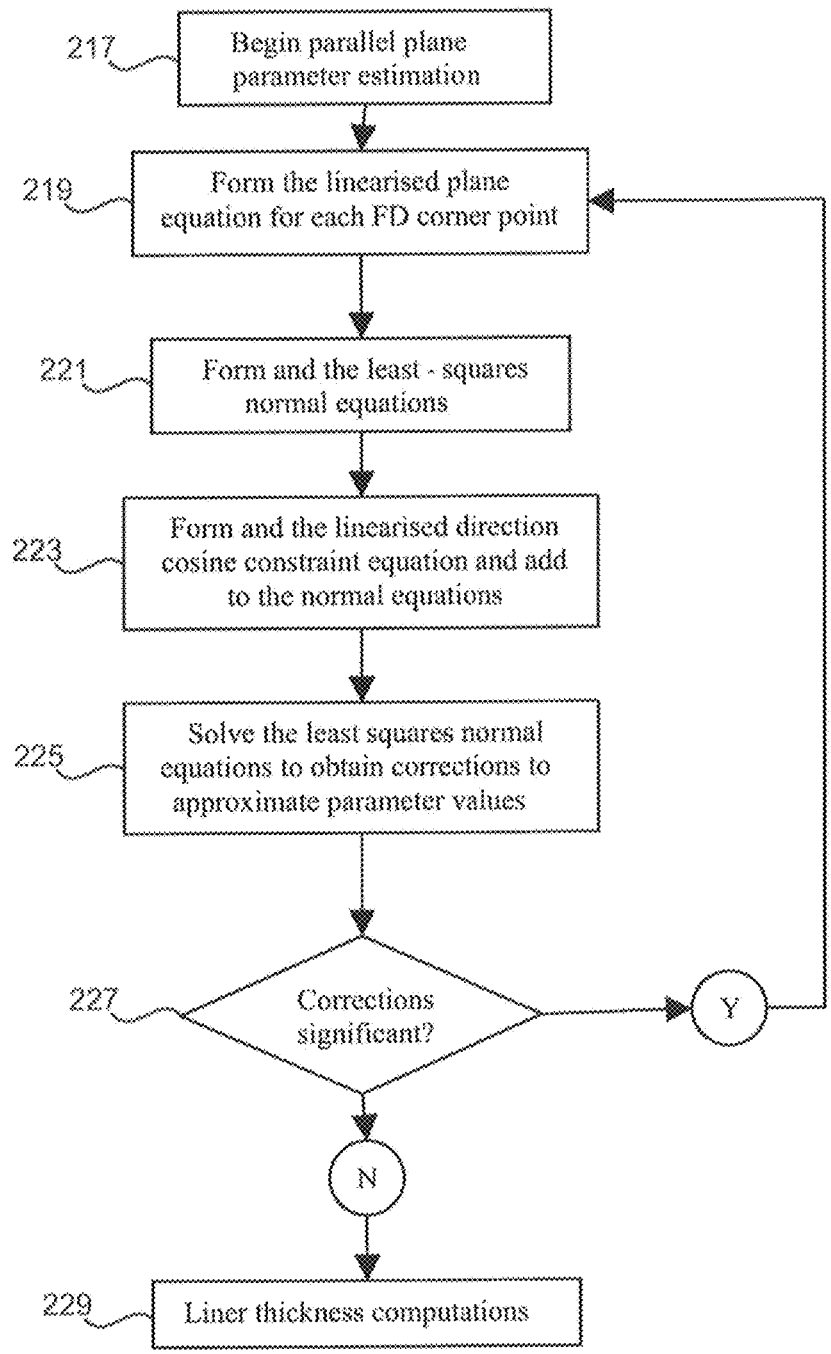
FIG. 21 is a more detailed flow chart showing the process steps for the parallel plane estimation module in the feed and discharge end processing option.

The program then invokes the requisite estimation module 139 for estimating the parallel plane parameters using the mathematical models previously described. The flowchart for the particular routine is shown in FIG. 21 and will be described in more detail later. A logging routine 141 is then invoked to write the derived plane parameters and prescribed QA measures to a log file.

The program then reaches another decision point 143 to invoke the appropriate routine for computing the thickness of the liner using the parallel plane method according to whether the ends are planar or conical. The parameter determining which routine is processed constitutes part of the mill parameters prescribed for the mill, and results in the program invoking the planar end routine 145 or the conical end routine 147, as shown in FIG. 19C. These routines perform the thickness calculations as previously described for the displacement means 59, suitably modified for the particular design of mill end concerned.

In the case of the planar feature method, as shown in FIG. 19B, the program branches from the datum determination stage 133 to the start 149 of the planar feature routine and then invokes a read subroutine 151 to read in data for the ends and the planar feature or reference 63.

Figure 22:
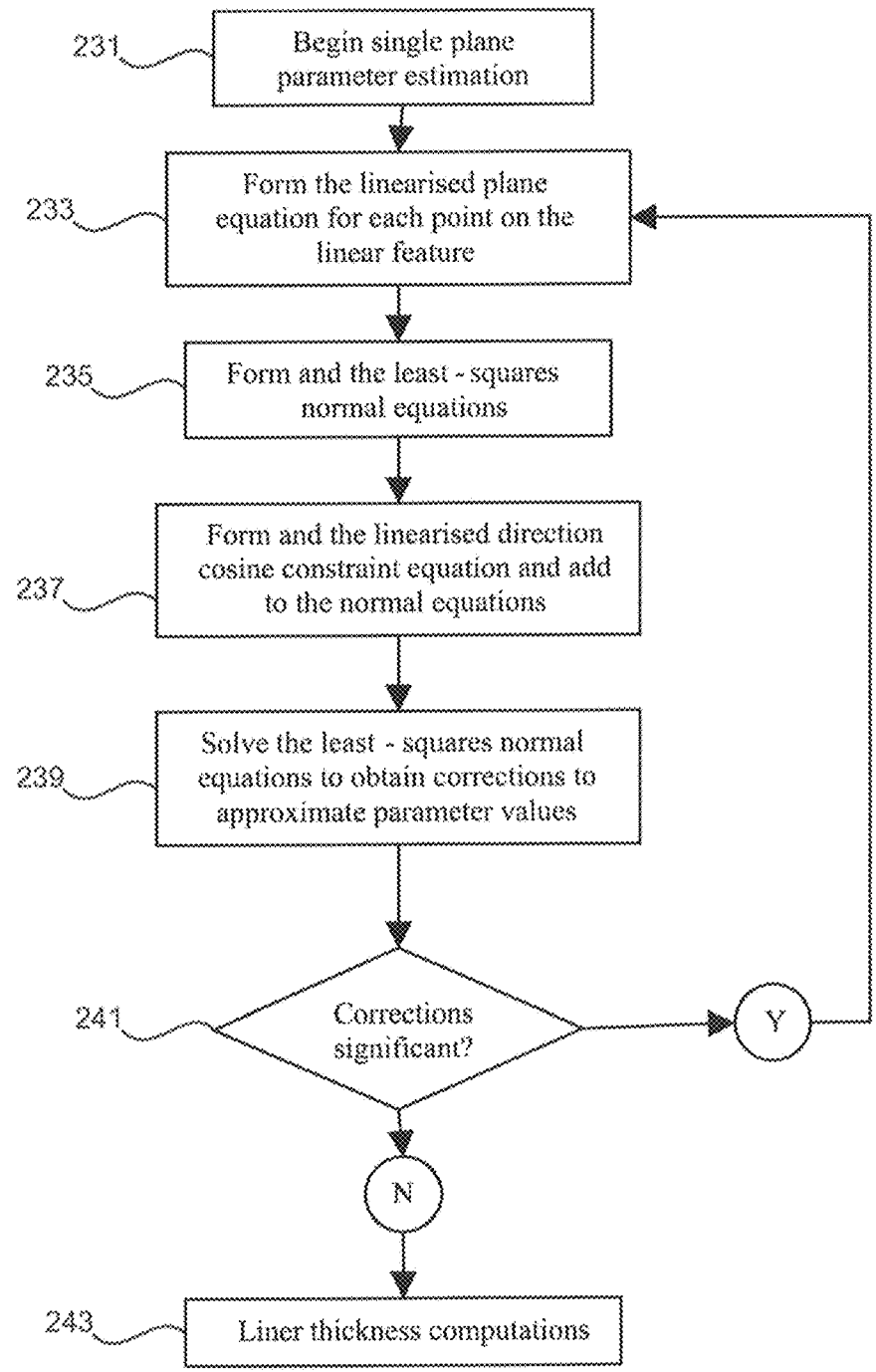
FIG. 22 is a more detailed flowchart showing the process steps for the single plane estimation module in the feed and discharge end processing option.

The program then invokes the requisite estimation module 153 for estimating the parameters of the single, best fit plane to determine the along-axis BOL distance to the feed and discharge ends using the mathematical models previously described. The flowchart for the particular routine is shown in FIG. 22 and will be described in more detail later. A logging routine 155 is then invoked to write the derived plane parameters and the prescribed QA measures to a log file.

Similar to the two parallel planes method, the program then reaches a decision point 157 to invoke the appropriate routine for computing the thickness of the liner using the planar feature method according to whether the ends are planar or conical. According to the parameter prescribed for the particular mill, the program proceeds with invoking either the planar end routine 159 or the conical end routine 161, as shown in FIG. 19C. These routines then perform the thickness calculations as previously described for the displacement means 59, suitably modified for the particular design of mill end concerned.

In both the belly processing and the feed and discharge end processing options 103 and 105, after completion of the mill liner thickness computations, the program proceeds to the reporting phase where the mill mapping means becomes operational. In both cases the program proceeds to a decision step 163 in the case of the belly processing option or decision step 165 in the case of the feed or discharge end processing option, to enquire as to whether graphical output is required to be reported. The answer to this query may either being included within the input parameters predefined for the particular mill and input via the batch processing option 109, or solicited directly from the user in real time.

In either case the program operates the display means to invoke a routine that generates and displays prescribed contour maps for the respective surface in response to an affirmative answer to the query, or simply calculates the histogram and cumulative histogram of the liner thickness in response to a negative answer to the query. In the case of an affirmative answer in the belly processing option, a belly mapping routine 167 is invoked and in the case of an affirmative answer to the feed and discharge end processing option, the end mapping routine 169 is invoked.

In the belly mapping routine 167, the data manipulation means operates to unwrap point cloud data in respect of the cylindrical shell surface and the point cloud resampled onto a regular 2D grid, where the contour lines are calculated. In the end mapping routine 169, the data manipulation means operates to similarly resample the point cloud data onto a regular 2D grid where the contour lines are similarly calculated.

Following calculation of the contour lines, in accordance with the second format, the image visualisation means invokes the image display routines 171 and 173, respectively, to graphically represent different magnitudes of contour thickness displacement relative to a prescribed threshold with different colours or shades.

The program provides for other routines to be optionally invoked for other formats, such as cross sections in routines 175 and 177, as well as the histogram routines 179 and 181 for calculating the mill liner thickness. In addition to displaying the requisite images on the screen, the data in respect thereof is also written to the file for the particular mill and stored on the database 17 for subsequent access.

In the case of the histograms, these are also displayed, in accordance with the third and fourth formats by the routines 183 and 185, and invoked directly by the program in response to a negative answer to the decision steps 163 and 165 respectively.

Further routines are invoked for reporting liner wear statistics 187 and 189 and images of points below the critical thickness threshold 191 and 193. In both cases these are similarly displayed and written to a file for storing within the database.

Following calculation and display of all of the selected reports for either the belly processing option or the feed and discharge end processing option, the program returns to the main menu at steps 195 and 197 respectively.

The batch processing option 109 follows a routine whereby the user is provided with a facility for predefining input options for both belly processing and feed and discharge end processing options to run automatically in a batch mode. On completion of the batch processing module, the program provides the facility 199 to return to the main menu to proceed with one of the remaining options.

The specific processes performed by the estimating routine 119, the transformation routine 123 and the displacement routine 125 for the belly processing option, will now be described in relation to FIG. 20 in more detail.

Firstly, with respect to the estimating routine 119, the cylinder parameter estimation proceeds at step 201 with initially calculating the centroid position of all of the liner points from the point cloud data derived from the data editing means and subtracting this position from the coordinates of each point. The purpose of this is to essentially determine the central axis of the shell relative to the coordinate system of the point cloud of data, whereby the reference point used by the laser scanner and the accumulated surface data is normally distant from the centroid position both with respect to its radial and axial position relative to the true central axis of the cylindrical shell.

The process then proceeds at 203 to set initial approximate values for the cylinder parameters, whereby two cylinder positions and two rotation angles are all set to zero, and the radius is set to the BOL radius, which is one of the key parameters obtained from the base reference data for the mill. The cylinder parameter estimation then commences as an iterative process at 205.

The iterative process initially involves forming the linearised cylinder equation for each point on the belly liner surface at 207; then forming and solving the least-squares normal equation to obtain corrections to approximate parameter values at 209; and finally deciding whether the corrections are significant at 211. If the corrections are significant, then the provisionally set values for the cylinder parameters are adjusted incrementally a prescribed amount from zero and the process steps 207 to 211 are performed again to determine whether the corrections are again significant. This iteration continues until the query at 211 determines that the corrections are not significant and fall within the prescribed tolerance, at which time the selected cylinder parameters are determined to be correct for the shell.

The transformation routine 123 is then commenced and performed at step 213, where all belly points from the point cloud data in the scanner coordinate system are transformed into the coordinate system of the base reference data of the mill using the best fit cylinder parameters previously estimated.

On completing this transformation the belly liner thickness computation is performed by the displacement routine 125 at step 215, whereby the radius of each transformed point is calculated and subtracted from the prescribed BOL radius to obtain mill liner thickness at that point relative to the base reference.

The specific process for the parallel plane parameter estimation module 113 will now be described in relation to FIG. 21 in more detail.

As shown, the parallel plane parameter estimation process commences at 217 and proceeds with an iterative process commencing at 219, whereby the linearised plane equation for each FD corner point is initially formed. The process then proceeds with forming the least-squares normal equations at 221. Thereafter, at step 223, the linearised direction cosine constraint equation is formed and added to the normal equations formed at step 221.

The least-squares normal equations are then solved at 225 to obtain corrections to approximate parameter values. These corrections are then checked against standard convergence tolerance parameters to determine whether they are numerically significant at step 227; and if so, the FD corner point values are adjusted and steps 219 to 227 are repeated again to determine whether the corrections are significant. When the corrections are determined not to be significant, at which point the FD corner points are deemed to align with the true central axis of the cylindrical shell, the minor thickness computations are then attended to for each end at 229.

The specific process performed by the single plane parameter estimation module 153 will now be described in relation to FIG. 22 in more detail.

As shown, the single plane parameter estimation process begins at step 231, and as in the parallel plane estimation process, iteration commences at 233, whereby the linearised plane equation for each point on the planar feature or reference 63 is formed.

The least-squares normal equations are then formed at 235, followed by the linearised direction cosine constraint equation at 237, which is added to the normal equations formed at 235.

The least-squares normal equations are then solved at 239 to obtain corrections to approximate parameter values.

The corrections are then compared at 241 against standard convergence tolerance parameters. If the corrections are numerically significant then an adjustment is made to the estimated position of the planar feature and the process steps 233 to 241 are repeated to determine whether the corrections are still significant or not.

This iteration continues until the corrections are deemed not to be significant, falling within the prescribed tolerance, whereupon the estimated position of the planar feature is deemed to be correctly aligned with the base reference data of the mill. Thereafter, the process proceeds with computing the liner thickness at step 243.

Figure 23A:
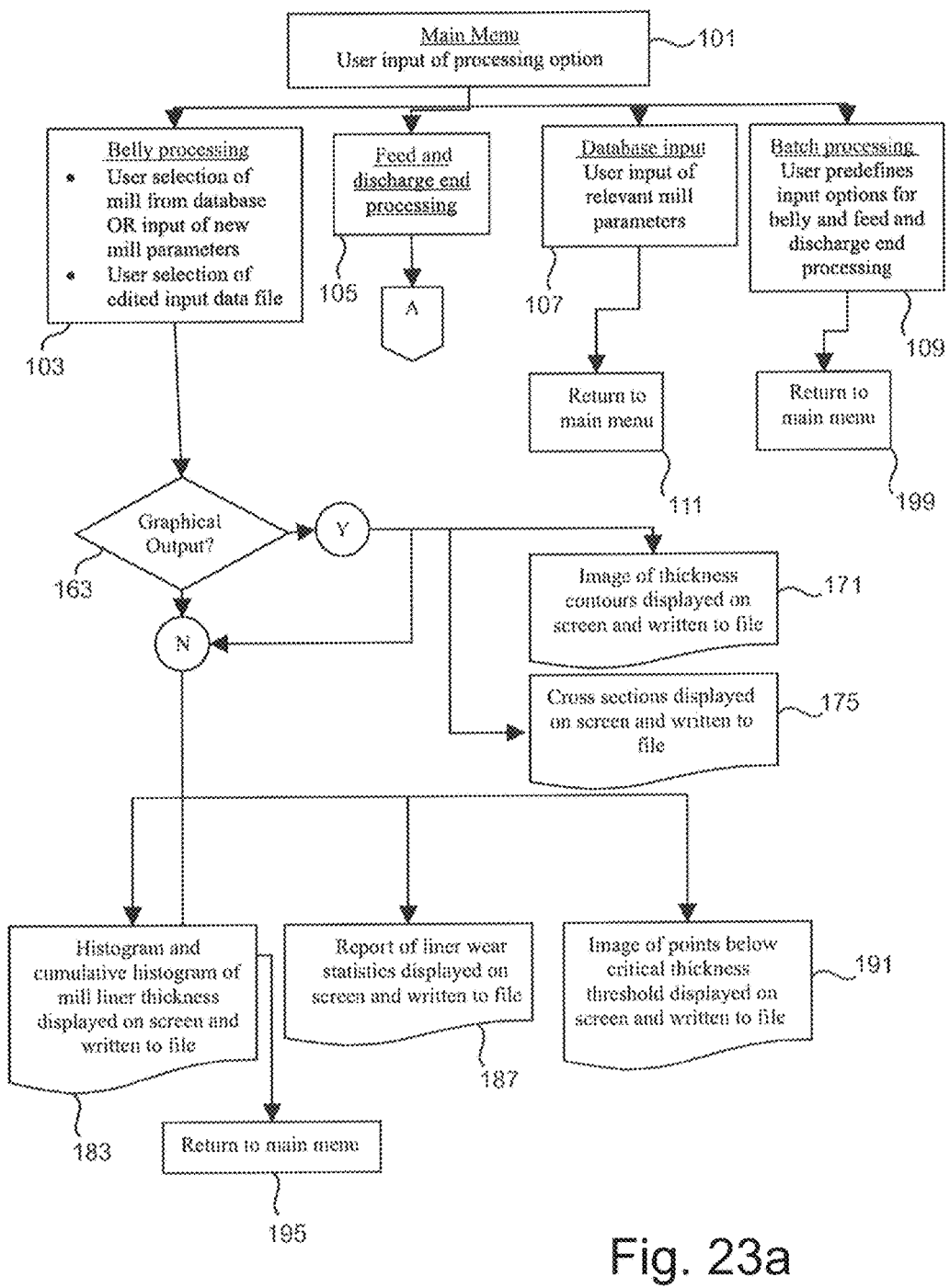
FIGS. 23A and 23B show the flowchart for user operation of the software.
Figure 23B:
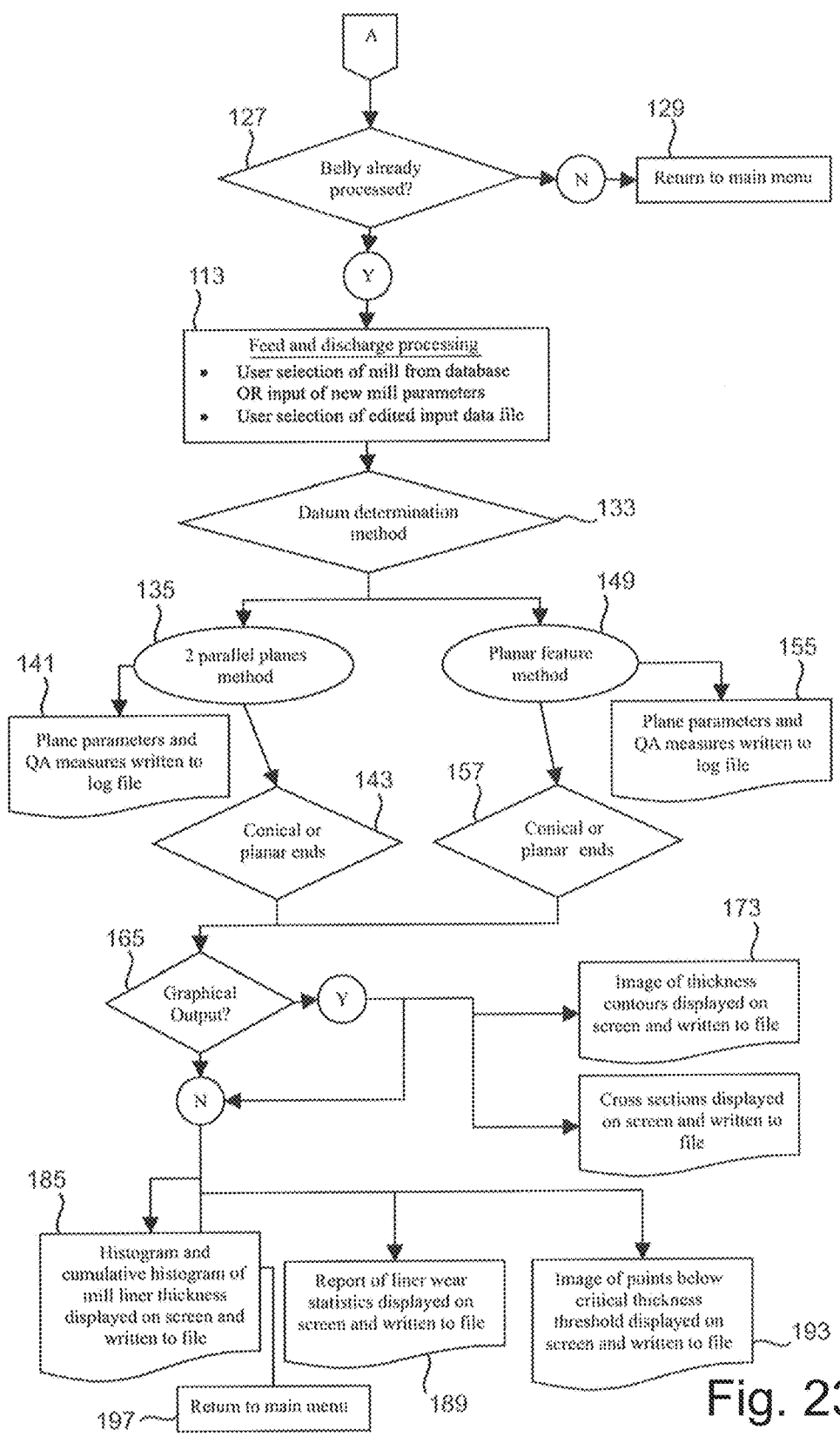

The user operation flowchart is shown in FIGS. 23A and 23B and is substantially the same as the program flowchart. Accordingly corresponding reference numerals are used to identify corresponding routines and modules described in relation to the program flowchart.

Crushermapper

A second application of an embodiment of the invention is directed towards a system and method specifically adapted for mapping and measuring the thickness of liners on a mantle and concaves of a crusher.

Owing to the geometric differences between mills and crushers the measuring of the mantle and concave surface to determine its difference from a base reference requires several further considerations. For instance:

1) laser scanner measurement field of view in a crusher is limited to line of sight, therefore the laser instrument must be suitable to view into any narrow lower crusher cavity;

2) multiple scans are required for inspection shutdowns when the spider assembly including the mantle in situ so as to cover all areas of the liners that are otherwise obstructed. This is particularly important for concave liners because they are known to wear asymmetrically, i.e. if measurements of concave liner thickness are only based on one concave side, then these may not be representative and lead to either conservative or optimistic condition monitoring output;

3) As a consequence of 2), scan registration may be required, i.e. the joining of individual scans to create the continuous 3D liner surface; this can be achieved either by using fixed, non-wearing structures in the field of view of a sufficient number of liner scans, by matching the overlap of liner surfaces between scans, or by placing dedicated fixed targets at suitable locations on the surrounding infrastructure. Alternatively each scan can be treated individually rather than registered and joined to create a continuous surface. If individual scans are not to be registered together then each individual scan must undergo each step of the process so as to provide the end result.

Figure 24:
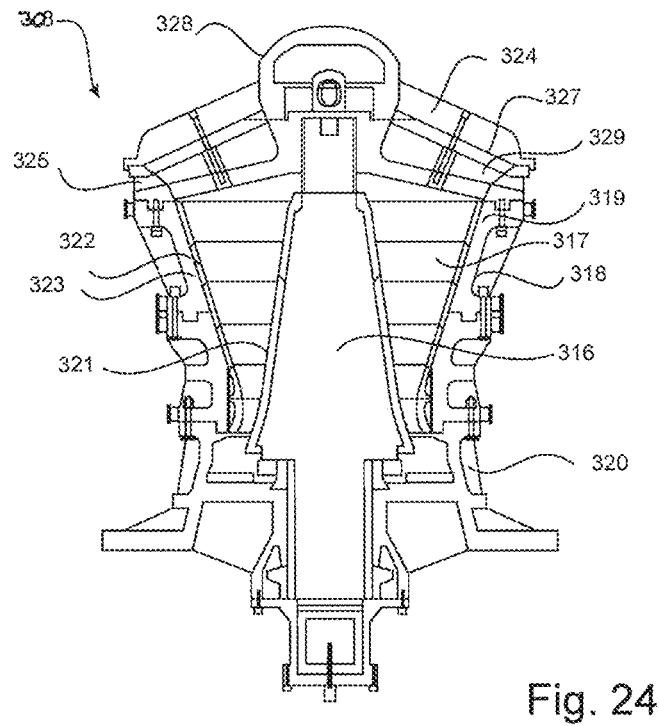
FIG. 24 is a schematic sectional view of the gyratory crusher in a gyratory crusher plant.

4) As for any liner wear monitoring application using laser scanning, thickness registration, i.e. the correlation of the visible liner surface to the back of liner is required; this can be achieved by using fixed, non-wearing structures in the field of view of a scan with known offsets to the back of liner, or by establishing a precisely known absolute scanner position and orientation for every liner scan by utilizing fixed targets for example 5) A suitable scanner deployment mechanism that removes the need for operator access to the crusher cavity and that protects the scanner is used to position the scanner at the various positions FIG. 24 illustrates a conventional gyratory crusher 308 used for crushing large solid objects, such as ores, into smaller pieces. The gyratory crusher 308 is one of several types of crushers that can be used for such purpose. Other crushers include, jaw crusher, cone crusher and cylindrical roll crushers (such as high pressure grinding rolls). For ease of understanding, the present invention will only be described with respect to a gyratory crusher. However, it will be apparent to a person skilled in the art that the present invention is not limited to a gyratory crusher and is also applicable to other types of crushers which are within the scope of the present invention. For example, a gyratory crusher includes a mantle having mantle liners thereon and a concave having concave liners thereon. A person skilled in the art would be able to make the resemblance that the concave in gyratory crushers corresponds with the bowl in a cone crusher. Similarly, a person skilled in the art would be able to make the resemblance that the concave in gyratory crushers corresponds with the set of vertically-inclined jaws.

With reference to FIG. 24, the gyratory crusher 308 comprises a downwardly expanding central conical member (or a mantle) 316 extending substantially vertically within the crusher cavity 317 and an outer upwardly expanding frustroconically shaped member hereinafter referred to as a shell 318. The shell 318 may comprise two or more portions, such as, a top shell (or a concave) 319 and a bottom shell 320. One or more mantle liners 321 are provided on and over the surface of the mantle 316 in order to protect the mantle 316 from damage or wear. The mantle liners 321 provide a crushing surface of the crusher 308. One or more concave liners 322 are provided on and over an inner surface 323 of the concave 319 in order to protect the inner surface 323 from damage or wear. The concave liners 322 also provide a crushing surface opposing the mantle liners 321.

A spider assembly 324 comprising a spider 325 having two or more arms extending from a central portion is provided on the top edges of the concave 319. The spider arm is provided with a liner 327 and the central portion is provided with a spider cap 328 so as to protect the spider from damage and wear. The spider 325 defines an inlet 329.

Figure 25:
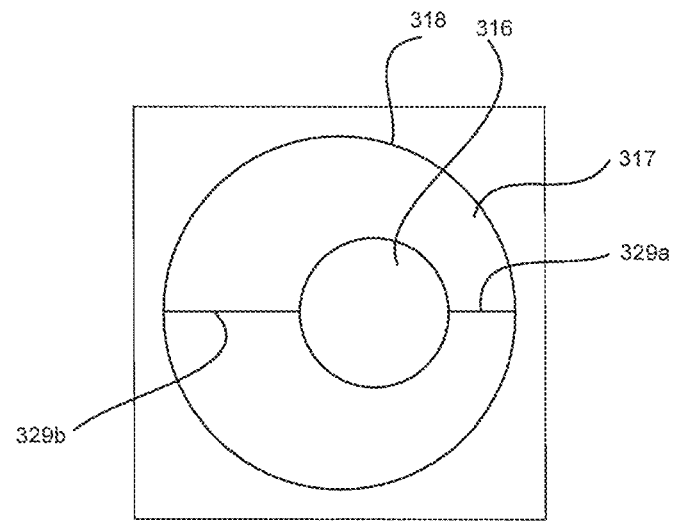
FIG. 25 is a schematic plan view of the mantle and concave liners of the crusher shown in FIG. 24, illustrating the OSS and CSS relationship therebetween.

In operation, large solid objects, such as ore, are tipped into the ROM bin (not shown) which then pass through the inlet 329 defined by the spider 325 between the spider arms and into the crusher cavity 317 for crushing into smaller pieces. The mantle 316 has a small circular movement in an eccentric fashion, whereas the concave 319 is fixed in position. When the ore reaches near the bottom portion of the crusher cavity 317, the ore is crushed by the closing of the gap between the moving mantle liner 321 and the fixed concave liners 322. In particular, the ore is crushed near the bottom of the top shell at location of the Closed Side Setting (CSS) 329a, while crushed ore is allowed to exit the crusher cavity 317 at location of the Open Side Setting (OSS) 329b as for example illustrated in FIG. 25.

Over time, the mantle liners 321 and the concave liners 322 will wear and will need replacing in order for the crusher 308 to perform in an efficient manner. The crusher 308 will need to be shut down in order to replace the mantle and/or concave liners 321, 322, thus resulting in crusher downtime which is undesirable from an economic point of view. It is important to accurately determine when the mantle and/or concave liners 321, 322 need to be replaced so that the liners 321, 322 are not replaced too early (for example, resulting in liner wastage and unnecessary crusher downtime) and too late (for example, resulting in deterioration in crusher performance and potential damage to the structure of the crusher 308). Therefore, it is desirable to determine an optimal time to replace the mantle and/or concave liners in order to minimise crusher downtime, increase productivity and reduce costs.

According to embodiments of the present invention, there are provided a condition monitoring system and a method for monitoring the wear of the mantle and concave liners 321, 322 of a crusher 308 without the need for physical access within the crusher cavity 317 by a person as taught in the prior art. As described above, a person skilled in the art can understand that the condition monitoring system and method are not limited to a gyratory crusher and other types of crushers are within the scope of the present invention. The condition monitoring system and method are described only with respect to a gyratory crusher for the sake of conciseness.

The condition monitoring system monitors the wear of the mantle and concave liners by performing three-dimensional scans of the surfaces of the mantle and concave liners 321, 322 to obtain three-dimensional point cloud data for each scan. Once the point cloud data is collected, the data can then be processed and analysed as described herein below to produce useful technical information and deliverables such as the remaining life of the liners 321, 322 before it should be replaced, the wear rates of different sections of the mantle and concave liners and the position of localised liner failure.

For example, monitoring the wear of the mantle and concave liners 321, 322 provides data to facilitate in determining timing or schedules for adjustments or replacement of the mantle as necessary in order to maintain the CSS and OSS within desirable ranges for effective crushing.

Further, the crusher condition monitoring system and method may facilitate improvement or optimisation in the operational performance of the crusher 308.

The condition monitoring system comprises a deployment system 330, scanning means such as a scanner 331 and a computer (not shown). The deployment system 330 is configured as a support to support the scanner 331. The deployment system 330 is used for deploying a scanner 331 attached thereto in the vicinity the inlet 329 between the spider arms or into the crusher cavity 317 for scanning the surface of mantle liner 321 and/or concave liner 322, as depicted schematically in FIG. 26.

The deployment means can take any form, for instance the scanner may be attached to a tripod deployment system 332, as in this embodiment, or a rock breaker which is generally associated with crushers.

The computer includes data acquisition means, processing means and storage means. The processing means includes data editing means for editing the point cloud data collected by the scanner 331 (such as to filter unwanted points). The processing means may also include a referencing means for the orientation of the point cloud data and the transformation of the point cloud data into a particular co-ordinate system were needed.

Preferably, the scanner 331 is a high precision three-dimensional (3D) laser scanner that collects a large amount of precise 3D point measurements to generate point cloud data by directly measuring distance to a remote surface by time of light laser range-finding. The scanner 331 should be able to capture data in a spherical or near-spherical field of view (FOV) and able to capture a dense dataset in the order of several million points throughout the full FOV within a short time period, such as a few minutes.

Alternatively or in addition to using a laser scanner to generate point cloud data of a structure, other means capable of generating point cloud data can be used such as a photogrammetry system, which are within the scope of the present invention. For conciseness, the present invention will only be described with respect to a laser scanner 331.

When the tripod deployment system 332 is in a rest state on the outer rim 345, the scanner 331 can then be controlled remotely to perform a three-dimensional scan of the surrounding environment, thereby capturing three-dimensional point cloud data including data associated with a section of the surface of the mantle and concave liners.

In such manner, a section of the liners 321, 322 can be captured by the scanner 331. However, there will be other sections of the surface of the liners 321, 322 which are out of the line of sight of the scanner 331 during the first scan as described above. In order to capture the other sections of the surface of the liners 321, 322, the deployment system 332 is lifted from rest, and rotated so as to move the scanner 331 to another area for scanning. For example, the scanner is rotated around 120° and then the tripod deployment system 332 is lowered and rested upon the outer rim 345 of the spider 325 in a manner similar as described above. After capturing 3D point cloud data at that location, the tripod deployment system 332 is again lifted and rotated another 120°, and then lowered and rested upon the outer rim 345 of the spider 325 for capturing further 3D point cloud data at that location. It is apparent to a person skilled in the art that more or less than the three scanning locations described above, can be undertaken and the angle of rotation can be adjusted without going beyond the scope of the invention.

The method or process for monitoring the wear condition of a crusher according to embodiments of the present invention will now be described in greater detail below.

The process can be generally categorised into the following steps:

i. Scanning of crusher cavity 317 (i.e., the surface of the concave and mantle liners 322, 321).

ii. Registration of individual scans for joining the individual scans in order to create a continuous three dimensional representation of a surface (e.g., mantle and concave liners surface 321, 322).

iii. Segmentation of data into different components (e.g., separate concave liner 322 data and mantle liner 321 data).

iv. Obtaining base reference data (i.e., data representing the surface of the concave 319 and mantle 316 without the liners in place (i.e., bare concave and mantle)).

v. Determining the thickness of concave and mantle liners 322, 321 at various locations.

The step of scanning the crusher cavity 317 is performed in order to obtain point cloud data representing the surface of the concave and mantle liners 322, 321. In this step, a laser scanner 331 is deployed or held at a series of positions in the vicinity above the inlet 329 or within the crusher cavity 317 for performing a series of scans of the crusher cavity 317 using any suitable deployment systems.

Figure 26:
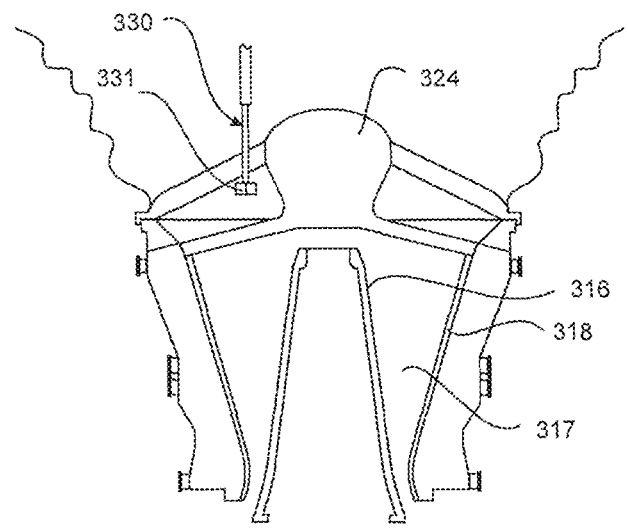
FIG. 26 is a schematic sectional side view of the gyratory crusher plant at which there is in use a system according to a first embodiment for monitoring the condition of mantle and concave liners of the gyratory crusher.

The deployment system preferably utilises one of the following existing infrastructures associated with conventional crushers in order to minimise costs:

Fixed Plant Overhead Crane, which is typically already installed at large size primary crushers Fixed Plant Rock Breaker Arm, which is typically already installed adjacent the ROM bin for large size primary crushers Mobile Deployment Infrastructure For conciseness, the process will only be described with respect to the deployment system 330 depicted in FIG. 26. However, it will be apparent to a person skilled in the art that the present invention is not limited to such a deployment system.

A series of scans is required when the mantle 316 is in place in order to achieve a substantially complete field of view of the surface of the concave and mantle liners 322, 321.

Figure 27:
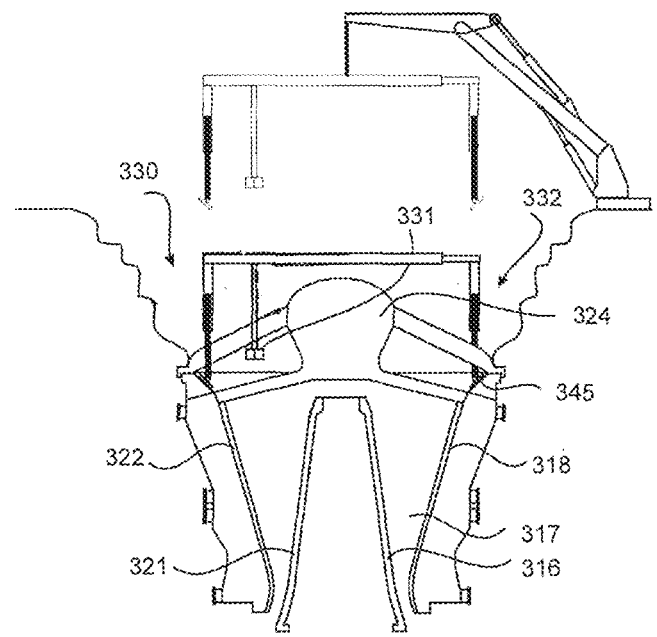
FIG. 27 is a fragmentary schematic perspective view illustrating installation of the system.
Figure 28:
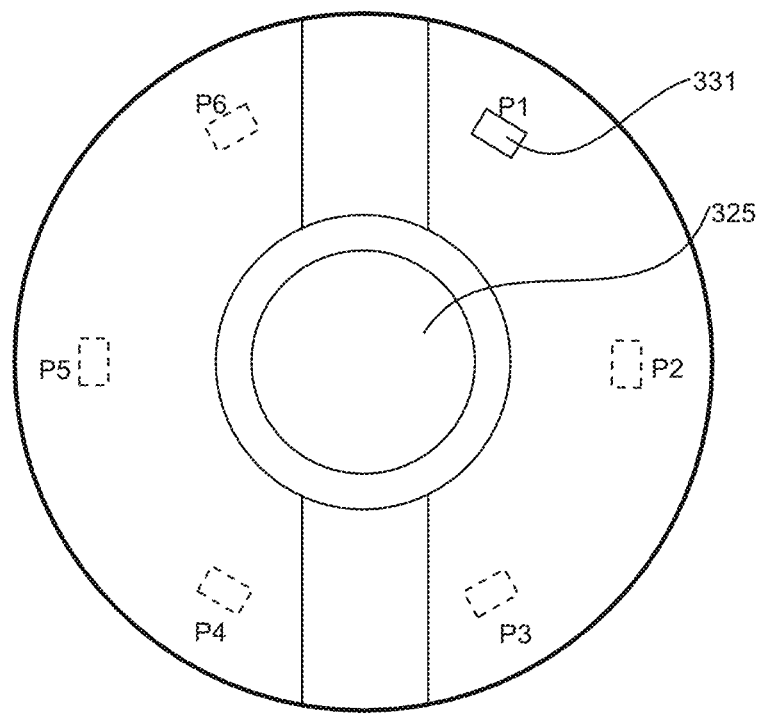
FIG. 28 is a top view of the crusher illustrating the scanner positions.

FIG. 28 illustrates a series of six positions at which the scanner 331 is held by the deployment system 330 to perform a series of scans of the crusher cavity 317. With the deployment system 330 of FIG. 27, the scanner 331 is held at positions above the inlet 329 such that a line of sight of the scanner 331 is able to project to surfaces of the concave and mantle liners 322, 321 at the location of the CSS 329a or the OSS 329b. As the ore is crushed near the bottom of the concave 319 and mantle 316 it is important to ensure that the scanner 331 is positioned to be able to capture the liner surface condition of this critical area.

In order to identify possible scanner positions, a graphical projection of line of sight coming from the very bottom edge of the concave/mantle 319, 316 through the crusher cavity 317 may be used. Identifying scanner positions in this way enables line of sight to the bottom of the crusher 308 so as to provide data collection of this critical area. In addition, it allows identification of set up positions that do not require isolation or shutdown procedures to get access to.

To obtain the series of individual scans of the crusher cavity 317, the scanner 331 may first be positioned above the inlet 329 near a spider arm at location P1 as shown in FIG. 28 to perform a scan. After a scan is performed at location P1, the scanner 331 may then be moved to a position above the opening substantially in between the two spider arms at location P2 as shown in FIG. 28 to perform another scan. After a scan is performed at location P2, the scanner 331 may then be moved to a position above the opening near the other spider arm at location P3 as shown in FIG. 28 to perform yet another scan. The scanner 331 is subsequently moved to locations P4, P5 and P6 as shown in FIG. 28 for performing further scans at each of those locations.

The raw point cloud data of each of the scans is collected by the data acquisition means and stored in the storage means to be processed.

As a series of individual scans are collected, it is necessary to combine the individual scans together by registration in order to form a complete or continuous three-dimensional point cloud data of the surface of the concave and mantle liners 322, 321.

According to embodiments of the present invention, the complete three-dimensional point cloud data can be obtained via the processing means by a number of ways. For example, an absolute positioning system such as an Inertial Measurement Unit (IMU) or a laser tracking system can be used. Other systems for absolute co-ordinate positioning apparent to a person skilled in the art may also be applied. Alternatively, a surface to surface registration of the individual scans can be performed.

In the case of an IMU, the IMU is attached to the scanner 331 or mounted in the vicinity of the scanner 331 in a fixed spaced relationship thereto. The IMU includes inertial sensors such as angular rate sensor (e.g., gyros) and acceleration sensors (e.g., accelerometers). Based on these sensors, the IMU can be used for tracking the position of the scanner 331 relative to a known reference point (e.g., a survey marker). For example, the reference point may be configured to have a co-ordinate system (X-axis, Y-axis and Z axis) such as (0, 0, 0). Therefore, since the IMU continuously tracks the change in position of the scanner relative to the known reference point, the co-ordinate system of the scanner at each of locations P1 to P6 would be known and can be recorded. That is, the IMU provides absolute position referencing with each scan. Thus, the co-ordinate system of the point cloud data obtained by each scan would be known. As a result, the point cloud data associated with each scan can be directly registered by the processing means to form a complete three-dimensional point cloud data of the surface of concave and mantle liners 322, 321.

An advantage associated with the IMU method is that it eliminates the time consuming task of scan registration using traditional techniques by allowing for direct registration of the individual scans.

A laser tracking system can similarly be used to track the co-ordinate system of the scanner 331 at each of locations P1 to P6 such that the co-ordinate system of the point cloud data associated with each scan would also be known.

Figure 29:
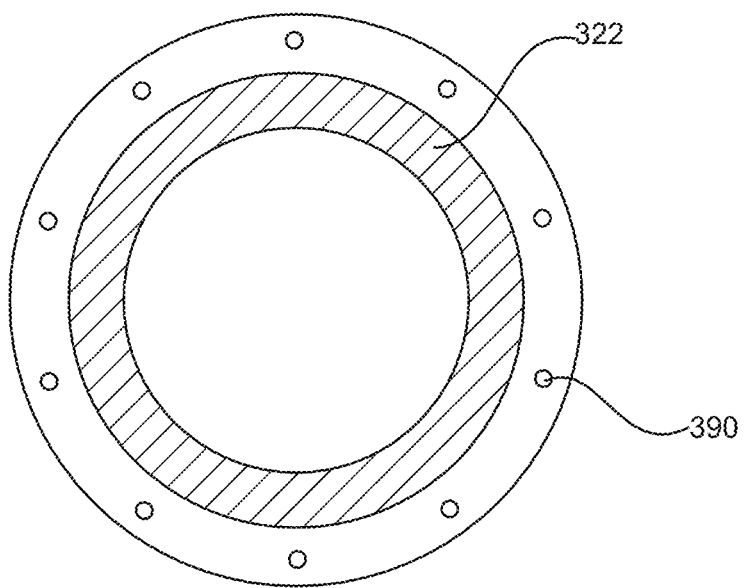
FIG. 29 is a top view of the crusher with the spider rim removed.

If an absolute positioning system is not used to track the position of the scanner 331 relative to a known reference point, it will be necessary to perform a surface to surface registration of the individual scans in order to form a complete or continuous three-dimensional point cloud data of the surface of the concave and mantle liners 322, 321. In this process, a number of fixed structures (preferably non-wearing) of the crusher are identified and used such that adjacent scans with overlapping fields of view can be joined and oriented in the crusher coordinate system by matching the identified fixed structures. For example, as shown in FIG. 29, under the spider rim, there are normally bolt holes 390 spaced apart along the upper periphery of the concave 319 for receiving bolts to secure the spider rim to the concave 319. Accordingly, once the spider rim is removed, the bolt holes 390 may serve as fixed structures to be used when registering adjacent scans. For example, each scans at locations P1 to P6 will capture a portion of the surface of the concave liner 322 and mantle liner 321 as well as the bolt holes 390 along the upper periphery of the concave 319. Therefore, when registering the adjacent scans performed at locations P1 and P2, the same bolt holes 390 in the overlapping fields of view are identified in the adjacent scans and are matched when joining the adjacent scans together. The other adjacent scans are registered in the same manner. Once all of the adjacent scans are registered, a complete or continuous three-dimensional point cloud data of the surface of the mantle and concave liners is obtained.

Alternatively, instead of indentifying fixed structures of the crusher, dedicated fixed structures can be installed at suitable locations on or in the vicinity of the crusher 308 for referencing purposes in a similar manner as described above.

The complete three-dimensional point cloud data of the surface of mantle and concave liners 321, 322 is edited by the data editing means in order to filter unwanted points (e.g., spurious points from outside of the crusher cavity 317) and segment the point cloud data into mantle liner 321 data and concave liner 322 data. In an embodiment, the filtering and segmenting steps are performed manually by a person using the data editing means. In another embodiment, the filtering and segmenting steps can be automated as apparent to a person skilled in the art.

According to an embodiment of the present invention, a base reference data representing the surface of the bare concave 319 and mantle 316 (i.e., base reference) is obtained in order to determine the relative displacement of the surface of the liners 322, 321 with respect to the base reference. The relative displacement of the surface of the liners 322, 321 with respect to the base reference at any one point would therefore represent the thickness of the liner at that point.

The base reference data may be obtained from a number of techniques according to embodiments of the present invention depending on the surrounding circumstances.

For example, if a CAD model of the crusher is available, the base reference data can simply be extracted from the CAD data. In this case, the base reference data and the point cloud data representing the surface of the mantle and concave liners 321, 322 are each reference to their own co-ordinate system. Therefore, in order to derive accurate displacement data indicative of the thickness of mantle and concave liners 321, 322 at any particular point, the sets of data would need to be correlated. In particular, the point cloud data representing the surface of the mantle and concave liners is oriented and transformed into the co-ordinate system coinciding with that of the base reference data using the referencing means.

Alternatively, during a crusher reline, a scan of the surface of the bare mantle and concave (i.e., surface of the concave 319 and mantle 316 without the liners 321, 322 in place) can be performed to obtain point cloud data representing the surface of the bare mantle 316 and concave 319 (or the surface of the back of mantle and concave liners). The point cloud data representing the surface of the bare mantle 316 and concave 319 can be obtained by performing a series of scans about the bare mantle 316 and then registering the series of scans in a similar manner as described above.

Still alternatively, the base reference data representing the bare mantle 316 and the concave 319 can be determined by identifying fixed structures with known offsets to the surface of the bare mantle 316 or concave 319. For example, as shown in FIG. 29, the bolt holes 390 on the upper periphery of the concave 319 can be used to estimate the surface geometry of the bare concave 319 since the bolt holes 390 typically has a known offset to the surface of the bare concave 319.

If an absolute positioning system, e.g., IMU, is used when scanning the surface of the bare mantle 316 and concave 319 (i.e., base reference), the co-ordinate system of point cloud data representing the base reference would coincide with the co-ordinate system of the point cloud data representing the mantle and concave liners since absolute positing referencing for each scan is used.

Accordingly, displacement data indicative of the thickness of the mantle and concave liners 321, 322 at any one particular point can be obtained by determining the relative displacement between the point cloud data representing the surface of the mantle and concave liners 321, 322 and the point cloud data representing the surface of the base reference at any one particular point with the point cloud data having the same (or aligned) co-ordinate system.

If an absolute positioning system is not used when scanning the surface of the mantle and concave liners 321, 322 and the surface of the bare mantle 316 and concave 319, a line of best fit method can be used to determine their orientations and thus their co-ordinate systems.

Figure 30A:
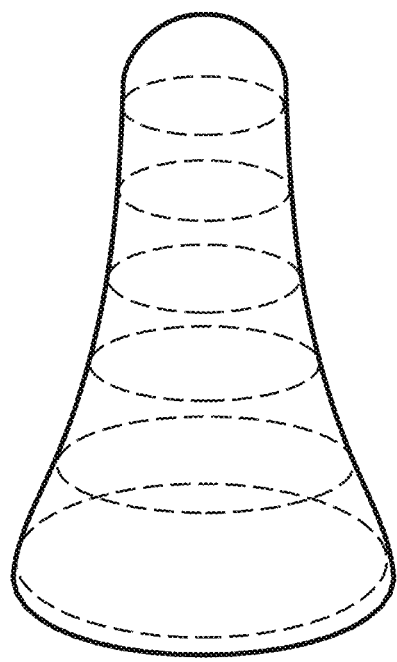
FIGS. 30A and 30B are perspective views of the concave and mantle illustrating the ring of data.
Figure 30B:
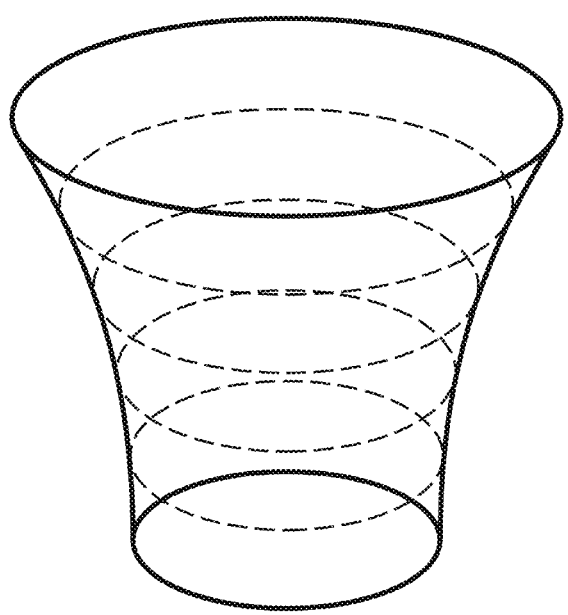

The line of best fit method will now be described with respect to the mantle and concave liners 321, 322 as depicted in FIGS. 30a and 30b. In relation to the concave liners 322, the complete or continuous point cloud data representing the surface of the concave liners 322 are processed to form rings of data. The rings of data form a plurality of parallel planes spaced apart from each other along the height of the concave liners as shown in FIG. 30b. A line of best fit is formed by connecting the centre points of each plane across the height of the concave liners. The line of best fit would therefore indicate the orientation of the point cloud data representing the concave liners and its co-ordinate system can thus be determined. In general, more accurate results can be obtained when more rings are projected along the height of the concave liners. For instance, the number of rings may range from 5 to 20.

The line of best fit method can also be used to determine the co-ordinate systems of the point cloud data representing the surface of the mantle liners as shown in FIG. 30a and the surface of the bare mantle 316 and concave 319 in a similar manner.

In order to obtain accurate displacement data indicative of the thickness of mantle and concave liners 321, 322 at any particular point, the sets of data is correlated. In particular, the point cloud data representing the surface of the mantle and concave liners 321, 322 is oriented and transformed into the co-ordinate system coinciding with that of the base reference data using the referencing mean.

The displacement data can be processed to produce a number of condition monitoring deliverables.

The software viewer may also provide statistical information for each individual survey of the crusher 308 and can be analysed by a user to monitor the condition of the crusher liners such as to identify localised wear zones.

In addition, a wear rate of the mantle and concave liners 321, 322 at various sections can also be determined by comparing the thickness of the liners 321, 322 over time or over a number of surveys.

The wear rates can be used to produce a number of monitoring deliverables such as identification of localised wear hot spots and reline forecasting.

According to an embodiment of the present invention, the present system and method for monitoring the wear condition of a crusher can also monitor asymmetry wear in the mantle and concave liners 321, 322 by utilising the wear data obtained over time. The knowledge of asymmetry wear issues on concave and mantle liners can for example be utilised in the design of concave and mantle liner 321, 322.

Preferably, the crusher 308 is operated at a substantially steady or constant target OSS and CSS in order to achieve stable product size for feeding downstream processing. As the concave and mantle liners 322, 321 wear, the OSS and CSS can be maintained substantially constant by raising the mantle 316 vertically upwards with respect to the concave 319. According to an embodiment of the invention, the CSS and/or OSS are tracked or monitored so that the mantle 316 can be raised upwards when the CSS and/or OSS exceeds a certain or predetermined limit. The CSS and OSS can be determined by calculating the distance between the concave and mantle liners 322, 321 in the vicinity of the bottom of the crusher 308 where the ores are crushed prior to leaving the crusher 308. The distance can be calculated based on the point cloud data representing the surface of the mantle liners 321 and the point cloud data representing the surface of the concave liners 322.

In an embodiment of the present invention, the steps in data processing to produce condition monitoring deliverables for a series of two or more surveys during the same liner life cycle are generally described below and may include one or more of the following:

1.) Calculation of throughput tonnage based wear information at any location of the concave liners 322 from the three-dimensional thickness data;

2.) Calculation of throughput tonnage based wear information at any location of the mantle liners 321 from the three-dimensional thickness data;

3.) Calculation of reline forecast information for the mantle and concave liners 321, 322 based on wear tracking and reline limit definitions;

4.) Calculation of head replacement forecast information based on 1.) and 2.), target CSS and OSS as defined by maximum feed size target, head maximum possible vertical travel, and defined forecast loss of throughput caused by 1.) and 2.);

5.) Calculation of volumes at associated vertical and circumferential crusher cavity sections and determining choking or non-choking condition for each volumetric section;

6.) Calculation of % of crusher power/pressure limit reached per volumetric section of 5.);

7.) Calculation of vertical mantle adjustment settings per 12 hour site shift based on 4.), 5.) and 6.);

8.) Calculation of nip point angles at regular vertical crusher cavity positions at CSS;

9.) Calculation of annulus area at regular vertical intervals and tracking of minimum annulus area vertical position;

10.) Determination of localized wear hot spots;

11.) Calculation of circumferential wear asymmetry in concave liners;

12.) Calculation of circumferential wear asymmetry in mantle liners.

Transfermapper

A third application of the invention is directed towards a system and method specifically adapted for mapping and measuring the thickness of liners in transfer chutes.

Owing to the geometric differences between mills, crushers and transfer chutes the measuring of a surface in a transfer chute to determine its difference from a base reference requires several further considerations. For instance:

1) laser scanner measurement field of view is limited to line of sight, therefore multiple storey transfer chutes typically require several scans from different access hatch set up positions in order to collect continuous coverage at consistent point cloud resolutions;

2) as a consequence of 1), scan registration may be used, i.e. the joining of individual scans to create the continuous 3D liner surface; this can be achieved either by using fixed, non-wearing structures (e.g. area below head pulleys) in the field of view of a sufficient number of liner scans, or by matching the overlap of liner surfaces between scans. Alternatively each scan can be treated individually rather than registered and joined to create a continuous surface. If individual scans are not to be registered together then each individual scan must undergo each step of the process so as to provide the end result.

3) As for any absolute liner wear monitoring application using laser scanning, thickness registration, i.e. the correlation of the visible liner surface to the back of liner is required; this can be achieved by using fixed, non-wearing structures in the field of view of a scan with known offsets to the back of liner, by establishing a precisely known absolute scanner position and orientation for every liner scan, by using UTG thickness measurements as control points, or by correlating existing transfer features in the scanner field of view to dimensioned CAD plans. Alternatively, thickness registration can be done with respect to unworn liner plates located around the periphery of the region lined with liners.

4) A universal scanner deployment mechanism that removes the need for operator access to the transfer cavity and that protects the scanner is used.

Referring to FIGS. 31 to 34 the laser scanner is used in conjunction with a transfer chute 423 generally having side walls constructed to form a chute to direct material from one place to another. Each wall upon which material impacts is typically lined with a plurality of liners 425. These liners may cover the entire wall but typically only cover the area of the wall which will be affected. The liners typically extend so that those at the periphery of the lined region experience no or negligible wear.

Transfer chutes typically have several access or manholes to provide access to the interior of the transfer chute. In order to obtain a scan of the interior of the transfer chute a scanner may be inserted through the man hole. To assist in doing so the scanner may be located on a deployment device. The deployment device has a similar effect as the deployment device used with respect to scanning a crusher.

The scanner incorporates scanner positioning means to precisely position and automatically orientate the laser scanner in an incremental manner about the fixed reference point, performing each of its scans to obtain coverage of the surrounding environment. The scanner in the present embodiment performs a series sweeps to obtain point cloud data in respect of the surface of the inner liners of the transfer chute. During this sweep, the point cloud data would be sequentially acquired and accumulated by the data acquisition means.

The database of the computer is designed to store base reference data in respect of a base reference specified for the particular transfer chute being scanned. This base reference in the present embodiment is the outer, non-worn liners located at the periphery of the lined portion of the inner wall of the transfer chute.

The transfer chute liners define a transfer chute liner surface which over time has areas of wear. These areas become distally spaced relative to the base reference. This displacement, shown with respect to one point of the point cloud of data for which point cloud data is acquired from the laser scanner, corresponds to the thickness of the liner segment at that point relative to the position of the outer, non-worn liners. This position may be obtained from the base reference data stored in the database.

The base reference data may be obtained from a CAD model of the lined portion of the transfer chute or from a scanning of the lined portion when first installed. The base reference data is characterised by certain key reference data comprising critical transfer chute parameters that describe the geometry of the base reference of the transfer chute.

In the present embodiment, the database is maintained with critical transfer chute parameters for each transfer chute, which will vary from transfer chute to transfer chute depending upon the particular transfer chute shape and configuration. The co-ordinate system of the displacement data obtained by the laser scanner is referenced to the reference point of the laser scanner, whereas the base reference data for the transfer chute is referenced to its own co-ordinate system related to the geometry of the transfer chute. Therefore in order to derive accurate displacement data indicative of the transfer chute liner segment thickness at any particular point, the two sets of data need to be correlated. Accordingly, an important aspect of the processing software is to provide for this correlation.

Figure 31:
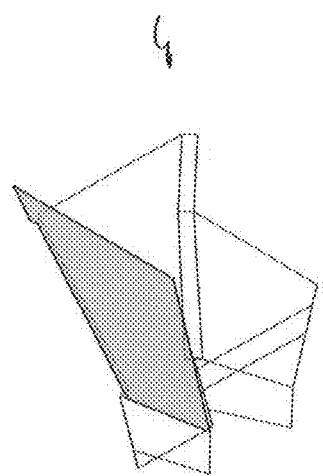
FIG. 31 is a perspective view of a section of a transfer chute.
Figure 32:
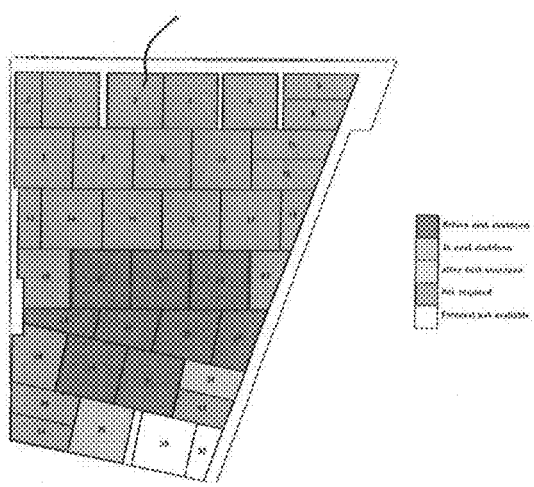
FIG. 32 provides a coded representation of the liners secured to the shaded wall of FIG. 31, and provides an indication as to when individual liners need replacement.
Figure 33:
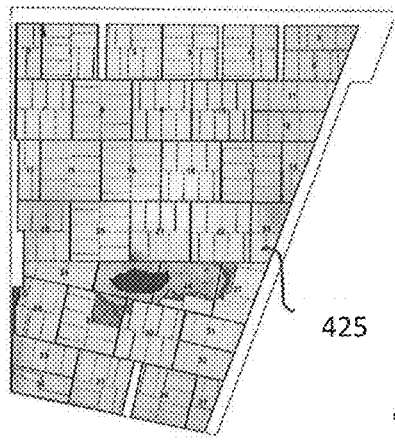
FIG. 33 provides a photograph representation of the shaded wall of FIG. 31.

The segments of the point cloud representing the sections of the transfer chute to be monitored correspond to different geometrically described sections and are thus separated at this stage so that they can be processed individually. As shown in FIG. 31, the transfer chute has been broken down in to several segments, with FIGS. 32 to 34 providing a visual analysis of one of these segments, The referencing means provides for the orientation of the point cloud data relative to the critical transfer chute parameters and the transformation of the point cloud of data into the co-ordinate system coinciding with the base reference data.

The referencing means, as a first step, includes an estimating process to estimate a critical parameter from the point cloud data and a transformation process to transform the data so that this critical parameter and that of the CAD model reference data, mathematically coincide. Liner thickness can then be computed, as a second step, for each point by the displacement processing means.

Figure 34:
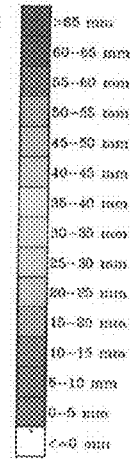
FIG. 34 provides a coded representation of the liners secured to the shaded wall of FIG. 31, and provides an indication as to the thickness of each liner.
Figure 35B:
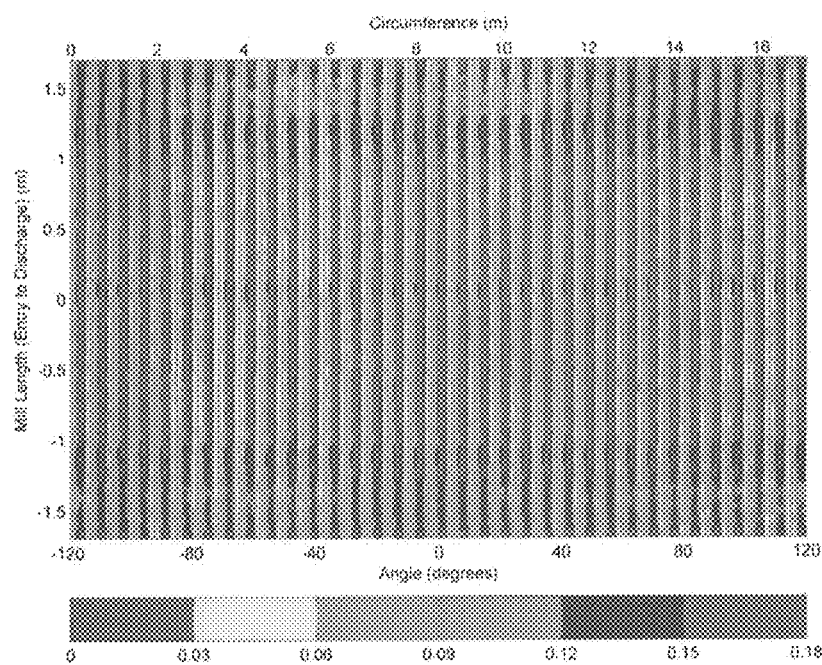
Figure 35B:
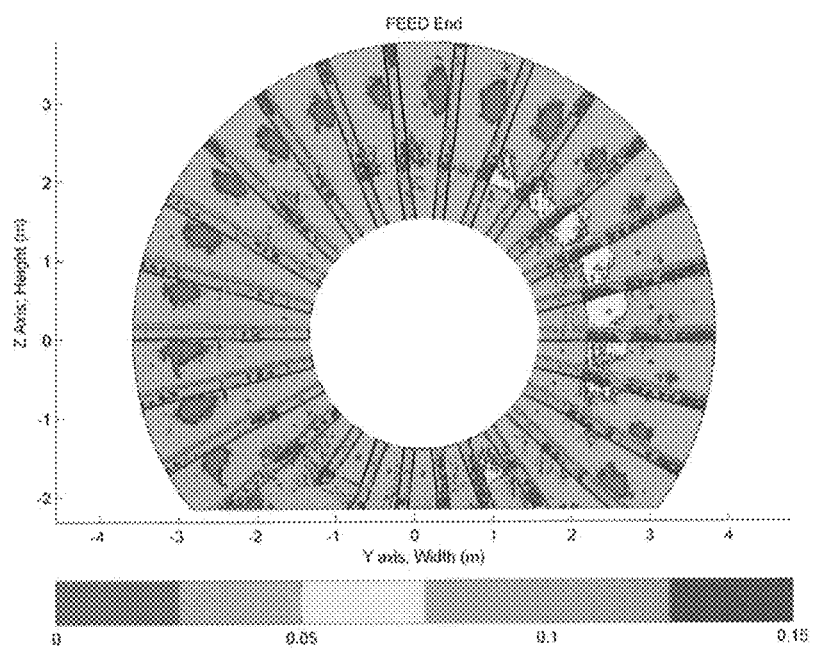
Figure 35C:
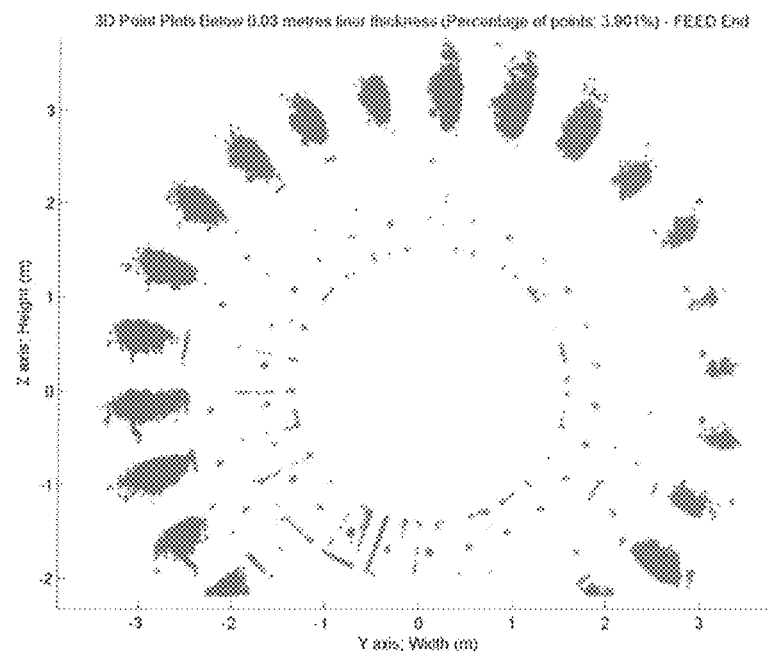
Figure 35C:
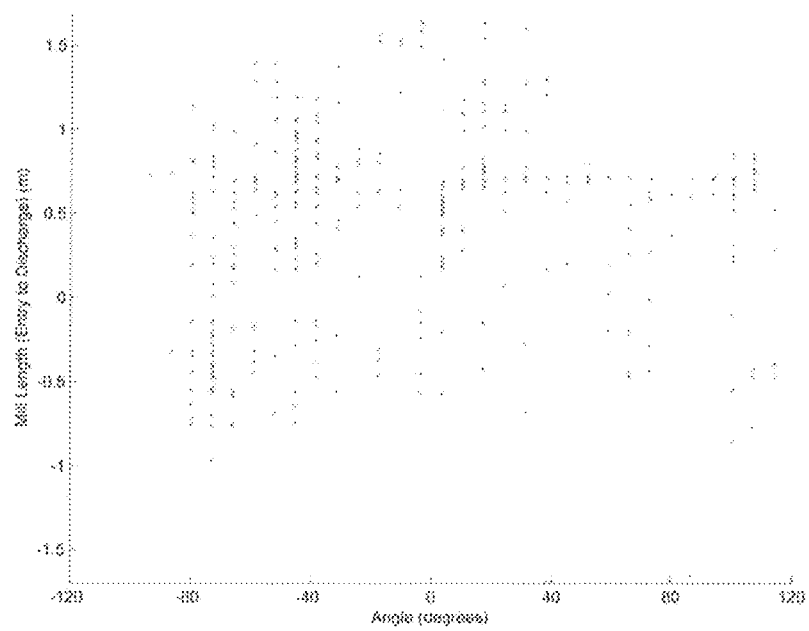
Figure 35D:
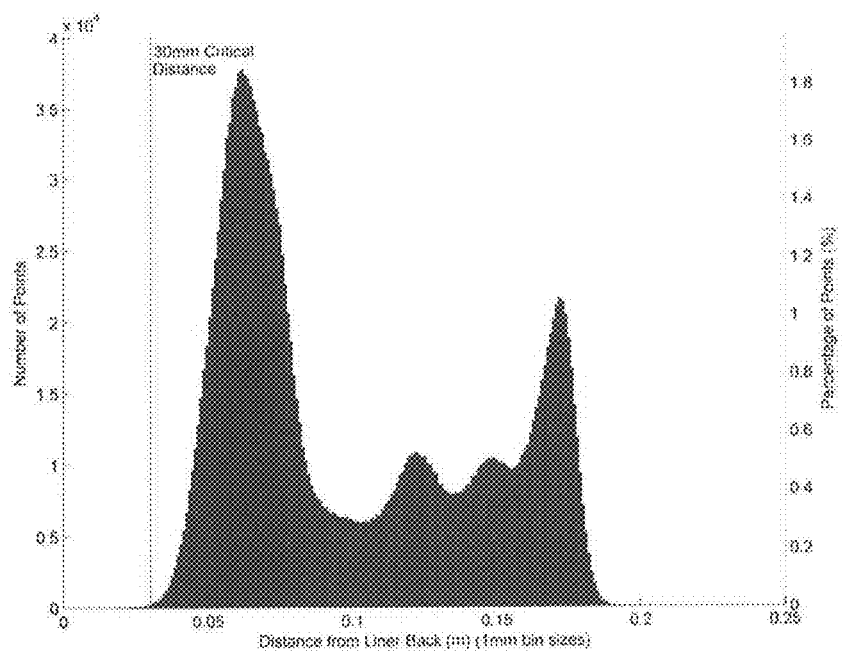
Figure 35D:
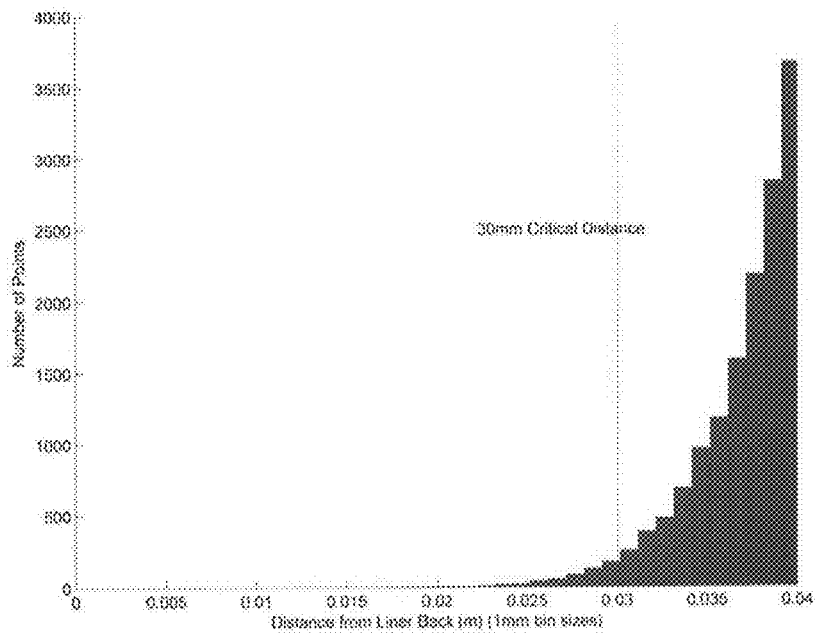
Figure 35E:
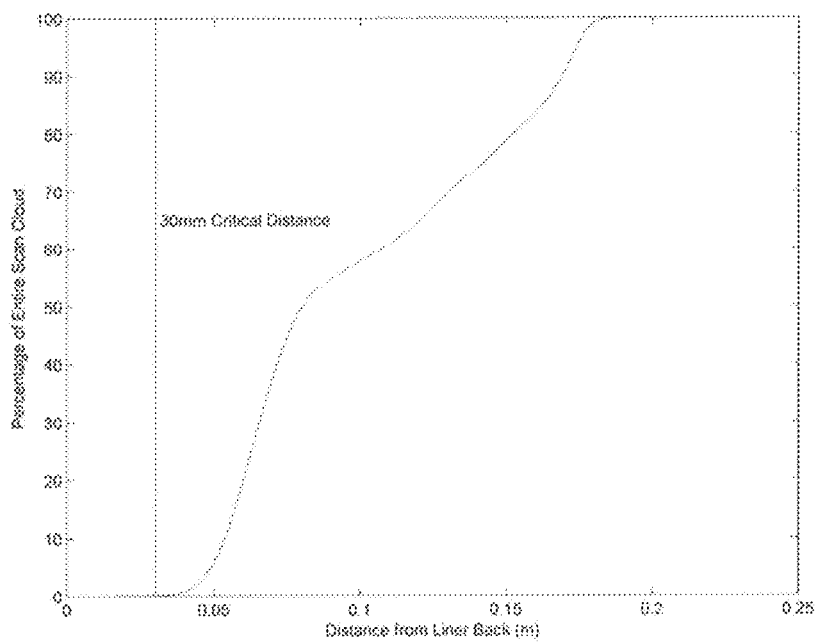
Figure 35E:
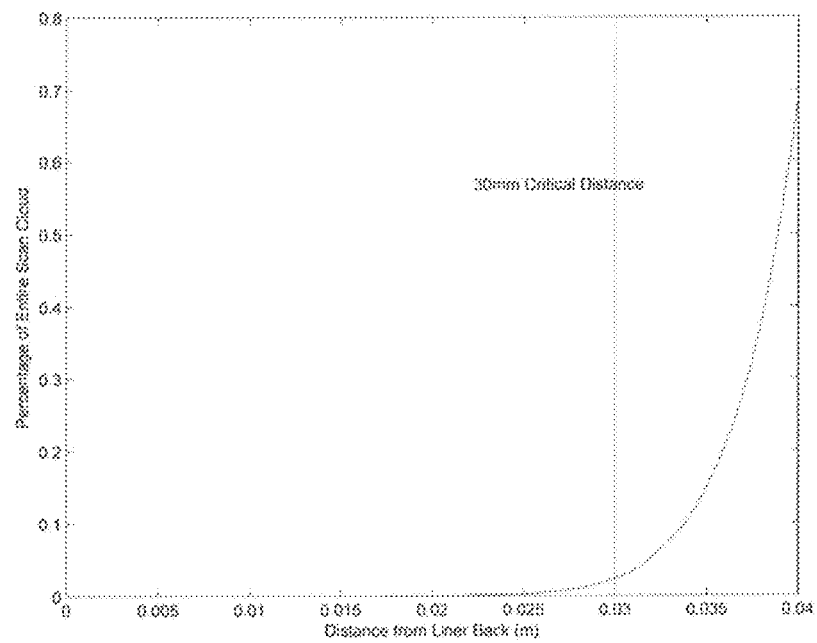
Figure 35F:
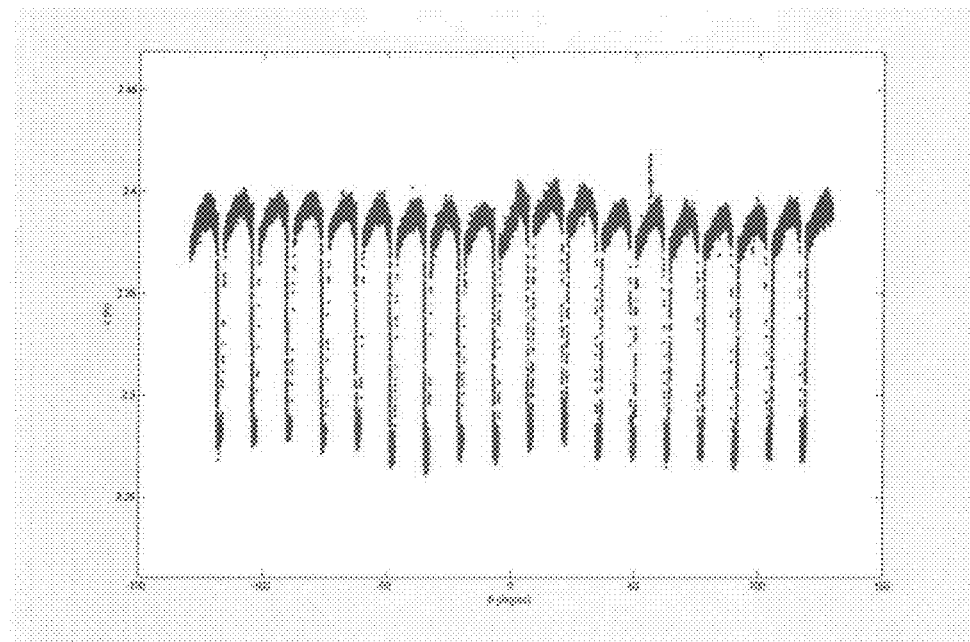
Figure 35F:
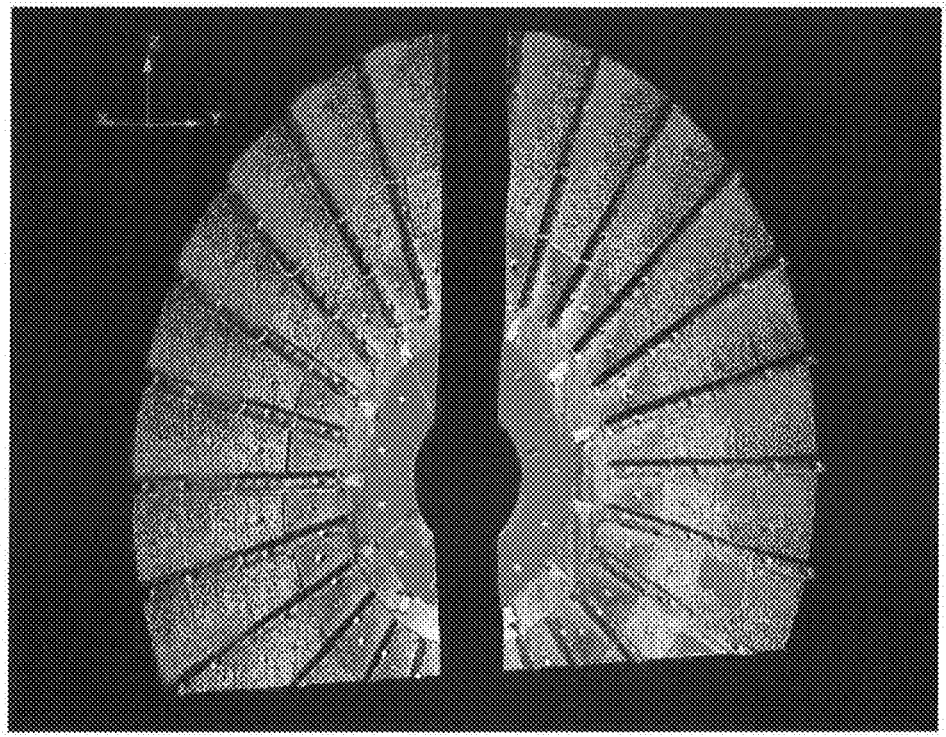

An important advantage of the present embodiment is that the transfer chute dataset ultimately obtained can be used to yield a comprehensive statistical and graphical report to the user. The system includes mapping means to provide the user with a number of different formats for reporting the results of the scan on completion of the thickness computations. An example of this is shown in FIG. 34 which represents the thickness of the segment shaded in FIG. 31.

Registration of various scans may be completed by the following method:

Master scan-point file and back-of-liner creation
1. Select best scan at each hatch as "master" survey
2. Align raw scan cloud to nominal coordinate axes
Panel matrix; or
Geometric object
3. Segment aligned scan cloud into individual wall segments
Each segment must be in the coordinate system as defined after the initial alignment
4. Split individual wall segments into wearing and non-wearing sections
Non-wearing sections are assumed to be at the edges of the walls Logic for splitting is to be defined, e.g. outer boundary is one panel/tile in from the edge, inner boundary is one panel/tile in from the outer boundary Note: this logic to prevent "sliding" in the cloud-to-cloud registration as the edge of a section heavily biases the solution Fit plane to entire segment and create "difference map" to plane as a means to better determine areas of wear and non-wear 5. Fit plane to non-wearing section of individual wall segment Verticality can only be assumed if alignment of raw scan cloud in Step 2 is vertical verticality of plane-fit to nominally vertical wall segments (i.e. check "c" parameter of plane normal equal normal parameters for parallel walls calculate angle to adjacent planes and check against CAD 6. Translate plane back along it's normal by the nominal new liner thickness 7. Expand planar boundaries of plane-fit past the extents of the scan points 8. Pick vertices on the plane that define the shape of the liners This is the back-of-liner definition for input into TMCV This Intersect planes with planes to create the nominal transfer shell. Select vertices at the extents of the planes to define the BOL 9. Export—BOL Vertices, Wall points Registration of "slave" surveys (all other surveys)

1. Segment raw point-cloud into individual wall segments

Can be done in FARO Scene

Each segment must be in the scanner's coordinate system

2. Split individual wall segments into wearing and non-wearing sections

Apply same logic as established in the master scan file

3. Align non-wearing section to master file

All points, wearing and non-wearing, are to be aligned 4. 3-point initial alignment 5. Cloud-to-cloud registration Filter for noise, e.g. dark and bright scan points, spurious points, etc.

"spatially" sample point cloud to reduce influence of dense-points areas

Normals of plane-fit to slave scan points should equal plane fit to master scan points Create difference map if plane-fit is not equal to check for areas of wear 6. Export aligned scan points The present embodiment has several advantages over prior art systems used for inspecting liner wear in mills, crushers and transfer chutes. Some of these advantages are as follows:

Unlike visual inspection and ultrasonic thickness gauging, the invention does not require physical human access into mill, crusher or transfer chute, thus saving shutdown time and avoiding the complexity of safety issues.

Data collection takes less than 5 minutes, which is much faster than any alternative method of inspection.

Several million point samples of liner thickness are computed, rather than a few dozen.

The relative location of all point samples is known precisely. The other methods do not deliver this information.

The individual precision of measurements is empirically more accurate than other techniques.

A 3D digital wear model is computed directly from the point cloud data, as are quality control indicators and associated statistical analysis. No other method provides such detailed scientifically rigorous information about the thickness of a liner.

liner wear is visualised by a series of colour-coded maps for the central shell and the feed and discharge ends. The other methods cannot provide this type of visualisation.

It should be appreciated that the scope of the present invention is not limited to the specific embodiment described herein. Importantly, the invention is not limited to mapping and measuring thickness of liners in mills, crushers, transfer chutes or other material handling systems. Indeed, other embodiments may be envisaged using the same principles applied to mapping and/or measuring surface displacement relative to a reference in other applications such as vessels and structures particularly common to industrial installations. Similarly, displacement can also be in relation to displacement caused by the accumulation of deposits thereon, such as on ship hulls, not just wear.

Modifications and variations such as would be apparent to a skilled addressee are deemed to be within the scope of the present invention.

What is claimed is:

1. A system arranged for measuring the displacement of a surface in a material handling system such as a crusher, transfer chute or other material handling structure relative to a base reference of the material handling system such as the base reference of the crusher, transfer chute or other material handling structure, thereof comprising:

a laser scanner to generate point cloud data comprising a plurality of three-dimensional spatial points of the surface referenced relative to a reference point to define a three-dimensional point cloud image of the surface, wherein the laser scanner comprises:

(i) a transmitter for transmitting laser radiation from the reference point towards the surface;

(ii) a detector proximate to the reference point for detecting reflected laser radiation from the surface; and (iii) distance processing means to measure the distance between the laser scanner and the surface, and generate point cloud data in respect thereof;

storage means to store data relevant to the base reference in respect of the base reference; and processing means to process the three-dimensional point cloud image and the data relevant to the base reference to determine the relative displacement of the surface with respect to the base reference;

wherein the processing means comprises:

(i) microprocessor circuitry interfaced with the laser scanner and storage means;

(ii) determining means for determining the location and direction of key reference parameters of the object defined by the three dimensional image from the point cloud data;

(iii) a referencing means to orientate the three-dimensional point cloud image of the surface relative to key reference data of the base reference and to transform the point cloud data and data of the base reference into a common co-ordinate system, and (iv) displacement processing means to calculate the displacement between the surface and the base reference using both sets of data in the co-ordinate system, wherein the calculated displacement is compared against a prescribed threshold comprising a distance between the surface and the data of the base reference in order to gauge wear of the surface relative to the base reference to determine if the surface has worn to a degree in which it requires at least one of maintenance and replacement.

2. The system as claimed in claim 1 wherein the base reference is a further surface of the material handling system.

3. The system as claimed in claim 1 wherein the base reference is the surface before it undergoes displacement caused by wear.

4. A system as claimed in claim 1, wherein the key reference data is in the form of a set of critical parameters that describe the geometry of the base reference and critical parameters that describe the relative boundaries of the surface.

5. A system as claimed in claim 4, wherein the base reference is a substantially cylindrical shell with opposing ends and the critical parameters are, or are a combination of:
the location of the central longitudinal axis of the cylindrical shell;
the radius of the cylindrical shell; and
the length of the cylindrical portion of the cylindrical shell.

6. A system as claimed in claim 5, wherein the at least one critical parameter of the key reference data of the base reference is the longitudinal axis of the cylindrical shell.

7. A system as claimed claim 5, wherein the opposing ends are substantially conical, and the critical parameters include:
the cone angles of the opposing ends, relative to the axis of the cylindrical shell; and
the distance between the apexes of the opposing ends.

8. A system as claimed in claim 4 wherein the base reference is provided by an outer wall shell of a crusher, the crusher comprising a concave and a mantle, whereby the critical parameters of the crusher include:
the location of the central longitudinal axis of the concave of the crusher; and
the length and position of the concave shell.

9. A system as claimed in claim 4 wherein the base reference is provided by an inner wall shell of a crusher, whereby the critical parameters include one or more of the following:
the location of the central longitudinal axis of the mantle of the crusher;
the eccentricity angle of the crusher mantle centre axis; and
the pivot point of the adjustable mantle height setting from the operating system mantle origin.

10. A system as claimed in claim 4 wherein the base reference is provided by at least one inner surface of the shell of a transfer chute, whereby the critical parameters include one or more of the following:
the location and orientation of the wall(s) of the shell;
lined and unlined shell inner surface and surface normal vector, and
dimensions of the liner.

11. A system as claimed in claim 5, wherein the surface comprises a plurality of segments and the critical parameters of the point cloud data include the distance of the corner points of each segment to one end of the shell, or separation lines between adjacent segments.

12. A system as claimed in claim 5, wherein the critical parameters include the distance between a prescribed reference surface and one or other of the ends of the shell.

13. A system as claimed in claim 5, wherein the critical parameters include the distance between the prescribed reference surface and the inner liner surface.

14. A system as claimed in claim 1, wherein the laser scanner includes a scanner positioning means to precisely position and orientate the laser scanner in a prescribed manner incrementally about the origin of the laser scanner.

15. A system as claimed in claim 1,
including data acquisition means to acquire and accumulate the point cloud data at consecutive incremental orientations of the laser scanner about the origin of the laser scanner to generate a three-dimensional measure of the point cloud data in respect of substantially the entire three-dimensional extent of the surface.

16. A system as claimed in claim 1, wherein the origin of the laser scanner is placed at several points to acquire point cloud data at those multiple points.

17. A system as claimed in claim 1, wherein the processing means includes a data editing means to filter spurious point data from the accumulated point cloud data before operation of the referencing means and the displacement processing means.

18. A system as claimed in claim 1, wherein the processing means further includes a partitioning means to partition the point cloud data into discrete segments corresponding to different geometrical sections of the surface before operation of the referencing means and the displacement processing means.

19. A system as claimed in claim 1, wherein the referencing means includes a process to locate at least one of the critical parameters of the key reference data within the point cloud data, and a transformation process to transform the point cloud data into the co-ordinate system coinciding with the base reference data so that the location of the one critical parameter of the point cloud data mathematically coincides with the location of this same critical parameter in the base reference data.

20. A system as claimed in claim 19, wherein the process is an estimating process to estimate the location of at least one of the critical parameters of the key reference data from the point cloud data.

21. A system as claimed in claim 20, wherein the process estimates the axis of the cylindrical shell from the point cloud data, and a transformation process to transform the point cloud data, so that the estimated axis and the central longitudinal axis of the cylindrical shell mathematically coincide.

22. A system as claimed in claim 20 wherein the process estimates the axis of the crusher concave from the point cloud data, and a transformation process to transform the point cloud data, so that the position and placement along the respective estimated and actual axes mathematically coincide.

23. A system as claimed in claim 20 wherein the process estimates the axis of the crusher mantle from the point cloud data, and a transformation process to transform the point cloud data, so that the position and placement along the respective estimated and actual axes mathematically coincide.

24. A system as claimed in claim 20 wherein the process estimates the inner surface of the shell of the transfer chute from non-wearing components of the point cloud data, and a transformation process to transform the point cloud data, so that the estimated and actual inner surface of the shell of the transfer chute mathematically coincide.

25. A system as claimed in claim 20 wherein the transformation process transforms each point from the co-ordinate system of the laser scanner into the coordinate system of the base reference.

26. A system as claimed in claim 20, wherein the key reference data is in the form of a set of critical parameters that describe the geometry of the base reference and critical parameters that describe the relative boundaries of the surface,
- wherein the base reference is provided by at least one inner surface of the shell of a transfer chute, whereby the critical parameters include one or more of the following:
  - the location and orientation of the wall(s) of the shell;
  - lined and unlined shell inner surface and surface normal vector, and
  - dimensions of the liner, and
- wherein the referencing means invokes the transformation process to transform each point of the point cloud data from the co-ordinate system for the laser scanner (x, y, z) into the co-ordinate system of the base reference (X, Y, Z) using the estimated transformation parameters as previously determined.

27. A system as claimed in claim 20, wherein the key reference data is in the form of a set of critical parameters that describe the geometry of the base reference and critical parameters that describe the relative boundaries of the surface, wherein the base reference is a substantially cylindrical shell with opposing ends and the critical parameters are, or are a combination of:
- the location of the central longitudinal axis of the cylindrical shell:
- the radius of the cylindrical shell; and
- the length of the cylindrical portion of the cylindrical shell, wherein the surface comprises a plurality of segments and the critical parameters of the point cloud data include the distance of the corner points of each segment to one end of the shell, or separation lines between adjacent segments, and
- wherein the referencing means invokes the transformation process to transform each point for the reference surface from the co-ordinate system for the laser scanner (x, y, z) in the co-ordinate system of the base reference (X, Y, Z) using the estimated transformation parameters as previously determined.

28. A system as claimed in claim 20, wherein the referencing means invokes the estimating process to estimate the critical parameters for the displacement processing means to subsequently determine the displacement of the surface relative to the base surface.

29. A system as claimed in claim 28, wherein the displacement of the surface relative to the base surface at the opposing ends of the cylindrical shell is determined.

30. A system as claimed in claim 28 wherein the estimating process utilises known parameters common to the base reference and the surface.

31. A system as claimed in claim 30 wherein the known parameters are bolt holes, or gaps in the surface exposing the shell.

32. A system as claimed in claim 28 wherein the estimating process uses a gap point two parallel planes method adopting a simultaneous least squares fit methodology, whereby the loci of the corner points are used to estimate the parameters of the parallel, best-fit planes in order to determine the distance to the base reference.

33. A system as claimed in claim 1 wherein the referencing means includes an orientating process to orientate said point cloud data relative to said key reference data and to transform the point cloud data into a co-ordinate system coinciding with the base reference data.

34. A system as claimed in claim 20 wherein the estimating process uses a temporarily or permanently affixed planar surface or other simple shape as a referencing method, whereby data points thereon at the time of acquisition that are positioned by said positioning means and transformed by said transformation process are used to estimate the parameters to determine the placement or orientation to the base reference.

35. A system as claimed in claim 10 wherein the displacement processing means determines the displacement of the surface relative to the base reference at an observation point.

36. A system as claimed in claim 35 wherein the observation point is substantially orthogonal to both the surface and the base reference.

37. A system as claimed in claim 36 wherein the displacement processing means calculates the distance from the observation point to the surface, the difference of this distance and the distance between the observation point and the base reference being the displacement of the surface relative to the base reference.

38. A system as claimed in claim 37 wherein the displacement processing means:
- calculates the radius being the orthogonal distance from the axis of the shell to the observation point; and
- determines the displacement of the surface relative to the base reference at the specific observation point along the shell as the difference between the initial approximate distance of the base reference and the calculated distance.

39. A system as claimed in claim 1 wherein the referencing means includes a positioning process to position the point cloud data segments that were discretely partitioned and stored relative to the base reference.

40. A system as claimed in claim 5 wherein the positioning process positions the point cloud data segments that were discretely partitioned and stored for the opposing ends of the cylindrical shell, relative to the base reference.

41. A system as claimed in claim 40 wherein the positioning process:
(i) extracts data from the point cloud data to determine the location of known bolt holes (A), the length of the segments (B), the distance between an adjacent segment and the end of the shell (C), and the longitudinal extent of the shell (D); and
(ii) translates the data along the longitudinal axis by:
  a. determining the location of known bolt holes within one plane of visible segments around the shell;
  b. determining the position of the base reference.

42. A system as claimed in claim 40, wherein the positioning process:
(i) extracts data pertaining to the distance of the corner points from the point cloud data to determine the location of the corner points (A), the length of the segments (B), the gap between an adjacent segment and the one opposing end of the shell (C), and the longitudinal extent of the shell (D); and
(ii) translates the data along the longitudinal axis by:
  a. determining the location of all corners within one vertical plane of visible segments all around the shell;
  b. determining the location of gaps between all corners opposing those in a. within one vertical plane of visible segments all around the shell;
  c. determining the halfway plane between planes though points extracted under a. and b.;

d. determining the position of the base reference at the one opposing end according to the formula: ½ A+B+ C.

43. A system as claimed in claim 42 wherein the positioning process comprise the step of determining the position of the base reference at the other opposing end by adding D to the outcome of the formula at d.

44. A system as claimed in claim 40, wherein the positioning process:
   (i) translates the data along the longitudinal axis or spatially by:
      a. determining the location on non-wearing areas of liners;
      b. determining and/or applying the thickness of said non-wearing liners.

45. A system as claimed in claim 14, wherein the critical parameters include the distance between a prescribed reference surface and one of the opposing ends of the shell, and the positioning process:
   (i) extracts data pertaining to the distance between the prescribed reference surface and the one of the opposing ends of the shell (A'), and the longitudinal extent of the shell (D') from the base reference data; and
   (ii) translates the data along the longitudinal axis by:
      a. determining the position of the base reference at the one opposing end by adding A' to the location of the reference surface in the point cloud data; and
      b. determining the position of the base reference at the other opposing end by adding D to the outcome of a. above.

46. A system as claimed in claim 43 or 44, wherein:
the estimating process uses a gap point two parallel planes method adopting a simultaneous least squares fit methodology, whereby the loci of the corner points are used to estimate the parameters of the parallel, best-fit planes in order to determine the distance along the longitudinal axis to the base reference at both of the opposing ends of the cylindrical shell.

47. A system as claimed in claim 33, wherein the orientating process applies a functional model to orientate the point cloud data relative to the key reference data of the opposing ends and to transform the point cloud of data into a coordinate system coinciding with the base reference data for each opposing end, respectively.

48. A system as claimed in claim 19, where in the case of the opposing ends being planar or conical, the displacement processing means provides for calculating the displacement between the surface and the base reference using both sets of data in the co-ordinate system of the base reference data, the point cloud data being already transformed, commencing with the one end and then the other.

49. The system according to claim 1 whereby in crushers the system is used to maintain an optimal Closed Side Setting (CSS) and/or Open Side Setting (OSS) by predicting when the mantle requires to be raised or replaced.

50. The system according to claim 49 wherein the system provides data to facilitate the timing of adjustments of the mantle in order to maintain CSS and/or OSS of the crusher.

51. The system according to claim 49 wherein the laser scanner is positioned so as to scan the location of the CSS and/or OSS of the crusher.

52. The system according to claim 49 wherein the CSS and/or OSS can be determined by calculating the distance between the concave and mantle liners, the distance may be calculated based on the point cloud data representing the surface of the mantle and the point cloud data representing the surface of the concave liners.

53. A system as claimed in claim 1, wherein the base reference is a base surface which may be in the form of the surface of the unworn liner, the back of liner surface, or another surface of the structure.

54. A system as claimed in claim 1, including processing modules to provide for statistical analysis and quality control of the accumulated cloud point data, the processing modules comprising one or more of the following metrics:
   (i) covariance matrix of estimated parameters;
   (ii) data snooping methods to test and identify least-squares residuals and subsequently remove outlier points;
   (iii) root mean square (RMS) and maximum residual; and
   (iv) estimated variance factor.

55. A system for measuring the displacement of a surface in a material handling system such as a crusher, transfer chute or other material handling structure relative to a base reference of the material handling system such as the base reference of the crusher, transfer chute or other material handling structure, wherein differences in measurements of displacement of the surface relative to the base reference over a time period represents a rate of change between the base reference and the surface which is used to determine if the surface requires at least one of maintenance and replacement, the system comprising:
   laser scanner to generate point cloud data in respect of a distal surface relative to a reference point of the laser scanner to define a three-dimensional image of the surface comprising a plurality of three-dimensional spatial points, wherein the laser scanner comprises:
      (i) a transmitter for transmitting laser radiation from the reference point towards the surface;
      (ii) a detector proximate to the reference point for detecting reflected laser radiation from the surface; and
      (iii) distance processing means to measure the distance between the laser scanner and the surface, and generate point cloud data in respect thereof;
   storage means to store data relevant to the base reference, the data of the base reference being relative to the surface; and
   processing means to process the three-dimensional point cloud image and the data of the base reference data to determine the displacement therebetween;
   characterised by the processing means including:
      (i) microprocessor circuitry interfaced with the laser scanner and storage means;
      (ii) determining means for determining the location and direction of key reference parameters of the object defined by the three dimensional image from the point cloud data;
      (iii) a referencing means to orientate the three-dimensional point cloud image of the surface relative to key reference data of the base reference and to transform the point cloud data and the data of the base reference into a common co-ordinate system; and
      (iv) displacement processing means to calculate the displacement using both sets of data in the co-ordinate system, wherein the calculated displacement and the rate of change in displacement is used to determine at least one of (1) when the surface will be worn to a degree in which it requires at least one of maintenance and replacement and (2) if the surface is worn to a degree in which it requires at least one of maintenance and replacement.

56. A system according to claim 55 further comprising a display to graphically display the result of the comparison.

57. A system as claimed in claim 56, wherein the display includes a first format for graphically displaying the point cloud data or the displacement data in a 3D view.

58. A system as claimed in claim 56, wherein the display includes data manipulation means for unwrapping the point cloud data or the displacement data onto a 2D plane and a second format for graphically displaying same.

59. A system as claimed in claim 58, wherein the second format includes a contour map having different colours or shades representing different magnitudes of displacement relative to the prescribed threshold.

60. A system as claimed in claim 56, wherein the display includes a third format for calculating a histogram in respect of the displacement data.

61. A system as claimed in claim 56, wherein the display includes a fourth format for calculating a cumulative distribution histogram in respect of the displacement data.

62. A method for measuring the displacement of a surface relative to a base reference thereof, wherein the surface is oriented with reference to a coordinate system of the base reference, the method comprising:

using a laser scanner to generate point cloud data comprising a plurality of three dimensional spatial points, in respect of a measure of the spatial orientation of the surface relative to a reference point of the laser scanner, the point cloud data defining a three dimensional image of the surface;

determining the location and direction of key reference parameters of the object defined by the three dimensional image from the point cloud data;

obtaining base reference data in a prescribed co-ordinate system in respect of a base reference relative to the surface; and processing, using a computer comprising microprocessor circuitry interfaced with the laser scanner and storage means, the point cloud data and the base reference data, orientating the point cloud data relative to the key reference parameters defined by the data of the base reference and transforming the point cloud coordinate system of the three-dimensional point cloud image data into a co-ordinate system coinciding with the base reference data; and determining the relative displacement of the surface defined by the point cloud data with respect to the base reference in the coordinate system, wherein the relative displacement is compared against a prescribed threshold comprising a distance between the surface and data of the base reference in order to gauge the wear rate of the surface.

* * * * *